(12) United States Patent
Luethy et al.

(10) Patent No.: US 11,988,584 B2
(45) Date of Patent: May 21, 2024

(54) DISPOSABLE BIOPSY STAINING KIT AND RELATED METHODS AND SYSTEMS

(71) Applicant: Instapath, Inc., New Orleans, LA (US)

(72) Inventors: Samuel Jacob Luethy, Chesterfield, MO (US); Jonathon Quincy Brown, New Orleans, LA (US); David Benjamin Tulman, New Orleans, LA (US); Andrew Blake Sholl, New Orleans, LA (US); Peter Joseph Lawson, New Orleans, LA (US); Mei Wang, Austin, TX (US)

(73) Assignee: Instapath, Inc., Houston, TX (US)

( * ) Notice: Subject to any disclaimer, the term of this patent is extended or adjusted under 35 U.S.C. 154(b) by 187 days.

(21) Appl. No.: 16/376,104

(22) Filed: Apr. 5, 2019

(65) Prior Publication Data

US 2019/0331560 A1    Oct. 31, 2019

Related U.S. Application Data

(60) Provisional application No. 62/781,865, filed on Dec. 19, 2018, provisional application No. 62/653,400, filed on Apr. 5, 2018.

(51) Int. Cl.
*G01N 1/31* (2006.01)
*B01L 3/00* (2006.01)
(Continued)

(52) U.S. Cl.
CPC ............... *G01N 1/31* (2013.01); *B01L 3/508* (2013.01); *B01L 9/50* (2013.01); *B01L 9/52* (2013.01);
(Continued)

(58) Field of Classification Search
CPC .... B01L 3/508; B01L 9/50; B01L 9/52; B01L 2300/044; B01L 2300/0672;
(Continued)

(56) References Cited

U.S. PATENT DOCUMENTS

| 6,418,236 B1 | 7/2002 | Ellis et al. |
| 6,998,270 B2 | 2/2006 | Tseung et al. |

(Continued)

FOREIGN PATENT DOCUMENTS

| CA | 3 095 932 | 10/2019 |
| RU | 1777033 C | 11/1992 |

(Continued)

OTHER PUBLICATIONS

Notification of Transmittal of the International Search Report and the Written Opinion, PCT/US2019/025988, Jul. 4, 2019, 7 pages.
(Continued)

*Primary Examiner* — Matthew D Krcha
*Assistant Examiner* — Austin Q Le
(74) *Attorney, Agent, or Firm* — Stanek Lemon Crouse & Meeks, PA

(57) ABSTRACT

A disposable staining system is provided including an insertable module configured to receive a biological sample therein, the insertable module including a well in which the biological sample is positioned; and a staining cartridge configured to receive the insertable module including the biological sample therein, the insertable module being positioned in the staining cartridge. The insertable module has first and second inclined planes on opposing sides of an upper surface of the insertable module. A sled configured to receive the insertable module has corresponding first and second inclined planes on a bottom surface thereof. The first and second inclined planes of the insertable module and the first and second inclined planes of the sled are configured to
(Continued)

transform horizontal movement of the insertable module into the staining cartridge into a vertical movement of the sled such that the sled is pushed upward.

16 Claims, 93 Drawing Sheets

(51) Int. Cl.
    *B01L 9/00*     (2006.01)
    *G02B 21/26*     (2006.01)
    *G02B 21/36*     (2006.01)

(52) U.S. Cl.
    CPC ............. *G02B 21/26* (2013.01); *G02B 21/36* (2013.01); *B01L 2300/044* (2013.01); *B01L 2300/0672* (2013.01); *B01L 2300/069* (2013.01); *B01L 2300/0848* (2013.01)

(58) Field of Classification Search
    CPC ....... B01L 2300/069; B01L 2300/0848; G02B 21/26; G02B 21/36; G01N 1/31
    See application file for complete search history.

(56) References Cited

U.S. PATENT DOCUMENTS

| | | |
|---|---|---|
| 7,936,912 B2 | 5/2011 | Tohma et al. |
| 2007/0077550 A1 | 4/2007 | Tohma et al. |
| 2009/0269799 A1 | 10/2009 | Winkelman et al. |
| 2010/0120083 A1 | 5/2010 | Ritzen et al. |
| 2011/0157349 A1* | 6/2011 | Yamamoto ............. G02B 21/36 348/79 |
| 2012/0177543 A1* | 7/2012 | Battrell ............. B01L 3/502738 422/187 |
| 2013/0071858 A1* | 3/2013 | Bui .................. G01N 35/00732 435/7.21 |
| 2014/0051118 A1* | 2/2014 | Matthiesen ............. G01N 1/30 435/40.5 |
| 2014/0349381 A1 | 11/2014 | Battrell et al. |
| 2015/0346097 A1* | 12/2015 | Battrell .................... B01L 7/52 435/6.11 |
| 2016/0076072 A1 | 3/2016 | Lastovich et al. |
| 2016/0282375 A1* | 9/2016 | Barnett .................... G01N 1/30 |
| 2016/0370264 A1 | 12/2016 | Campbell |

FOREIGN PATENT DOCUMENTS

| | | |
|---|---|---|
| WO | WO 99/12057 | 3/1999 |
| WO | WO 2018/009920 A1 | 1/2018 |

OTHER PUBLICATIONS

Notification Concerning Transmittal of International Preliminary Report on Patentability, PCT/US2019/025988, Oct. 15, 2020, 6 pages.

Extended European Search Report, EP 19781705.9, Dec. 17, 2021, 11 pages.

Notification of Transmittal of the International Search Report and the Written Opinion of the International Searching Authority, or the Declaration, PCT/US2021/049548, Nov. 25, 2021, 7 pages.

\* cited by examiner

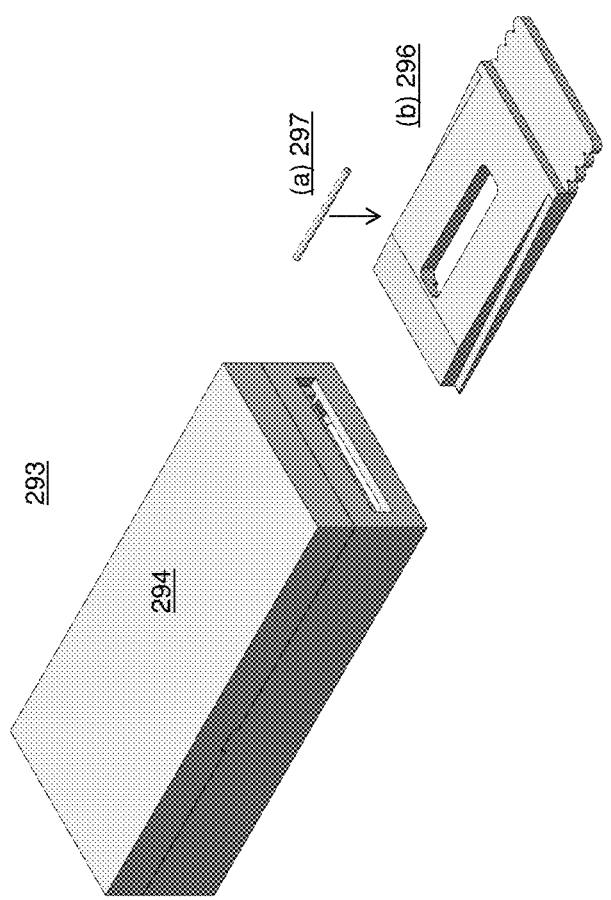

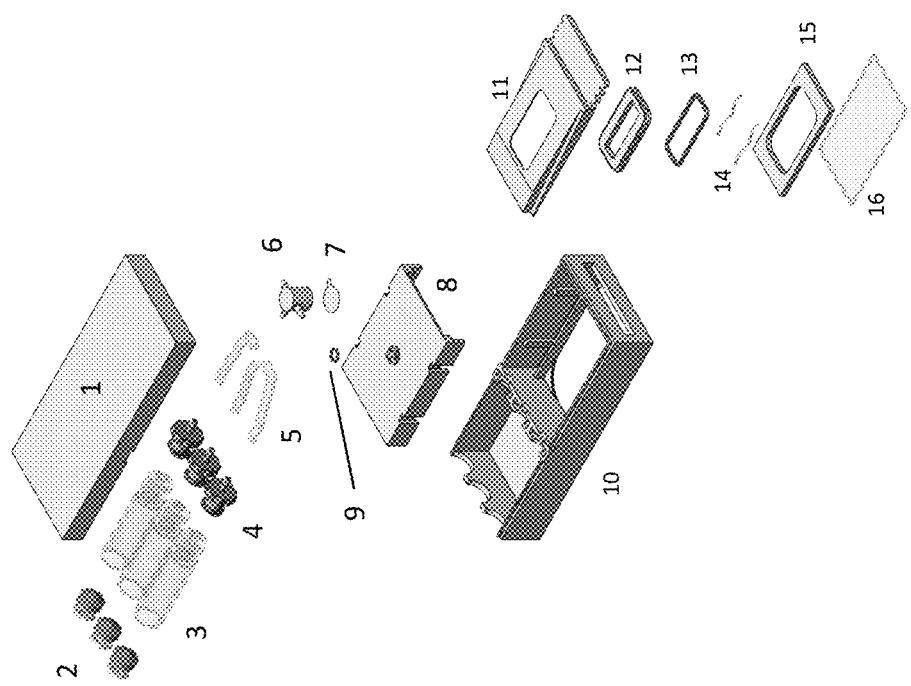

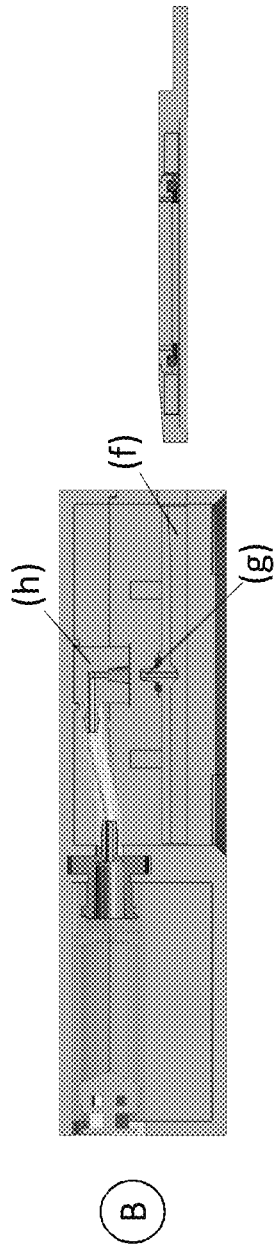
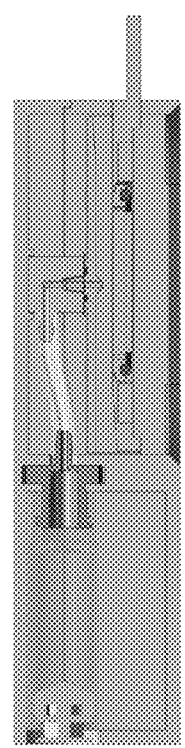
Fig. 6C
Fig. 6D

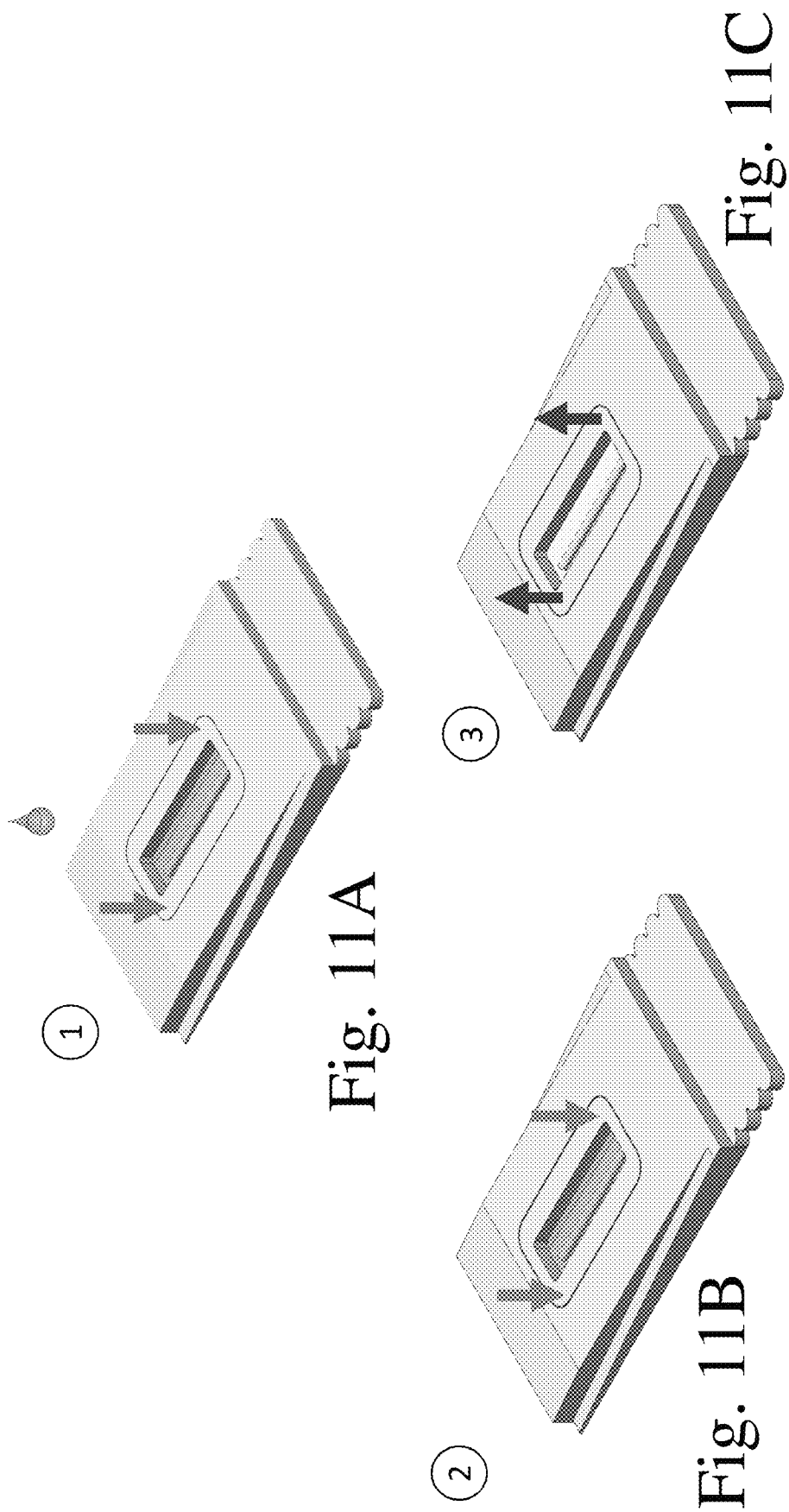

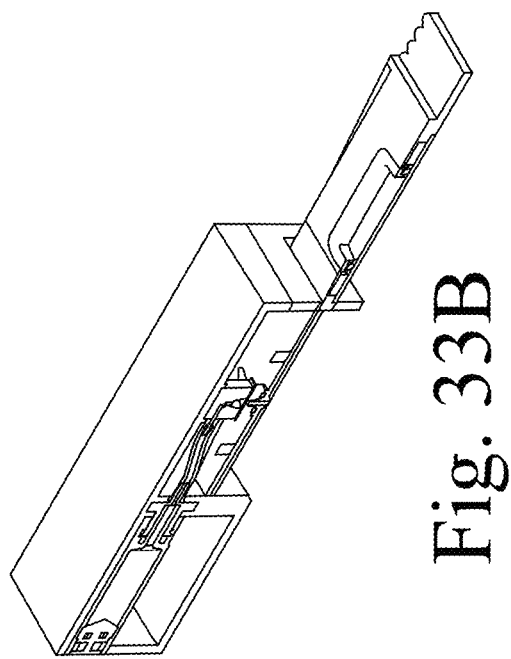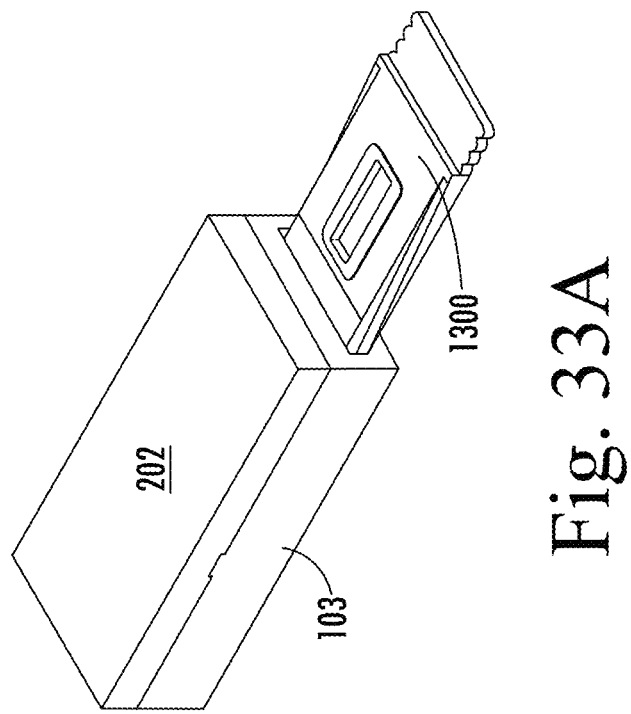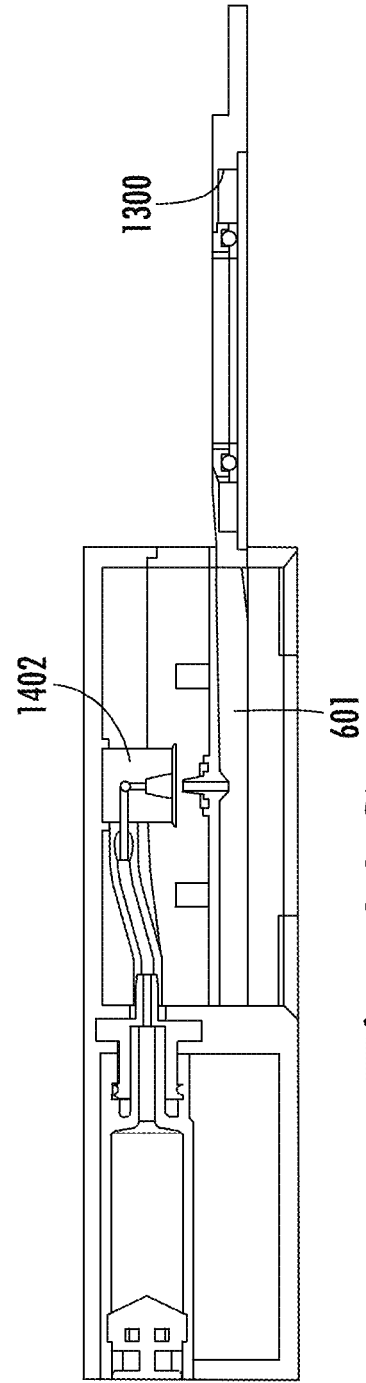

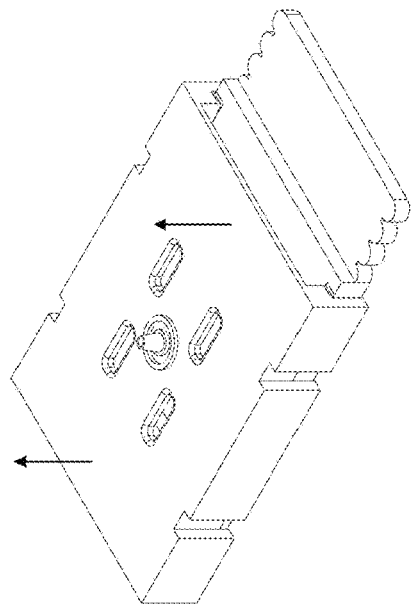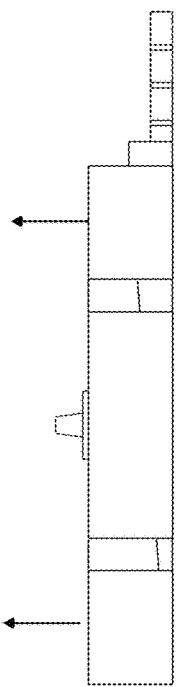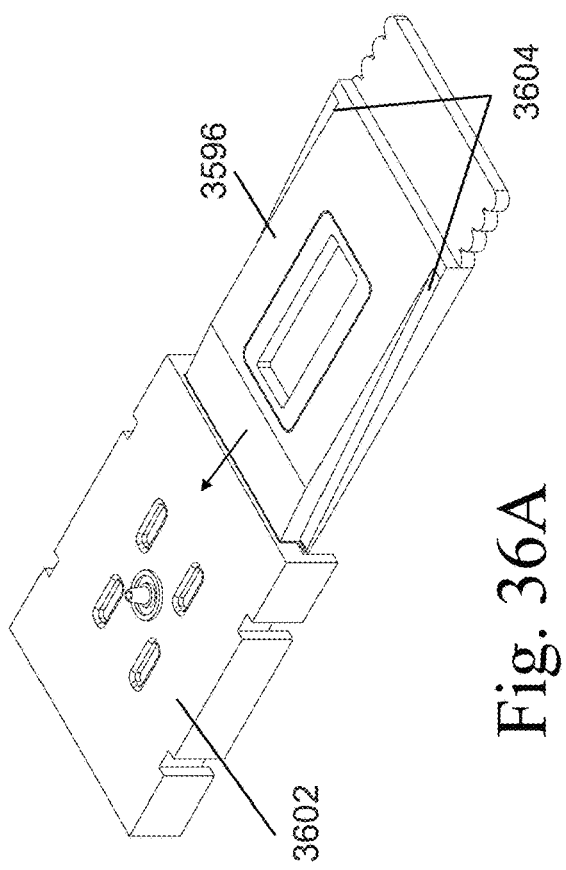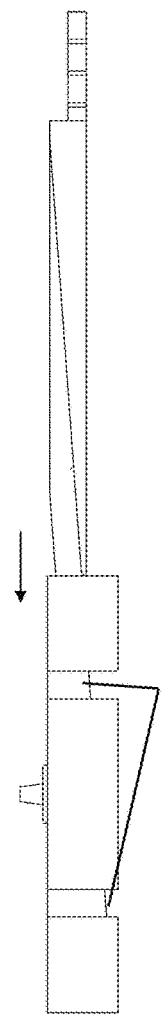
Fig. 36B
Fig. 36D
Fig. 36A
Fig. 36C

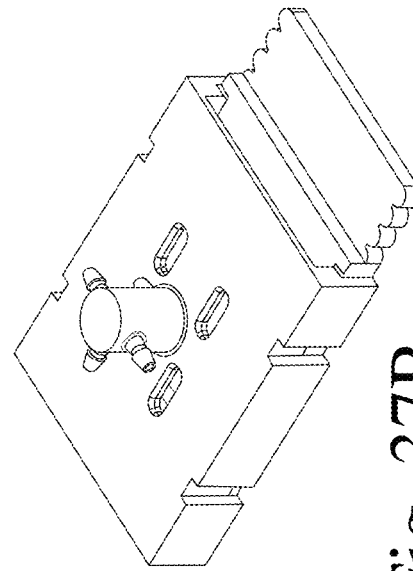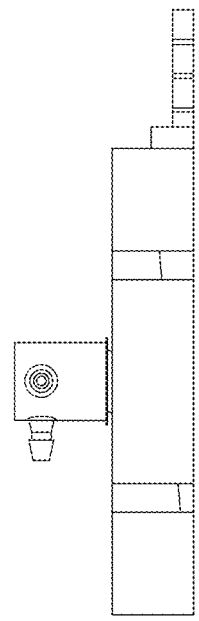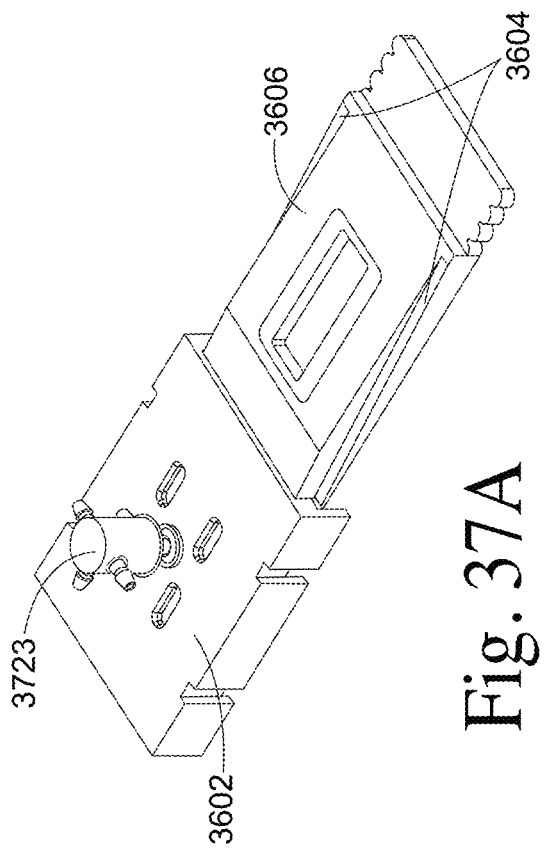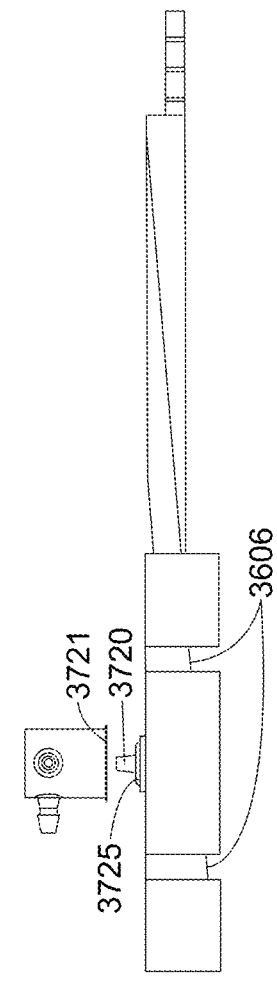
Fig. 37A
Fig. 37B
Fig. 37C
Fig. 37D

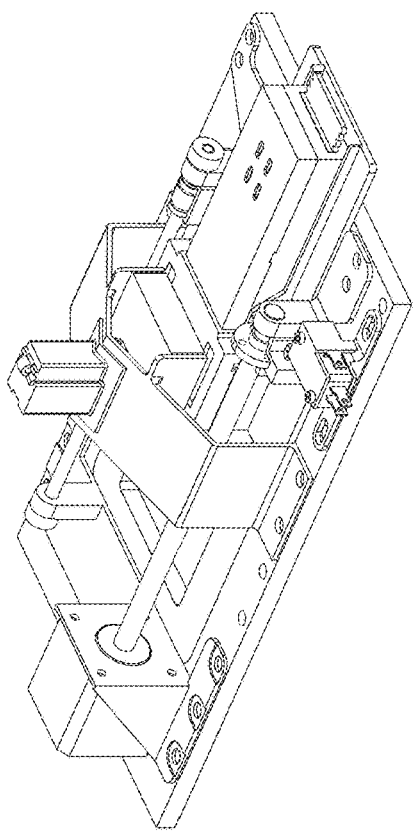
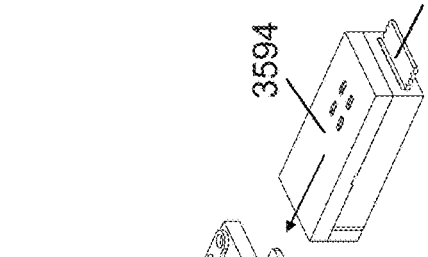
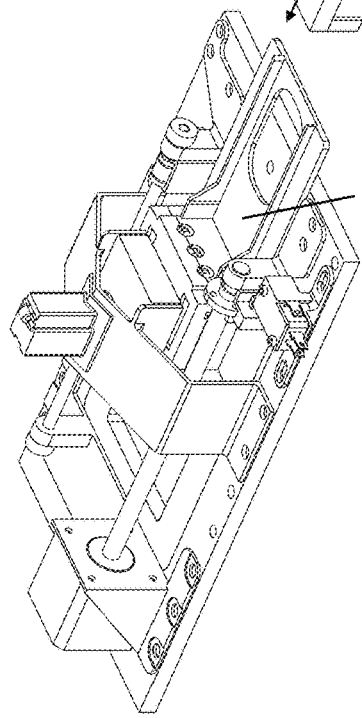
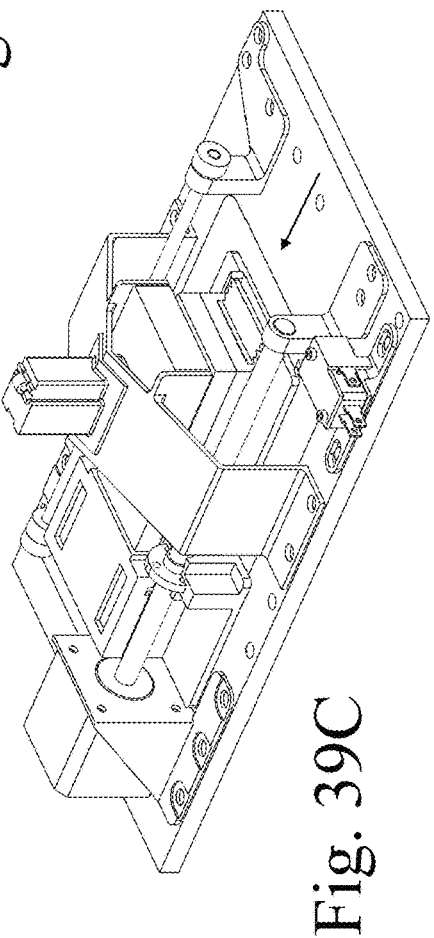
Fig. 39A   Fig. 39B   Fig. 39C

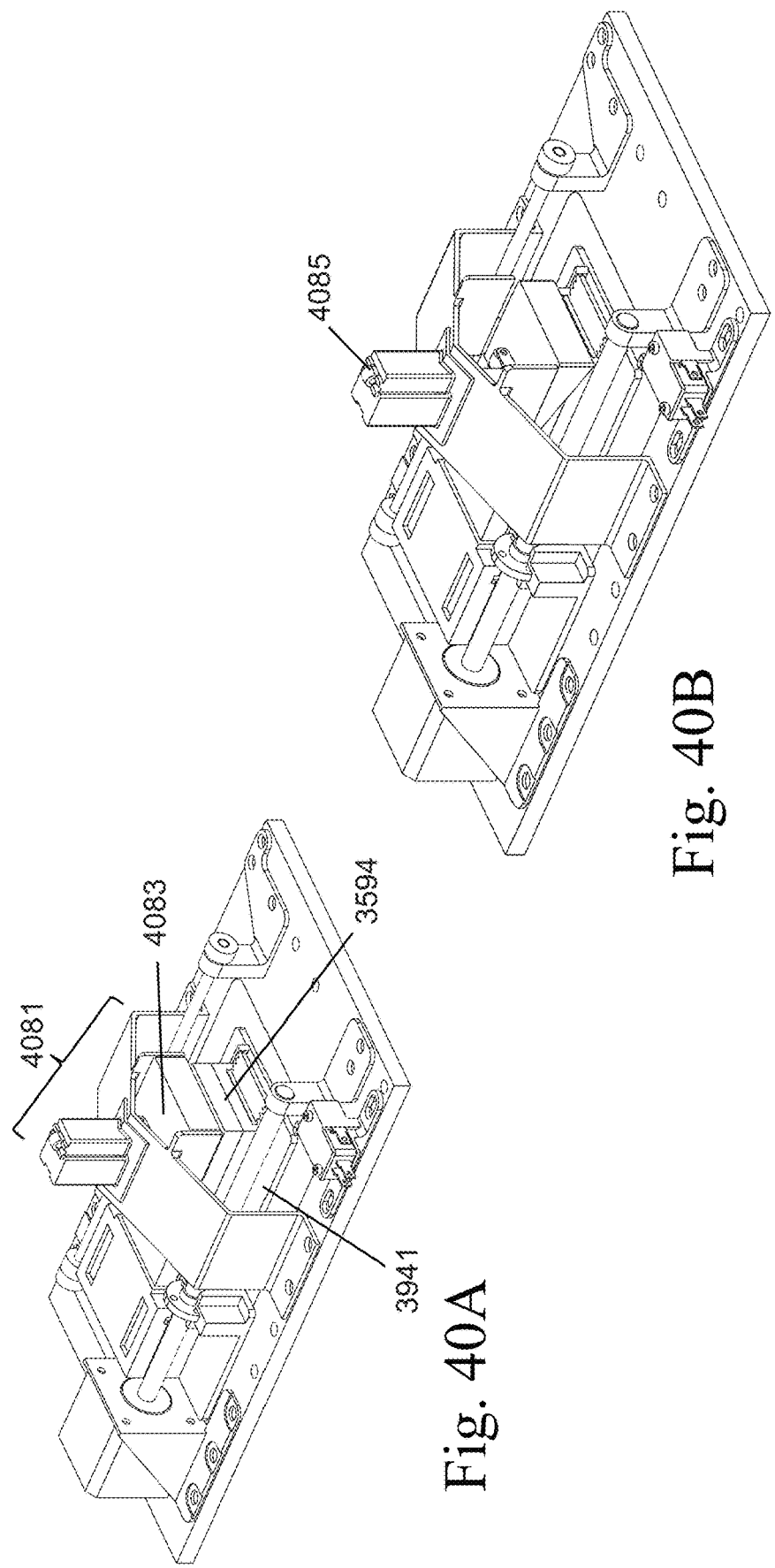

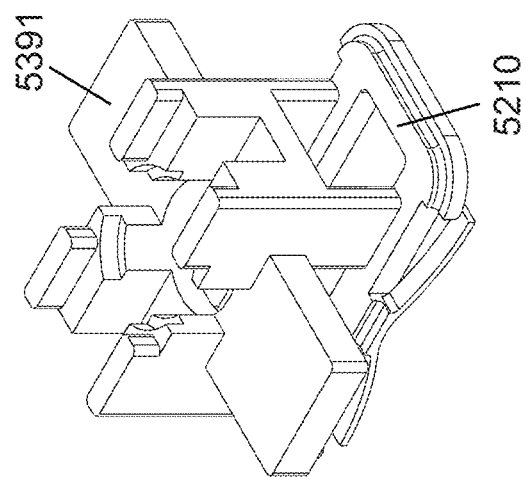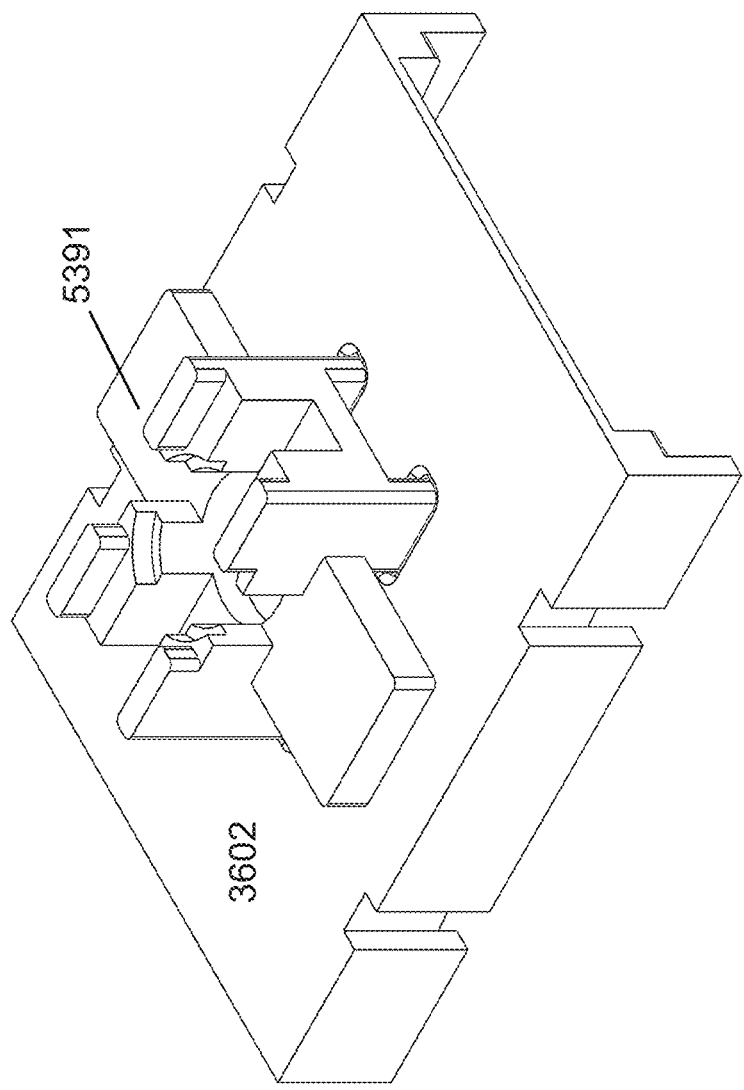
Fig. 42B
Fig. 42A

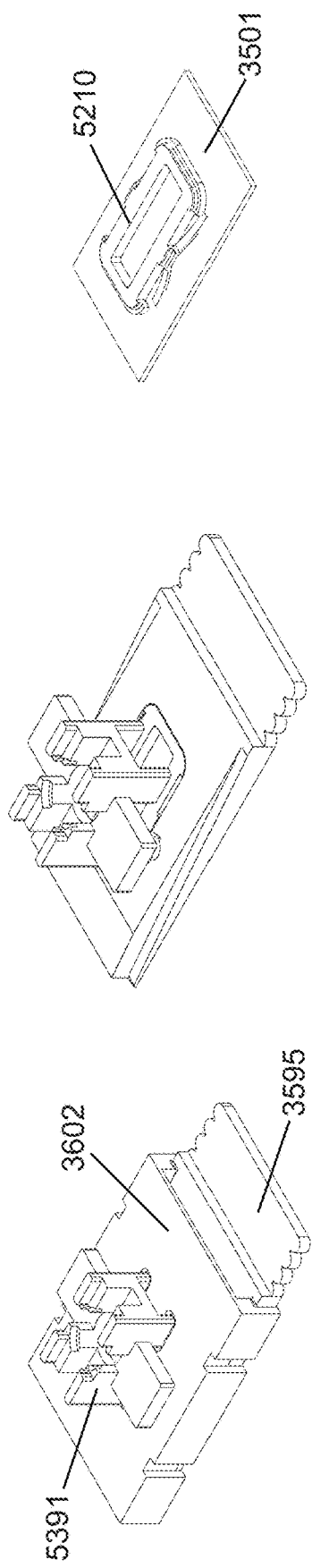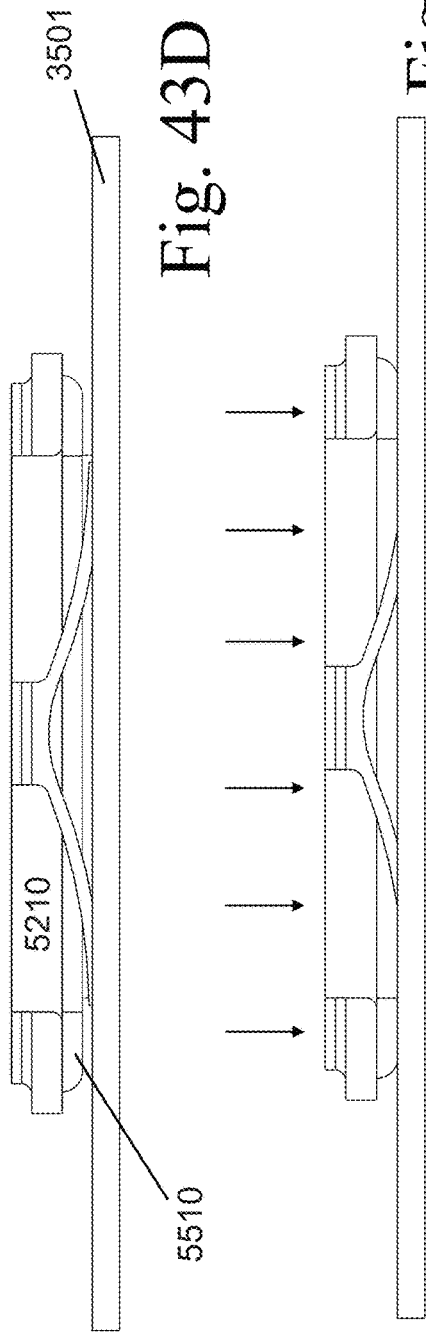
Fig. 43A
Fig. 43B
Fig. 43C
Fig. 43D
Fig. 43E

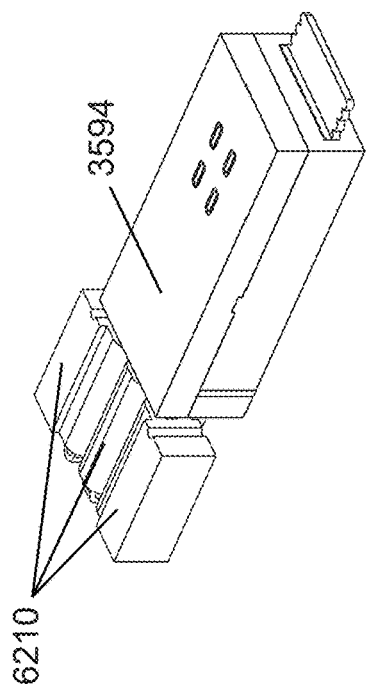
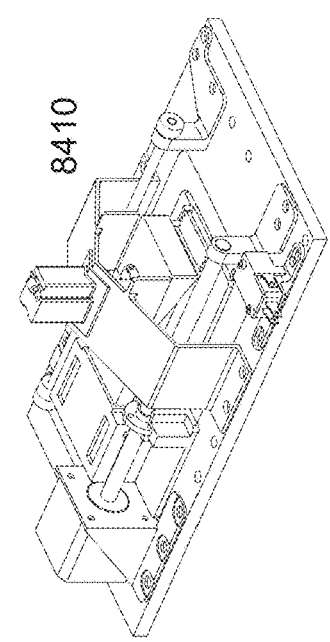
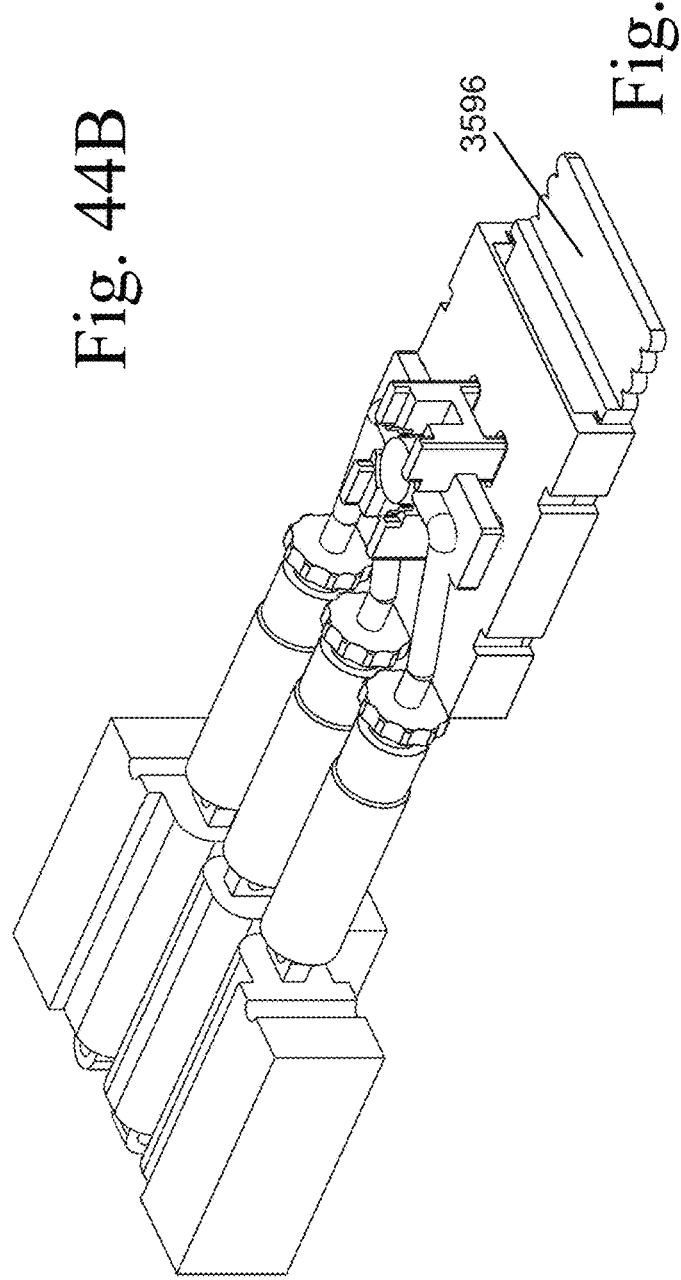
Fig. 44B
Fig. 44C
Fig. 44A

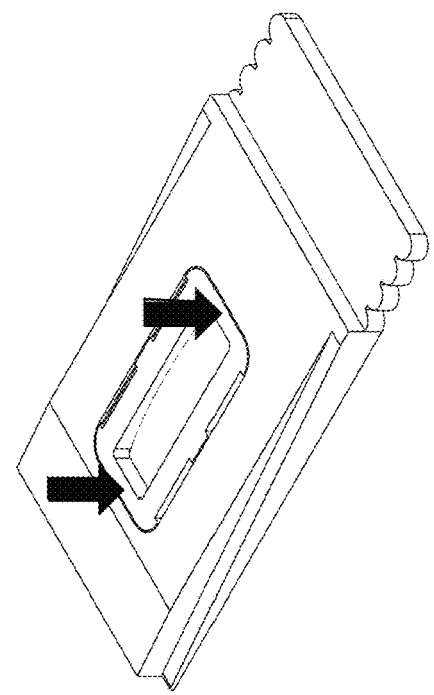
Fig. 45A
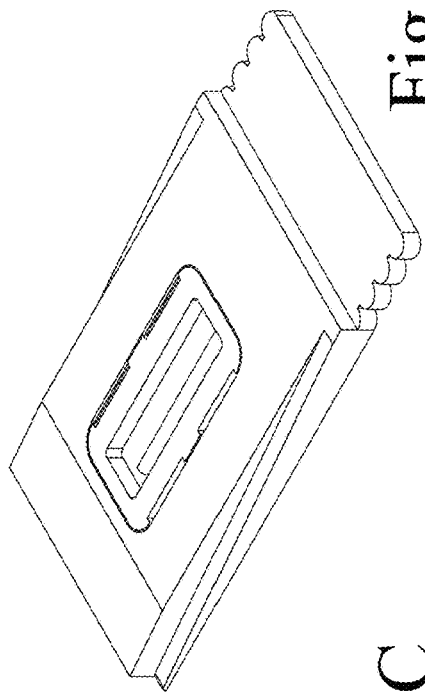
Fig. 45B
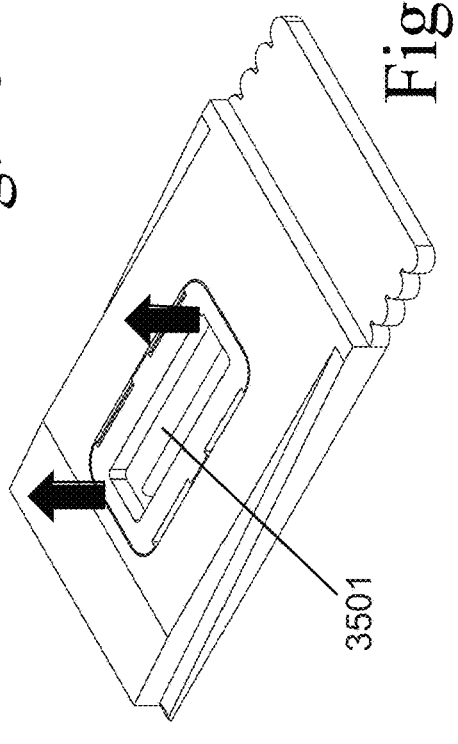
Fig. 45D
Fig. 45C

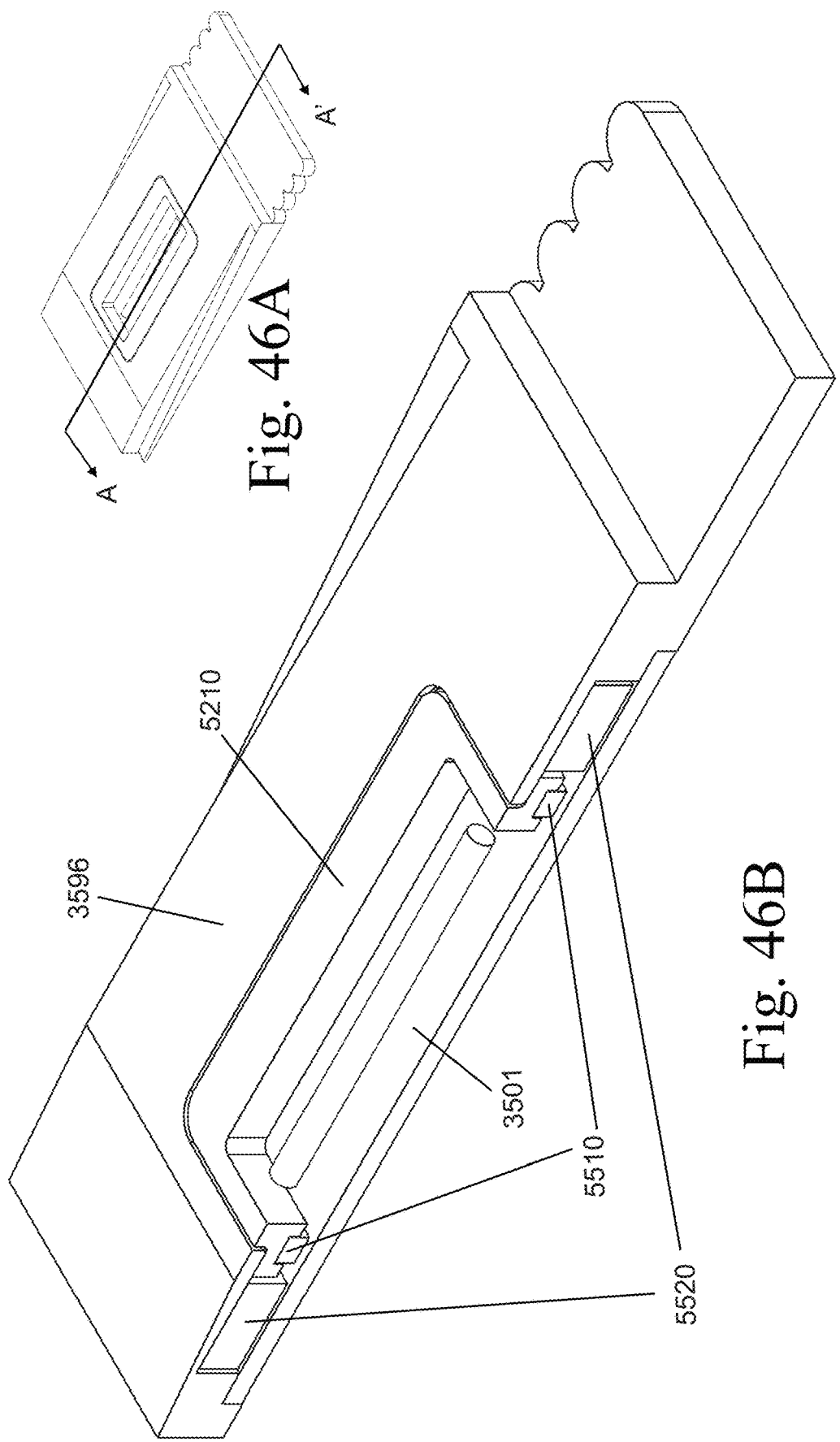

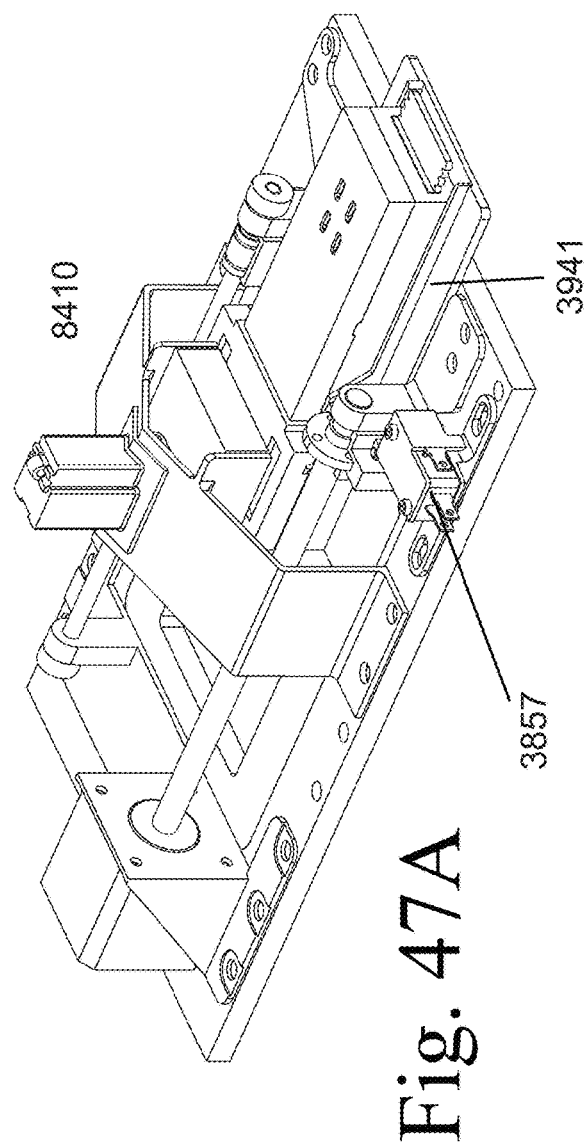
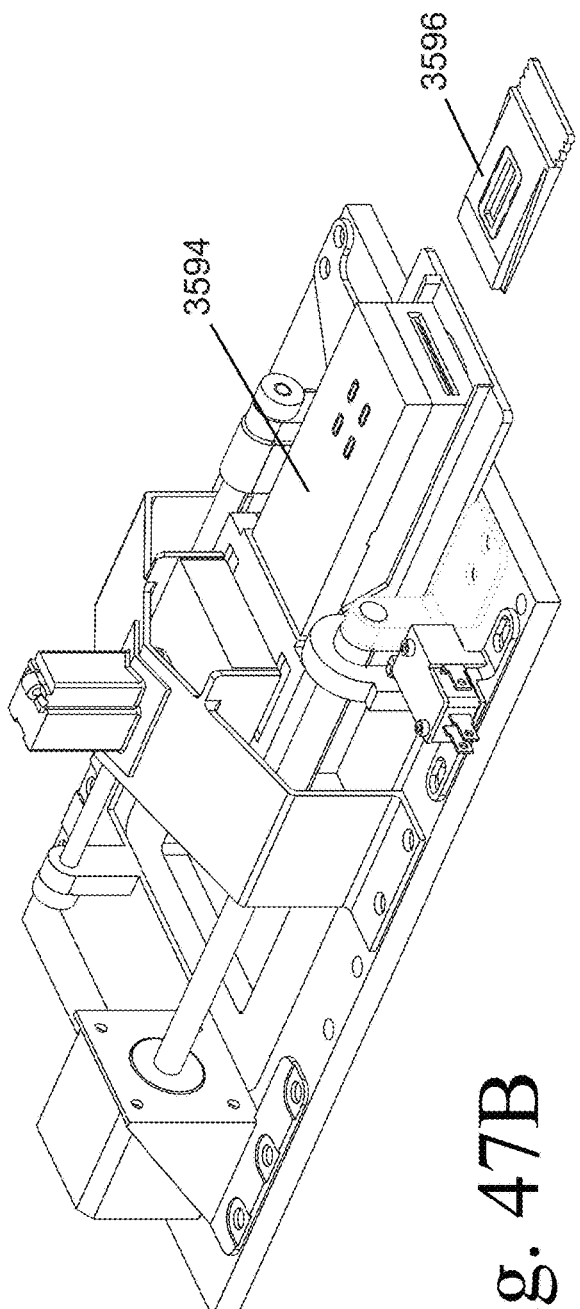
Fig. 47A
Fig. 47B

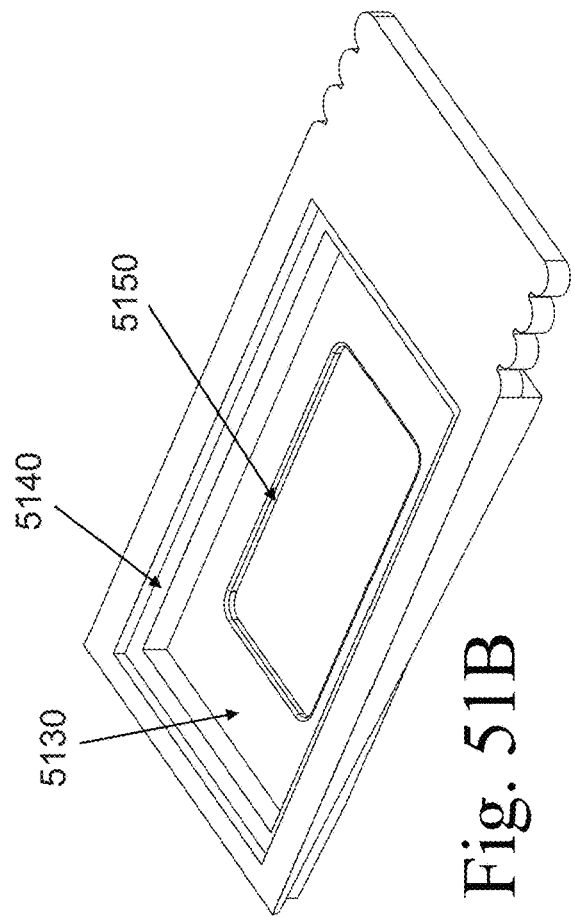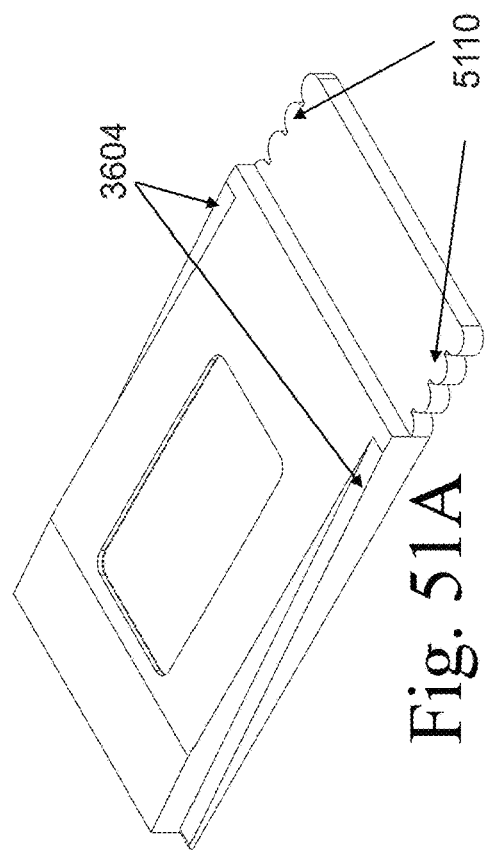
Fig. 51A
Fig. 51B

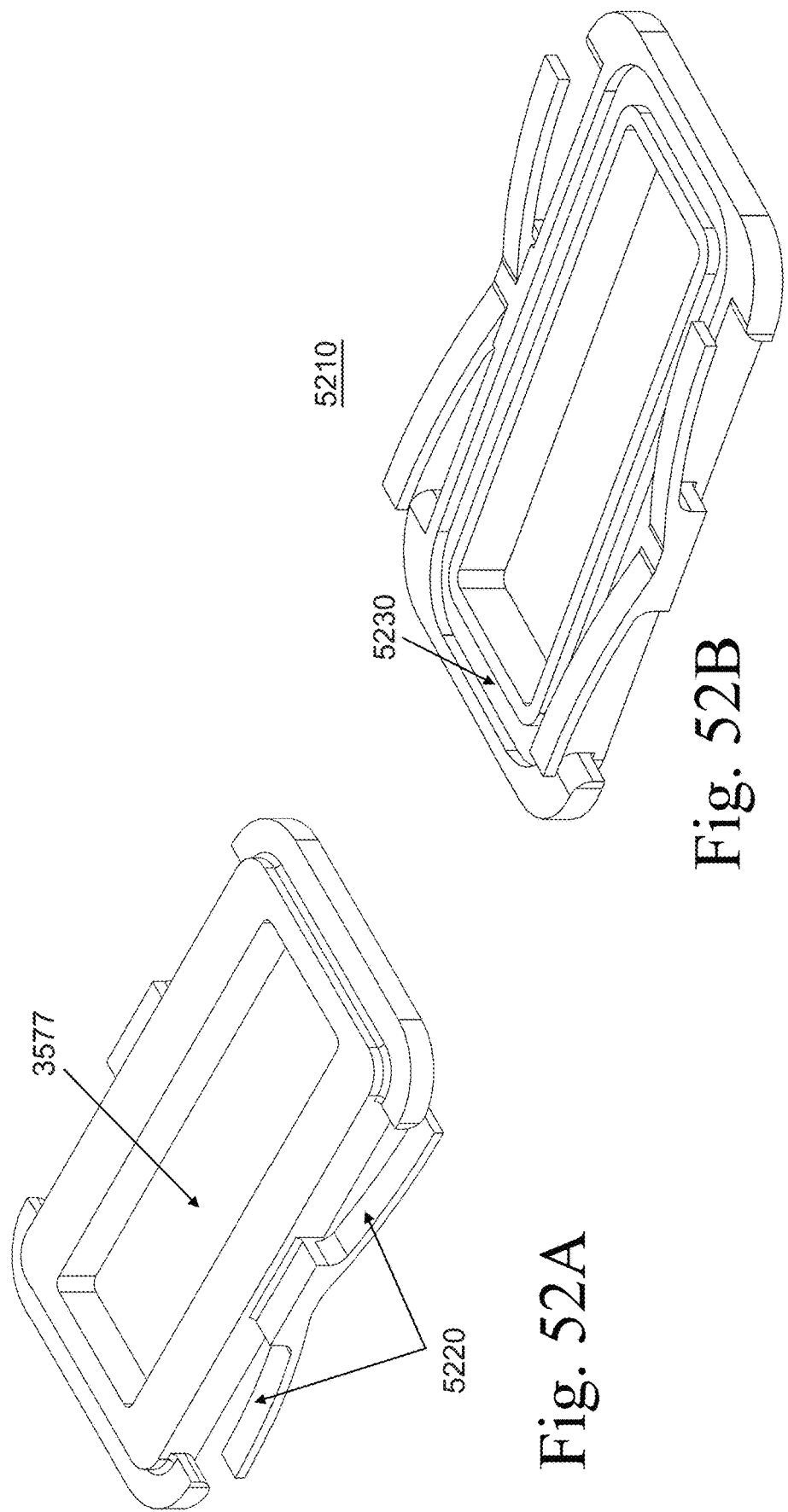

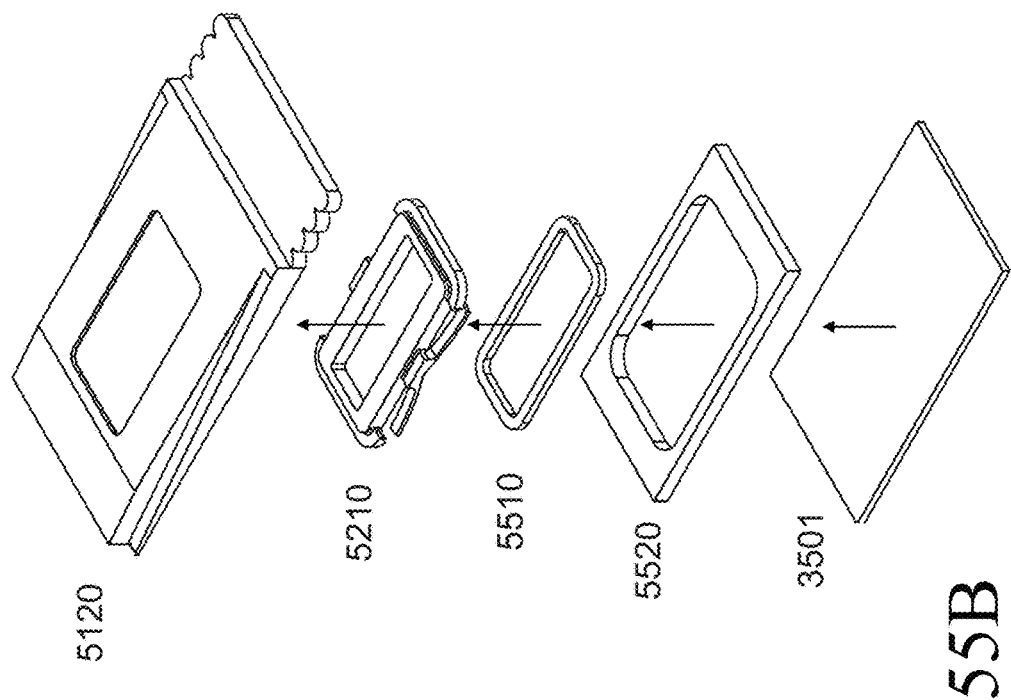
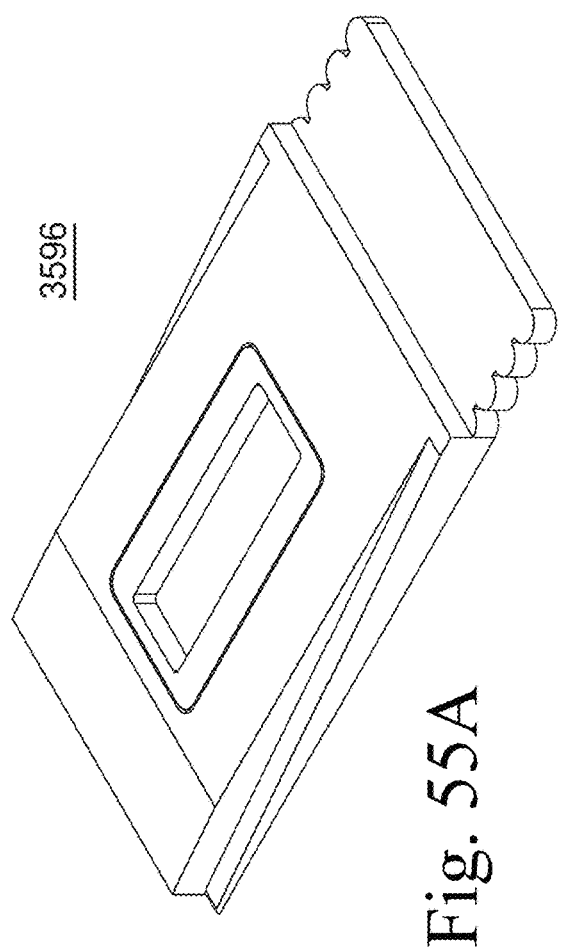
Fig. 55A
Fig. 55B

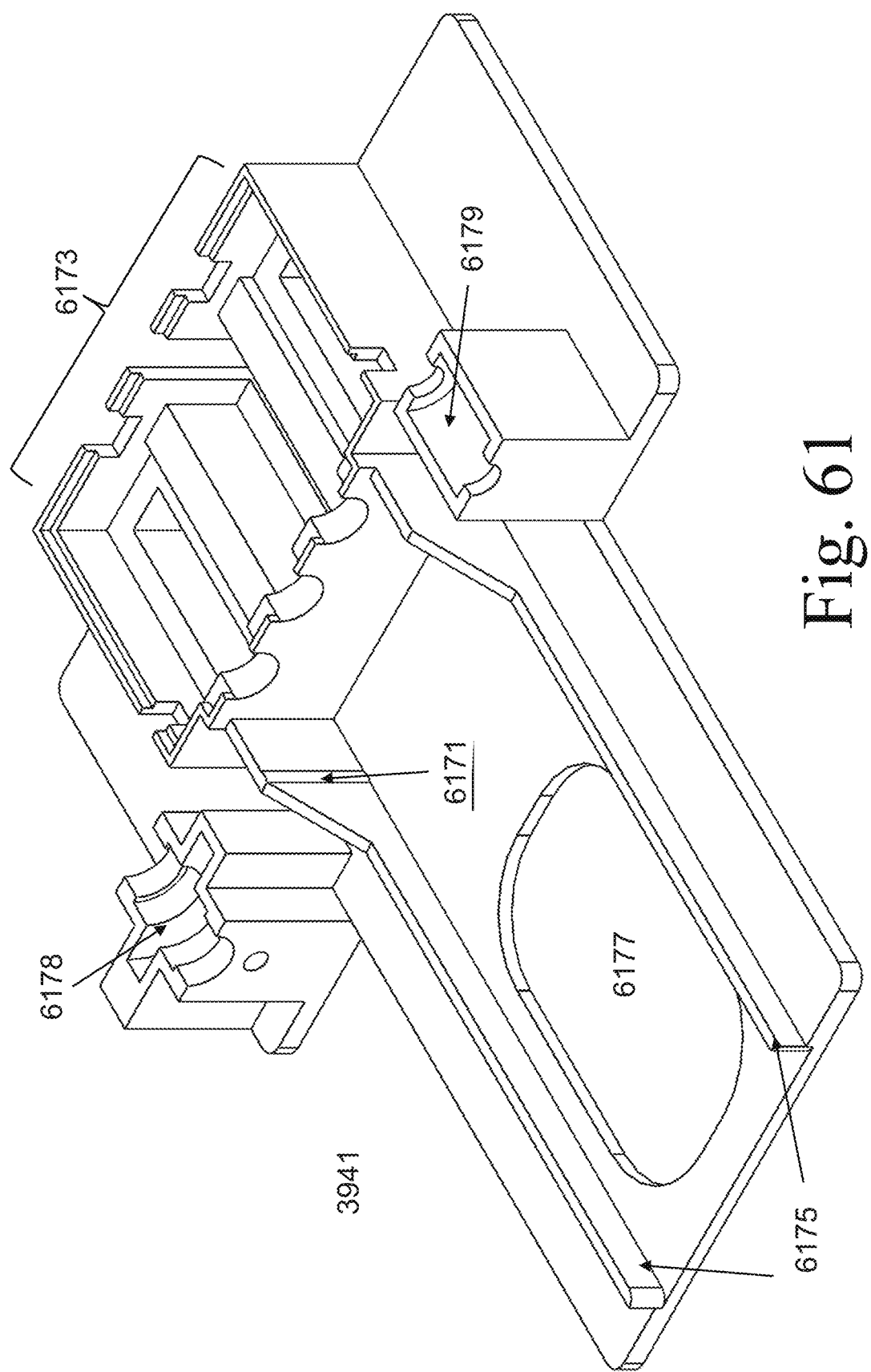

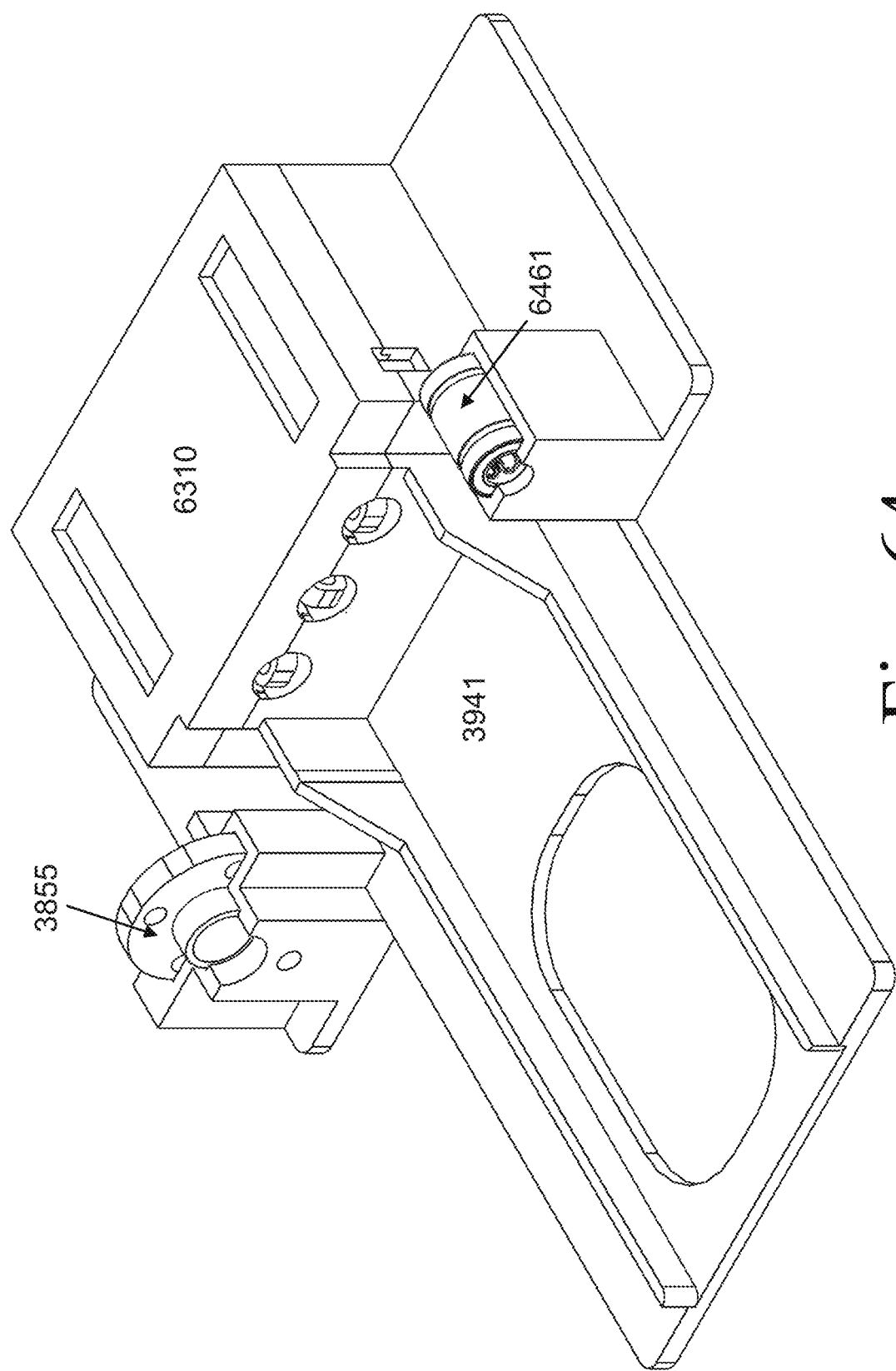

DISPOSABLE BIOPSY STAINING KIT AND RELATED METHODS AND SYSTEMS

CLAIM OF PRIORITY

The present application claims priority to U.S. Provisional Application Ser. No. 62/653,400, filed on Apr. 5, 2018, entitled Biopsy Articles and Methods of Use; and U.S. Provisional Application 62/781,865, filed on Dec. 19, 2018, entitled Disposable Biopsy Staining Kit and Related Methods and Systems, the disclosures of which are hereby incorporated herein by reference as if set forth in their entirety.

FIELD

This present inventive concept relates generally imaging and, more particularly, to microscopic imaging systems and related devices, methods and computer program products.

BACKGROUND

Conventional tools for diagnosing biopsies are generally slow, inefficient and inaccurate. At least a fifth of all patients are called back to repeat a biopsy deemed inadequate. Over seven million biopsies are performed in America each year, thus, a twenty percent failure rate is a very large number of biopsies. The cost associated with the repeat biopsies is over a billion dollars. Improved systems for processing biopsies are desired.

SUMMARY

Some embodiments of the present inventive concept provide a disposable staining system including an insertable module configured to receive a biological sample therein, the insertable module including a well in which the biological sample is positioned; and a staining cartridge configured to receive the insertable module including the biological sample therein, the insertable module being positioned in the staining cartridge. The insertable module has first and second inclined planes on opposing sides of an upper surface of the insertable module. A sled configured to receive the insertable module has corresponding first and second inclined planes on a bottom surface thereof. The first and second inclined planes of the insertable module and the first and second inclined planes of the sled are configured to transform horizontal movement of the insertable module into the staining cartridge into a vertical movement of the sled such that the sled is pushed upward.

In further embodiments, the insertable module may further include an imaging window and an absorbent material. The absorbent material may be configured to wick away stain from the imaging window.

In still further embodiments, the staining cartridge including the insertable module may be positioned in a microscope system using a motorized mechanism.

In some embodiments, the staining cartridge including the insertable module may be held in place in the microscope system using a clamp assembly, the clamp assembly pressing a spring seal clamp down sealing an area around the biological sample allowing stain to accumulate.

In further embodiments, the staining cartridge may be configured to promote movement of stain onto the biological material in the well of the insertable module. T In still further embodiments, the staining cartridge may further include a top shell and a bottom shell. The stain storage assembly may be configured to be positioned in one of the top shell and the bottom shell to provide the stain to the biological sample in the well of the insertable module.

In some embodiments, a piercing barb on an upper surface of the sled may be configured to puncture a stain manifold seal of the stain storage assembly in the staining cartridge such that the stain is dropped into the well while a spring seal is pressed down, sealing an area around the biological sample and allowing the stain to accumulate.

In further embodiments, the stain in the stain storage assembly may be configured to provide at least one of stain and wash solutions for a plurality of biological samples.

In still further embodiments, the biological sample may be one of a processed sample and unprocessed sample.

In some embodiments, the biological sample may be one or more of tissue, cells and a biopsy of tissue or cells.

Further embodiments of the present inventive concepts provide a system for obtaining a digital image of a biological sample, the system including an insertable module configured to receive a biological sample therein, the insertable module including a well in which the biological sample is positioned; a staining cartridge configured to receive the insertable module having the biological sample therein, the insertable module being positioned in the staining cartridge; a stage adapter configured to receive the staining cartridge including the biological sample, wherein the biological sample receives stain while in the staining cartridge to provide a stained sample; and an imaging system to obtain a digital image of the stained sample while positioned in the stage adapter.

BRIEF DESCRIPTION OF THE DRAWINGS

FIGS. 2A through 2C are diagrams illustrating the staining/imaging chamber and an insert of a disposable module in accordance with some embodiments of the present inventive concept.

FIG. 4 is an exploded view of the staining/imaging chamber including an insert in accordance with some embodiments of the present inventive concept.

FIG. 6C is a cross section along the line B of FIG. 6A of the insert in accordance with some embodiments of the present inventive concept.

FIG. 6D is a cross section along the line C of FIG. 6B of the insert in accordance with some embodiments of the present inventive concept.

FIGS. 11A through 11E are diagrams illustrating the insert and spring seal mechanism in accordance with some embodiments of the present inventive concept.

FIGS. 33A through 33C are diagrams illustrating an isometric view that shows a cross section of the disposable and ramped insert prior to the insert being placed in accordance with some embodiments of the present inventive concept.

FIG. 36A is an isometric view illustrating the relative positions of the sled and biopsy insert prior to placing the biopsy insert 3596 into the staining cartridge in accordance with some embodiments of the present inventive concept.

FIG. 36B is a diagram illustrating the relative positions of the sled and the biopsy insert after the biopsy insert has been placed in the staining cartridge in accordance with some embodiments of the present inventive concept.

FIG. 36C is a side view of FIG. 36A illustrating the relative positions of the sled and biopsy insert prior to the biopsy insert 3596 being placed in the staining cartridge in accordance with some embodiments of the present inventive concept.

FIG. 36D is a side view of FIG. 36B illustrating the relative positions of a sled and biopsy insert after the biopsy insert has been placed in the staining cartridge in accordance with some embodiments of the present inventive concept.

FIG. 37A is a diagram illustrating relative positions of the sled, biopsy insert and stain manifold prior to the biopsy insert being placed in the staining cartridge in accordance with some embodiments of the present inventive concept.

FIG. 37B is a diagram illustrating the relative positions of the sled, biopsy insert and stain manifold after the biopsy insert is placed in the staining cartridge in accordance with some embodiments of the present inventive concept.

FIG. 37C is a side view of FIG. 37A illustrating the relative positions of the sled, biopsy insert and stain manifold prior to the biopsy insert being placed in the staining cartridge in accordance with some embodiments of the present inventive concept.

FIG. 37D is a side view of FIG. 37B illustrating relative positions of the sled, biopsy insert and stain manifold after the biopsy insert is placed in the staining cartridge in accordance with some embodiments of the present inventive concept.

FIGS. 39A through 39C are diagrams of the staining cartridge 3594, the biopsy insert 3596 and the carriage 3941 in various stages in accordance with embodiments of the present inventive concept.

FIG. 40A is a diagram. illustrating carriage in the fully retracted position prior to the clamp mechanism assembly deploying the cartridge clamp in accordance with some embodiments of the present inventive concept.

FIG. 40B is a diagram of the carriage in the fully retracted position and the cartridge clamp deployed by the cartridge clamp linear servo in accordance with some embodiments of the present inventive concept.

FIG. 42A is a diagram illustrating relative positions of the spring seal stamp and the sled in accordance with some embodiments of the present inventive concept.

FIG. 42B is a diagram illustrating relative positions of the spring seal stamp and the spring seal in accordance with some embodiments of the present inventive concept.

FIG. 43A is a diagram illustrating orientation between the biopsy insert, the sled and the spring seal stamp in accordance with some embodiments of the present inventive concept.

FIG. 43B is a diagram illustrating orientation between the biopsy insert and the spring seal stamp in accordance with some embodiments of the present inventive concept.

FIG. 43C is a diagram illustrating orientation between the spring seal and the imaging window of the biopsy insert in accordance with some embodiments of the present inventive concept.

FIG. 43D is a side view of the orientation between the spring seal, spring seal gasket and imaging window prior to the spring seal stamp pushing down on the spring seal in accordance with some embodiments of the present inventive concept.

FIG. 43E is a side view illustrating orientation between the spring seal, spring seal gasket, and imaging window after the spring seal stamp pushes down on the spring seal in accordance with some embodiments of the present inventive concept.

FIG. 44A is a diagram illustrating a stage adapter assembly 8410 with staining cartridge in place and carriage fully retracted in accordance with some embodiments of the present inventive concept.

FIG. 44B is a diagram illustrating orientation between the staining cartridge and the carriage linear servos when the staining cartridge is placed on the carriage in accordance with some embodiments of the present inventive concept.

FIG. 44C is a diagram illustrating orientation between the carriage linear servos and the inner components of the staining cartridge with the biopsy insert in place in accordance with some embodiments of the present inventive concept.

FIG. 45A is a diagram illustrating the biopsy insert with stain being dropped into the biopsy well while the spring seal is pressed down, sealing the area around the biopsy and allowing stain to accumulate in accordance with some embodiments of the present inventive concept.

FIG. 45B is a diagram illustrating the biopsy insert while the biopsy is being stained in accordance with some embodiments of the present inventive concept.

FIG. 45C is a diagram illustrating the biopsy insert after the staining time has elapsed and the spring seal is released in accordance with some embodiments of the present inventive concept.

FIG. 45D is a diagram illustrating the biopsy insert after the stain is removed from the imaging window in accordance with some embodiments of the present inventive concept.

FIG. 46A is a diagram of a biopsy insert in accordance with some embodiments of the present inventive concept.

FIG. 46B is a cross-section of the biopsy insert along the line A-A' of FIG. 46A in accordance with some embodiments of the present inventive concept.

FIG. 47A is a diagram of the stage adapter assembly with the carriage fully extended in accordance with some embodiments of the present inventive concept.

FIG. 47B is a diagram illustrating the stage adapter assembly with the carriage fully extended and the biopsy insert removed from the staining cartridge in accordance with some embodiments of the present inventive concept.

FIGS. 48 through 60C are diagrams illustrating details with respect to the disposable component in accordance with some embodiments of the present inventive concept.

FIGS. 61 through 78 are diagrams illustrating details with respect to the stage adapter in accordance with some embodiments of the present inventive concept.

DETAILED DESCRIPTION

Figure 1:
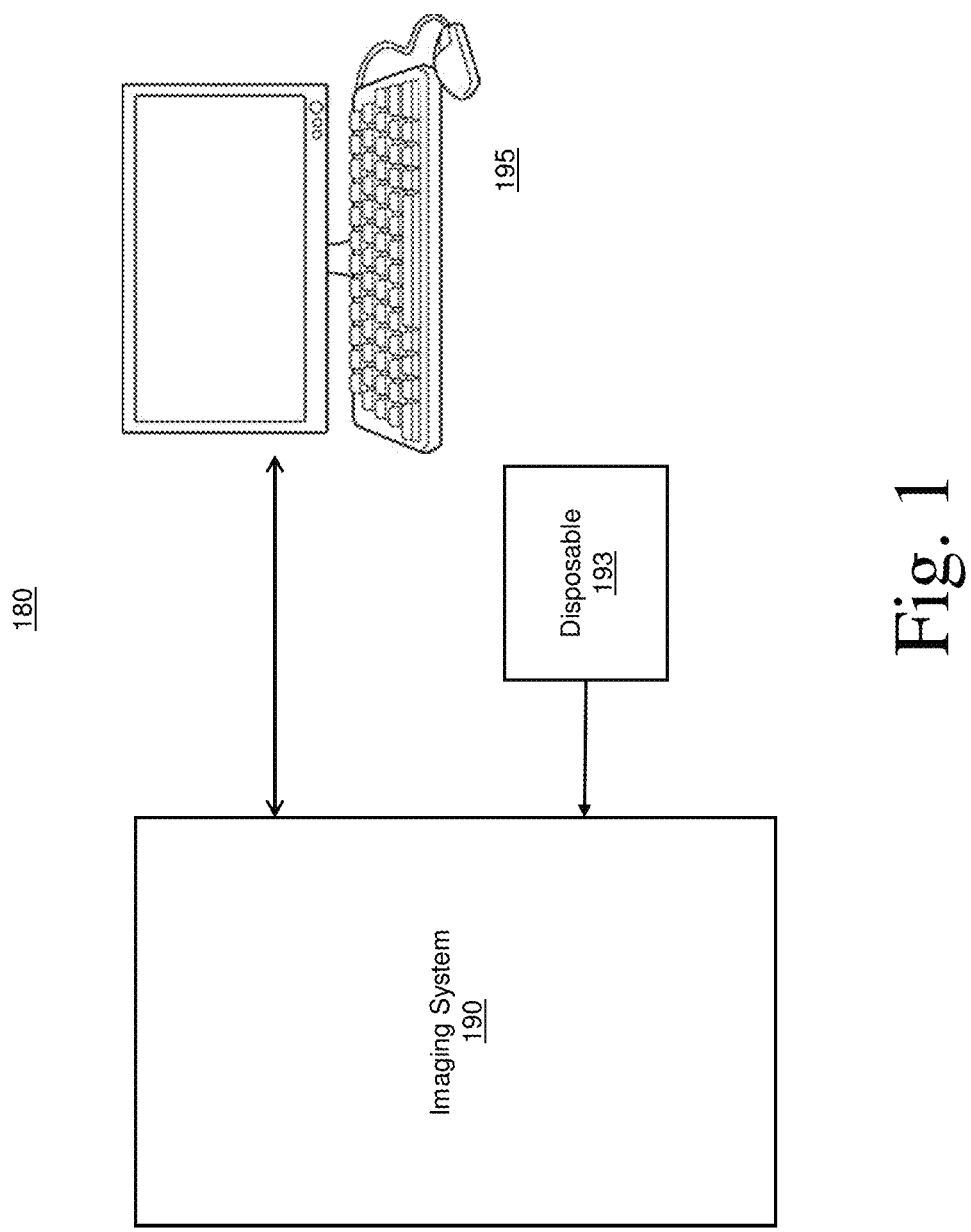
FIG. 1 is a block diagram of a three-component system in accordance with some embodiments of the present inventive concept.

The present inventive concept will be described more fully hereinafter with reference to the accompanying figures, in which embodiments of the inventive concept are shown. This inventive concept may, however, be embodied in many alternate forms and should not be construed as limited to the embodiments set forth herein.

Accordingly, while the inventive concept is susceptible to various modifications and alternative forms, specific embodiments thereof are shown by way of example in the drawings and will herein be described in detail. It should be understood, however, that there is no intent to limit the inventive concept to the particular forms disclosed, but on the contrary, the inventive concept is to cover all modifications, equivalents, and alternatives falling within the spirit and scope of the inventive concept as defined by the claims. Like numbers refer to like elements throughout the description of the figures.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components, but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to another element, there are no intervening elements present. As used herein the term "and/or" includes any and all combinations of one or more of the associated listed items and may be abbreviated as "/".

Unless otherwise defined, all terms (including technical and scientific terms) used herein have the same meaning as commonly understood by one of ordinary skill in the art to which this inventive concept belongs. It will be further understood that terms used herein should be interpreted as having a meaning that is consistent with their meaning in the context of this specification and the relevant art and will not be interpreted in an idealized or overly formal sense unless expressly so defined herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure. Although some of the diagrams include arrows on communication paths to show a primary direction of communication, it is to be understood that communication may occur in the opposite direction to the depicted arrows.

As discussed above, conventional tools for diagnosing biopsies are generally slow, inefficient and inaccurate. At least a fifth of all patients are called back to repeat a biopsy deemed inadequate. Accordingly, some embodiments of the present inventive concept provide a system for rapid on-site evaluation (ROSE) of biological tissues that improves speed, efficiency and accuracy of biopsies. Some embodiments of the present inventive concept greatly reduce the number of repeat biopsies needed, save costs associated with personnel and rooms and may greatly increase revenue associated with biopsy procedures as will be discussed further herein with respect to FIGS. 1 through 34.

As used herein, a "biopsy" refers to an examination of tissue or cells removed from a living body to discover the presence, cause, or extent of a disease. The tissue or cells may be human or animal tissue without departing from the scope of the present inventive concept. For the purposes discussed herein, biopsies may be used for patient case as well as research without departing from the scope of the present inventive concept. Furthermore, "biopsies" as used herein is intended to include any biological material for staining in accordance with embodiments discussed herein. Thus, even biological material not obtained in an official "biopsy" is intended to be included in the term "biopsy."

Furthermore, various embodiments of the present inventive concept are discussed herein with respect to an "insert." The insert is positioned in a housing used to stain the material placed in the insert. In some embodiments, the "insert" is termed a "biopsy insert." However, it will be understood that embodiments of the present inventive concept are not limited to biopsy insert. Any material may be placed in the insert that is capable of being "stained" in accordance with embodiments of the present inventive concept without departing from the scope of the present inventive concept. In some embodiments, the material is a biological material including at least some cells.

Referring first to FIG. 1, a high-level block diagram of a system in accordance with embodiments of the present inventive concept will be discussed. As illustrated in FIG. 1, the system 180 includes a hardware component 190, a disposable component 193 and a software component 195. As shown, the hardware component comprises an imaging system that delivers high quality digital images of whole biopsies without destruction at subcellular resolution. The imaging system may include a digital microscope as well as other components. The imaging system may use methods and systems discussed in United States Patent Publication No. 2016/0062098 entitled *Microscopy of a Tissue Sampling Using Structured Illumination* to Brown, the content of which is hereby incorporated herein by reference as if set forth in its entirety. Brown discusses use of structured illumination microscopy to generate digital histology images of fresh tissues stained by fluorescent dyes. These methods may be used in embodiments of the present inventive concept.

The software component 195 may include processors and algorithms to provide a centralized telepathy evaluation user experience. Thus, the software component 195 is capable of evaluating the biopsies and reporting results in a format that is consumable by a user including users remote from the system 180.

The disposable component 193 enables hands-free tissue processing, which will be discussed further below with respect to FIGS. 2 through 14. Accordingly, systems 180 in accordance with embodiments discussed herein provide a user friendly, high resolution imaging system for fresh whole biopsy tissue. Methods provide a one step, accurate ROSE workflow having a 93 percent accuracy, much improved over the conventional 80 percent.

Figure 2C:
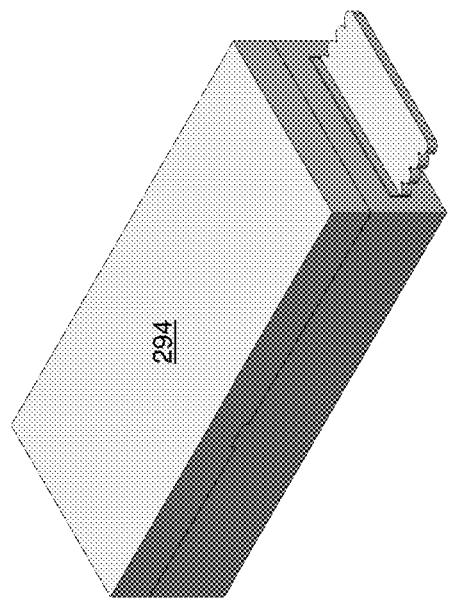
Figure 2B:
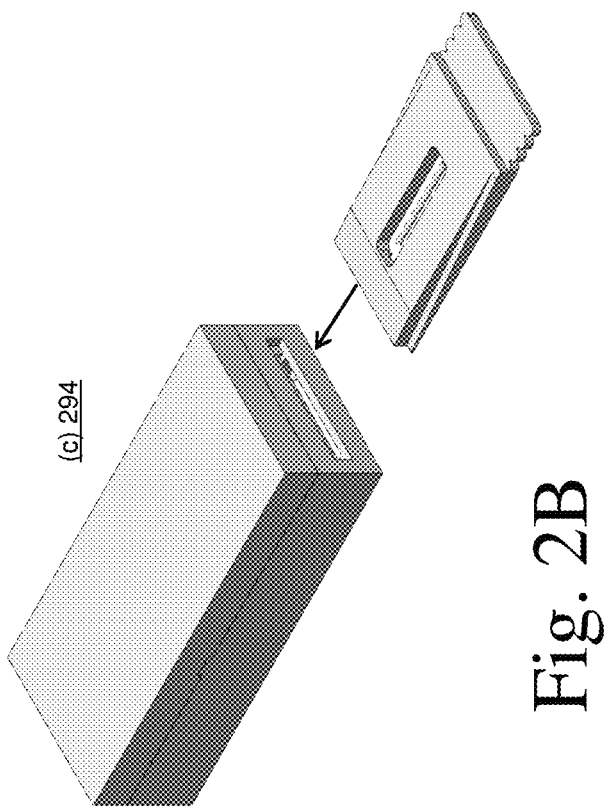

Referring now to FIGS. 2A through 2C, a disposable in accordance with some embodiments of the present inventive concept will be discussed. The disposable 293 includes an insert 296 (*a*) and a staining and imaging chamber 294 (*b*). As illustrated in FIG. 2A, the biopsy (*a*) 297 is placed in the well of the insert 296 (b). In FIG. 2B, the insert 296 is positioned into the staining/imaging chamber 294 (c) and the disposable is ready for placement in system dock in FIG. 2C. The system dock will be discussed further below.

It will be understood that although embodiments of the present inventive concept refer to an insert that receives the biopsy and that the term "insert" implies that it is actually inserted into something, for example, the staining chamber/ carrier, embodiments of the present inventive concept are not limited thereto. For example, embodiments may be envisioned where the mechanism that receives the biopsy may not be inserted into any holder. Thus, the insert may be referred to as "insertable" implying that may or may not be inserted.

Figure 3A:
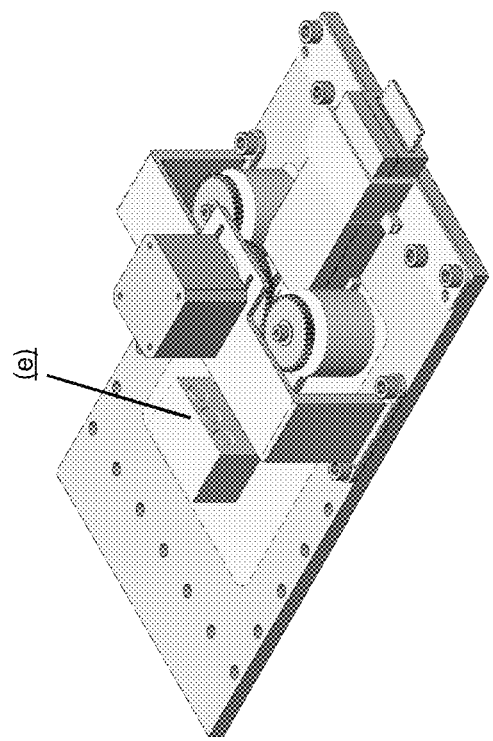
FIGS. 3A through 3E are diagrams illustrating the staining/imaging chamber, the insert and the system dock in accordance with some embodiments of the present inventive concept.
Figure 3B:
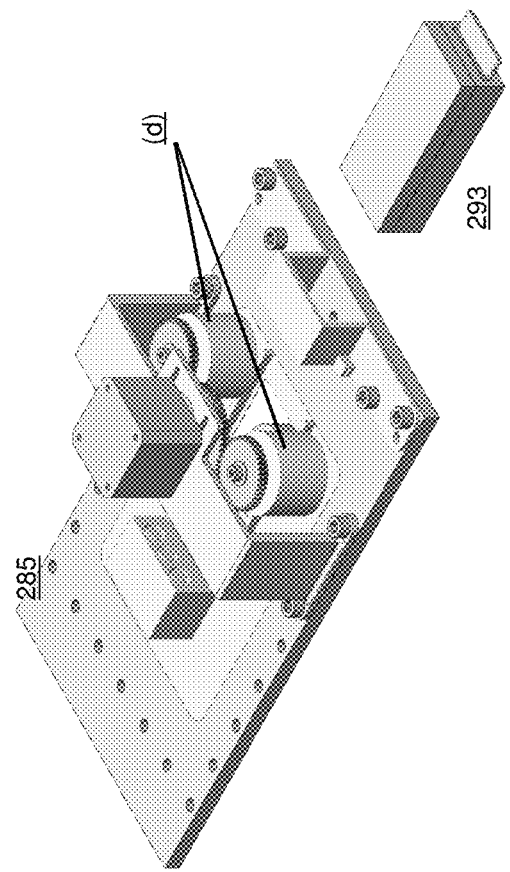
Figure 3D:
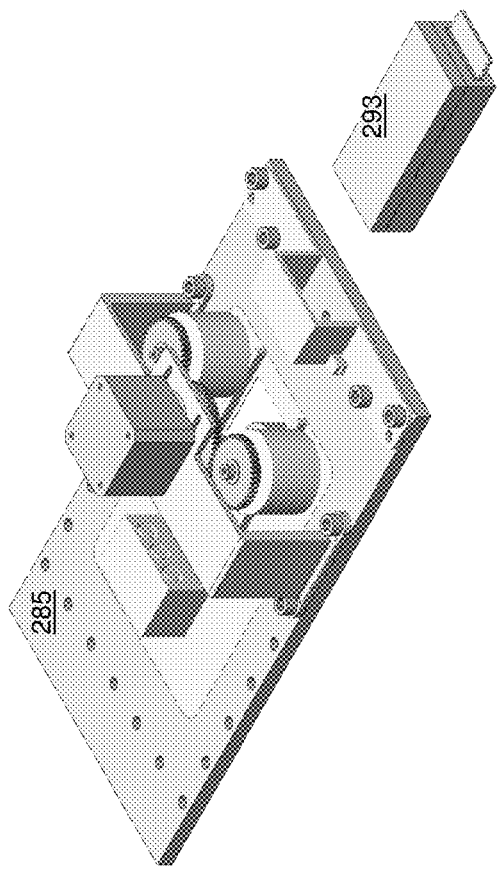
Figure 3C:
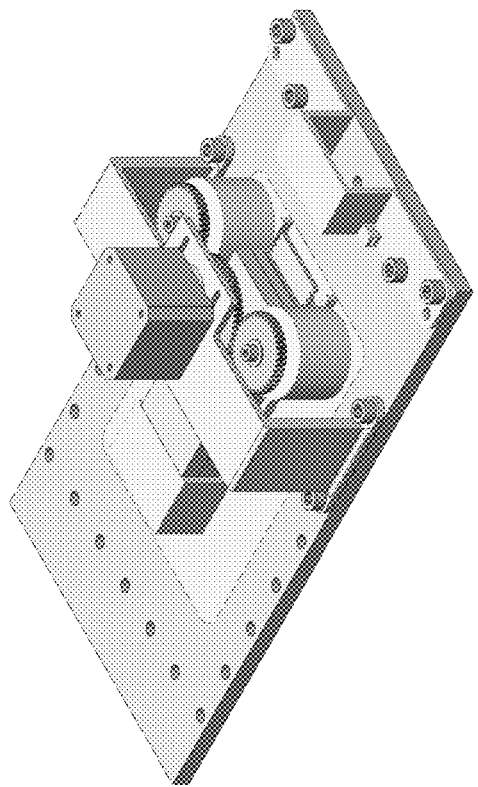

Referring now to FIGS. 3A through 3E, the disposable 293 is placed in the system dock 285 as illustrated in FIG. 3A. Feeder wheels (d) are configured to forward the disposable 293 into place. In some embodiments, a spring seal is pressed down onto the slide, creating a seal. Stain-containing syringes located within in the disposable 293 are actuated by linear motors housed on the stage (e) as shown in FIG. 3B, pushing stain onto the biopsy tissue. The force pushing the spring seal is released, allowing stain to be removed from the imaging window. The stage is stepped in a serpentine pattern over the objective lens of the microscope as the tissue is imaged as illustrated in FIG. 3C.

Figure 3E:
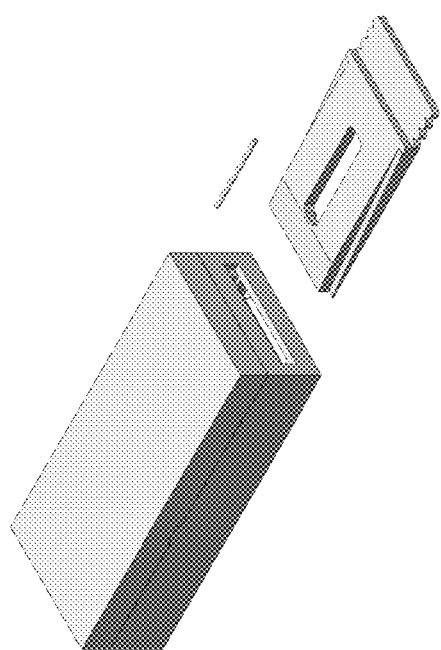

After imaging, the feeder wheels are reversed as illustrated in FIG. 3D, and the disposable 293 is removed from the system dock 285. The insert is removed from the disposable 293 as illustrated in FIG. 3E. The biopsy is removed from the insert. The insert is discarded, and the biopsy is set aside for downstream processing.

The process discussed with respect to FIGS. 3A through 3E may be repeated with the same staining/imaging chamber until all biopsies for a single organ site have been imaged. In some embodiments, the staining/imaging chamber may only be used a maximum of five timed before it is discarded.

FIG. 4 is an exploded view of the staining/imaging chamber including an insert in accordance with some embodiments of the present inventive concept. As illustrated the disposable module includes a top shell (1); syringe plungers (2); syringe barrels (3); leur-lock barbed connectors (4); stain transport tubes (5); syringe manifold (6); manifold seal (7); sled (8); sled gasket (9); bottom shell (10); insert body (11); spring seal body (12); spring seal gasket (13); linear wave springs (14); PVA sponge (15); and imaging window (16). Embodiments of the present inventive concept illustrated in FIG. 4 are provided as an example only, thus, embodiments of the present inventive concept are not limited thereto.

Figure 5B:
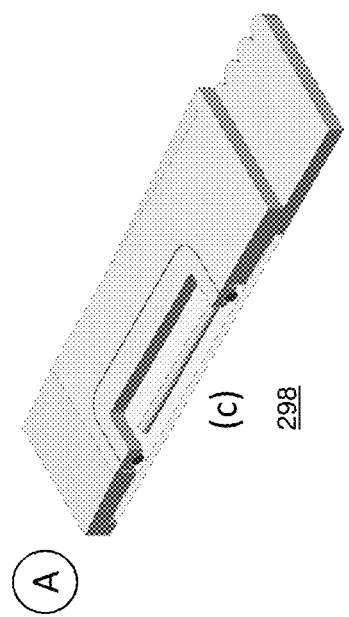
FIG. 5B is a cross section along the line A of FIG. 5A of the insert in accordance with some embodiments of the present inventive concept.
Figure 5A:
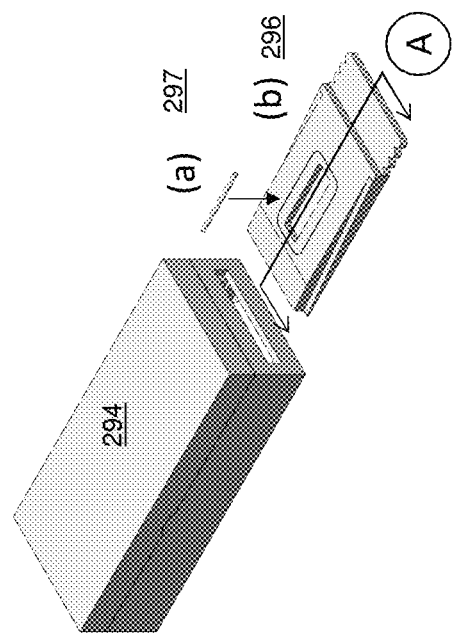
FIG. 5A is a diagram of the staining/imaging chamber and the insert in accordance with some embodiments of the present inventive concept.

Referring now to FIGS. 5A through 14, the process of obtaining a biopsy and imaging the biopsy using a disposable module in accordance with embodiments of the present inventive concept will be discussed. FIGS. 5A and 5B are diagrams illustrating a first step in a process discussed herein. FIG. 5A is a diagram of the staining/imaging chamber and the insert in accordance with some embodiments of the present inventive concept. FIG. 5B is a cross section along the A of FIG. 4B of the insert in accordance with some embodiments of the present inventive concept. Referring first to FIG. 5A, a biopsy 297 (defined above) is positioned in a well of the insert 296 (FIG. 5B). In some embodiments, the biopsy 297 may rest in a thick acrylic window (c) 298. The materials provided herein are provided for example only and, therefore, embodiments of the present inventive are not limited thereto.

It will be understood that FIGS. 5A and 5B are provided for example only and that embodiments of the present inventive concept are not limited to this configuration. For example, in some embodiments, the biopsy could be placed on a microscope slide. The microscope slide would then be placed in the insert.

Figure 6B:
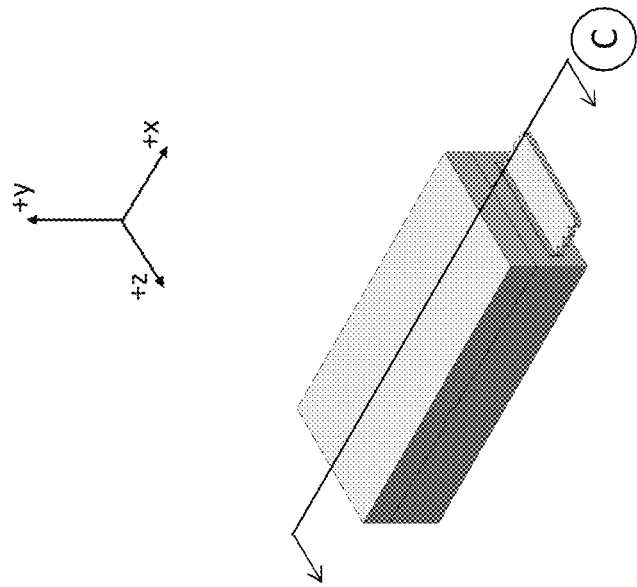
FIGS. 6A and 6B are diagrams illustrating the staining/imaging chamber and an insert of a disposable module in accordance with some embodiments of the present inventive concept.
Figure 6A:
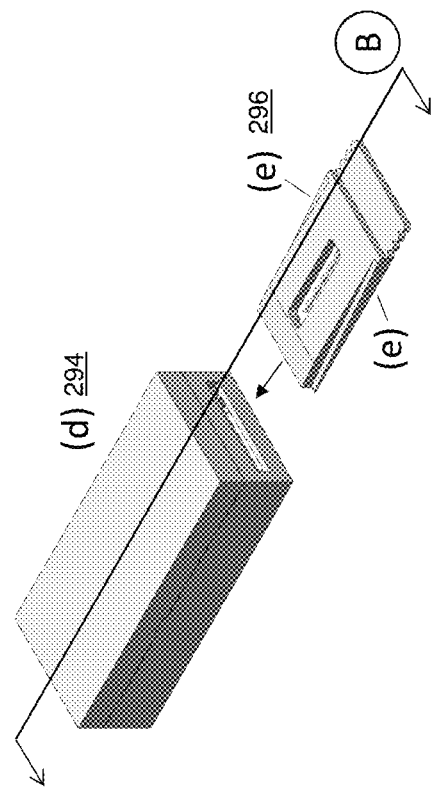

FIGS. 6A through 6D are diagrams illustrating a second step in a process discussed herein. FIGS. 6A and 6B are diagrams illustrating the staining/imaging chamber and an insert of a disposable module 293 in accordance with some embodiments of the present inventive concept. FIG. 6C is a cross section along the line B of FIG. 6A of the insert in accordance with some embodiments of the present inventive concept. FIG. 6D is a cross section along the line C of FIG. 6B of the insert in accordance with some embodiments of the present inventive concept. As illustrated in FIGS. 6A and 6B, the insert 296 is pushed (positioned) into the staining/ imaging chamber (d) 294. Inclined planes (e) on the left and right sides of the insert displace the sled (f) (FIG. 6C) in the +y direction. A hollow barb (g) (FIG. 6C) located on the top of the sled punctures a thin barrier on the syringe manifold (h) (FIG. 6C). The +y direction displacement of the sled (f) causes an o-ring that is located at the base of the hollow barb on top of the sled (f) to made a seal with the bottom of the syringe manifold (h). Once the insert 296 is properly positioned in the chamber 294, the disposable module is ready to be placed in the system dock as will be discussed below.

It will be understood that FIGS. 6A through 6D are provided for example only and that embodiments of the present inventive concept are not limited to this configuration. For example, the disposable could have a "clam-shell" type lid that the biopsy holder is placed into. This embodiment would have an SD card like mechanism (push-push mechanism) and a threaded piece could secure the two together. A puncture port could be located at the rear of the staining chamber. These embodiments would lend well to using suction to for stain delivery.

Figure 7A:
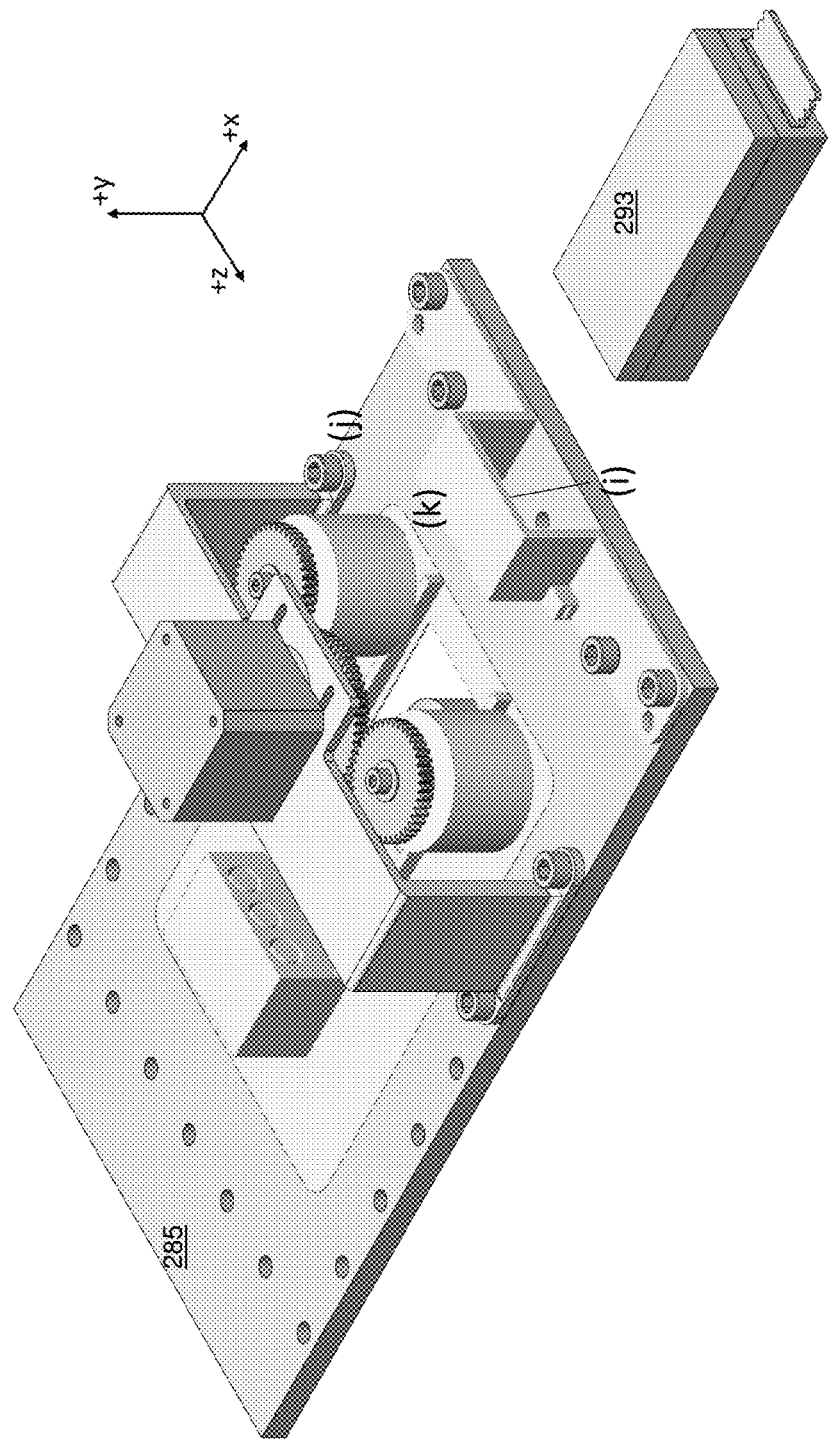
FIGS. 7A through 7C are diagrams of the system dock and the disposable module in various stages during positioning of the disposable module in the system dock in accordance with some embodiments of the present inventive concept.
Figure 7B:
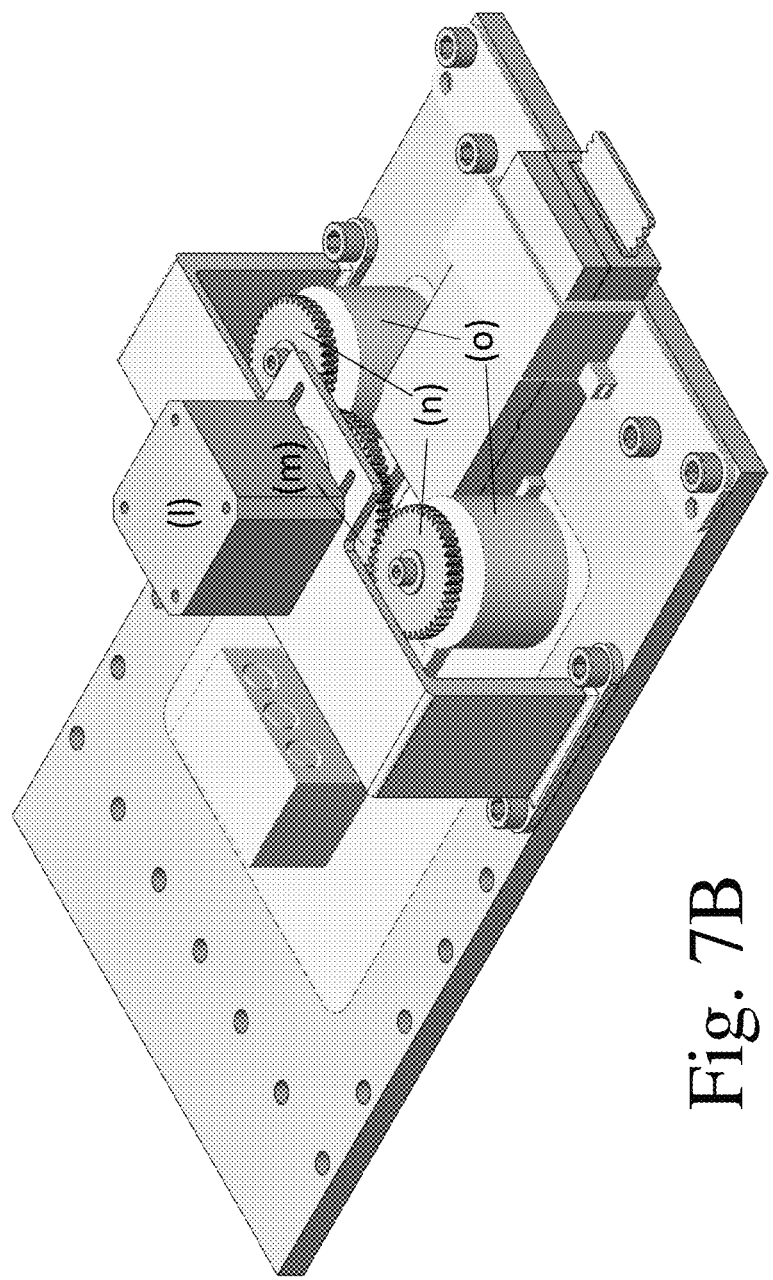
Figure 7C:
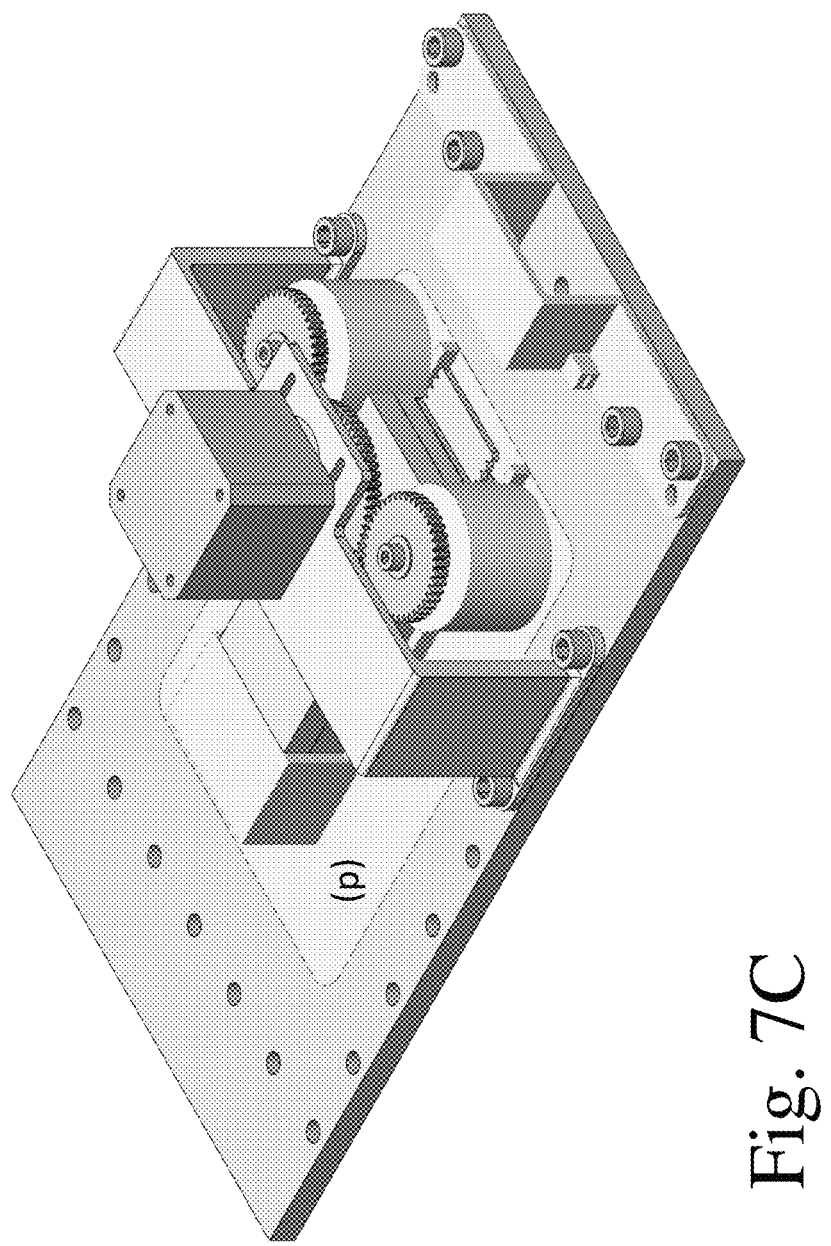

FIGS. 7A through 7C are diagrams illustrating a third step in a process discussed herein. FIGS. 7A through 7C are diagrams of the system dock and the disposable module in various stages during positioning of the disposable module in the system dock in accordance with some embodiments of the present inventive concept. As illustrated in FIG. 7A, the disposable module 293 is placed in the system dock (i) 285 which is formed by the space between the microscope stage (j) and the disposable insertion guide (k).

Once the disposable module 293 is partially inserted, illumination from an LED (not pictured) is cut off from a photoresistor (not pictured). Both the LED and the photoresistor are housed in the disposable insertion guide (k) in these embodiments. The corresponding drop in resistance in the photoresistor is detected by a microcontroller (not pictured) which directs a stepper motor (1) (FIG. 7B) to spin clockwise about the y-axis. The shaft of the stepper motor is attached to a central gear (m) which meshes with two outer gears (n) as show in FIG. 7B. This creates a rotational motion (in opposite directions) of the feeder wheels (o). The disposable module 293 is pushed far enough into the system dock to make contact with the feeder wheels to be pulled into the system as illustrated in FIG. 7B. The disposable module 293 continues to be forwarded onto the stage by the feeder wheels (o) until the back of the disposable makes contact with a limit switch (not pictured) which is located at the back of the stage insert (p) shown in FIG. 7C.

It will be understood that FIGS. 7A through 7C are provided for example only and that embodiments of the present inventive concept are not limited to this configuration. For example, the disposable could be placed on the stage from the top, not the side. In these embodiments, the disposable could be inserted like an SD card (push-push mechanism). Multiple disposables could be placed at once in some sort of feeder mechanism.

Furthermore, other mechanisms for detection of the disposable may be used without departing from the scope of the present inventive concept. For example, a button contact, an IR beam detector (like a garage door), a force sensor, a magnetic field sensor and the like. Similarly, alternative mechanism for moving the disposable into the chamber may be used. For example, a conveyor belt, magnets, arms that grip each side, suction, linear servos that pull after attached to disposable and the like. Alternatives to the limit switch may include a magnetic sensor, a photoresistor, an IR beam detector, a force sensor, a user could position disposable and the like.

Figure 8A:
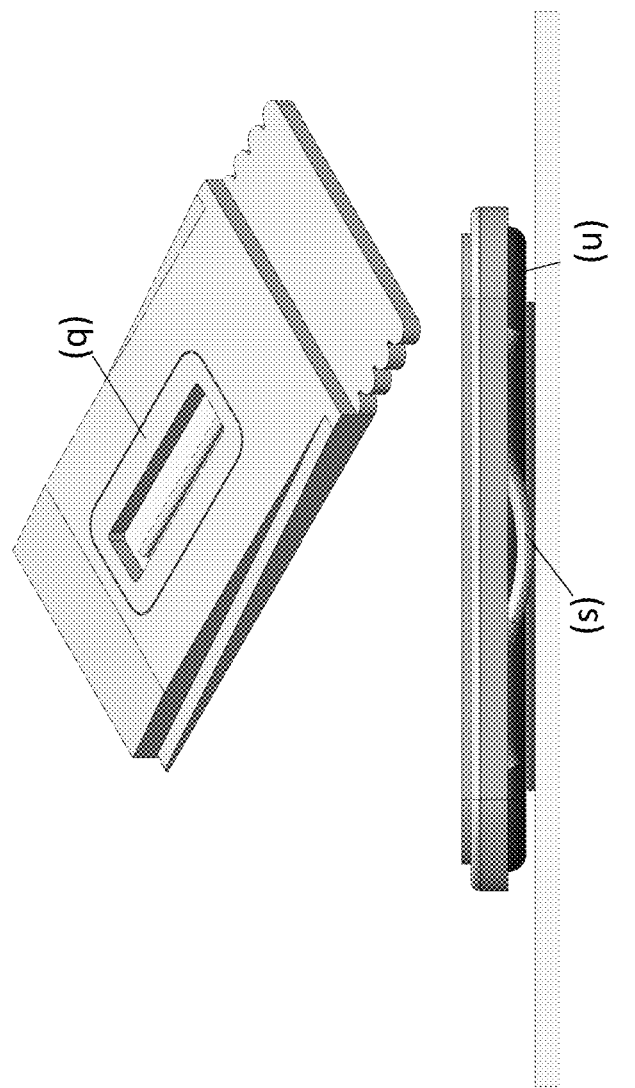
FIGS. 8A and 8B are diagrams illustrating a spring seal mechanism in accordance with some embodiments of the present inventive concept.
Figure 8B:
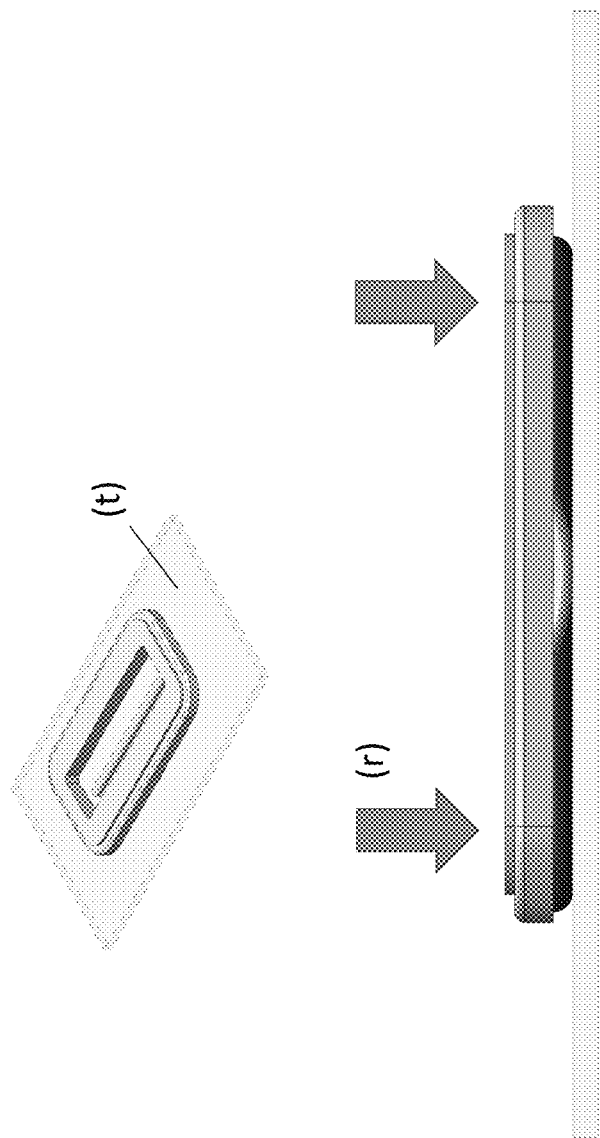

FIGS. 8A and 8B are diagrams illustrating a fourth step in a process discussed herein. FIGS. 8A and 8B are diagrams illustrating a spring seal mechanism in accordance with some embodiments of the present inventive concept. After the disposable has been properly placed on the microscope stage discusses above, a spring mechanism is configured to press down on the spring seal (q) that resides within the insert as illustrated in FIG. 8A. This downward force (r) will counteract the upward force provided by the linear wave springs (s) which would otherwise lift the spring seal off the imaging window (t). On the bottom of the spring seal mechanism is the spring seal gasket (u). When the downward force is applied to the spring seal, this gasket creates a seal with the imaging window as show in FIGS. 8A and 8B.

Figure 9B:
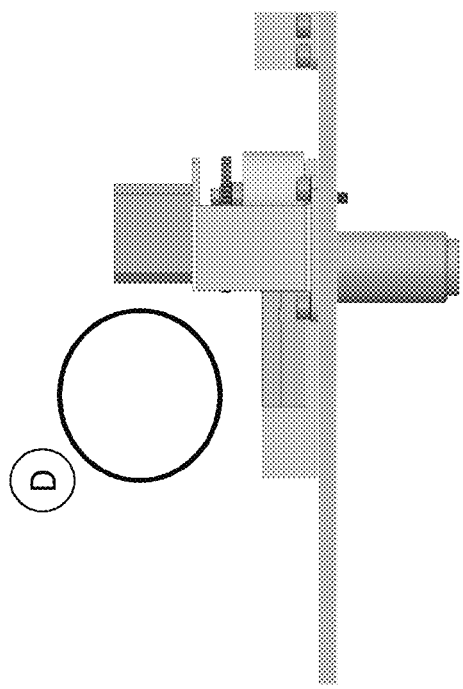
FIG. 9B is a side view of the system dock of FIG. 9A in accordance with some embodiments of the present inventive concept.
Figure 9A:
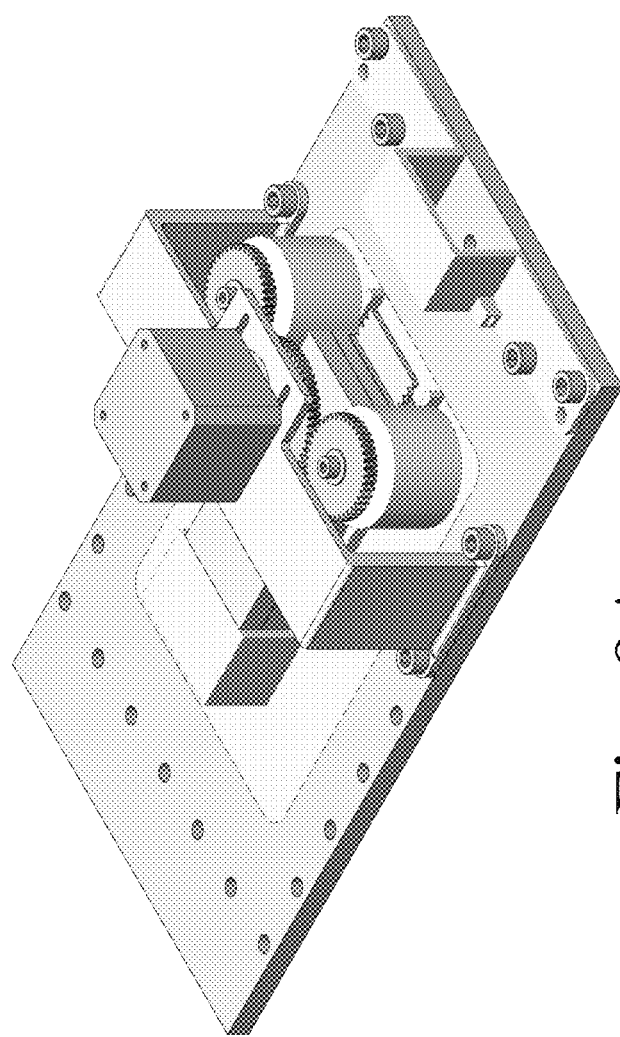
FIG. 9A is a plan view of the system dock having the disposable module positioned therein in accordance with some embodiments of the present inventive concept.
Figure 9C:
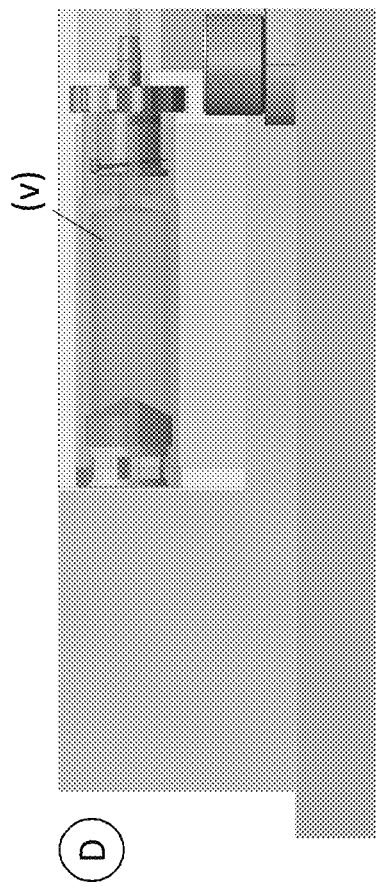
FIGS. 9C and 9D are magnified views of portion D of FIG. 9A in accordance with some embodiments of the present inventive concept.
Figure 9D:
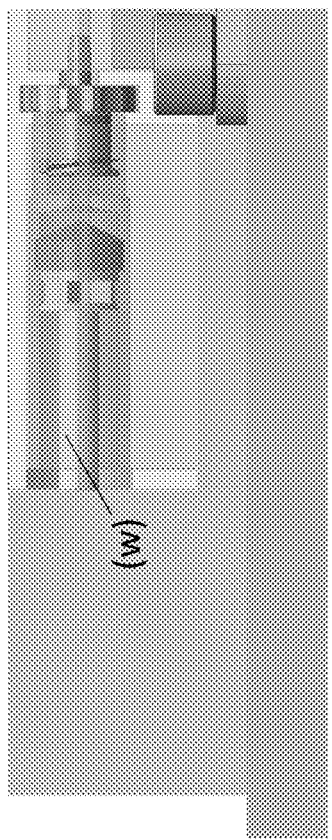

FIGS. 9A through 9D are diagrams illustrating a fifth step in the process discussed herein. FIG. 9A is a plan view of the system dock having the disposable module positioned therein in accordance with some embodiments of the present inventive concept. FIG. 9B is a side view of the system dock of FIG. 9A in accordance with some embodiments of the present inventive concept. FIGS. 9C and 9D are magnified views of portion D of FIG. 9A in accordance with some embodiments of the present inventive concept. As illustrated in FIG. 9C, stain-containing syringes (v) located within in the disposable are actuated by linear motors (w) (FIG. 9D) housed on the stage. This causes stain to move from the syringe, a tube (not pictured), through the syringe manifold (not pictured), through the hollow barb in the sled (not pictured), and onto the biopsy (not pictured).

Figure 10A:
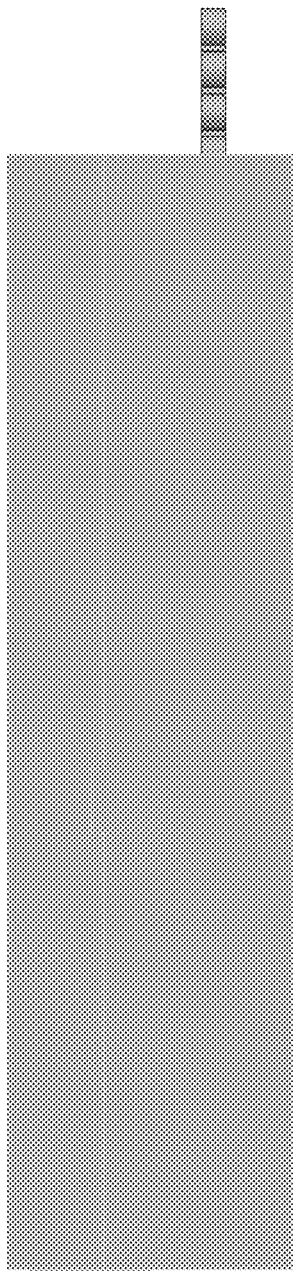
FIGS. 10A through 10C are cross sections of the disposable module having the insert positioned there in accordance with some embodiments of the present inventive concept.
Figure 10B:
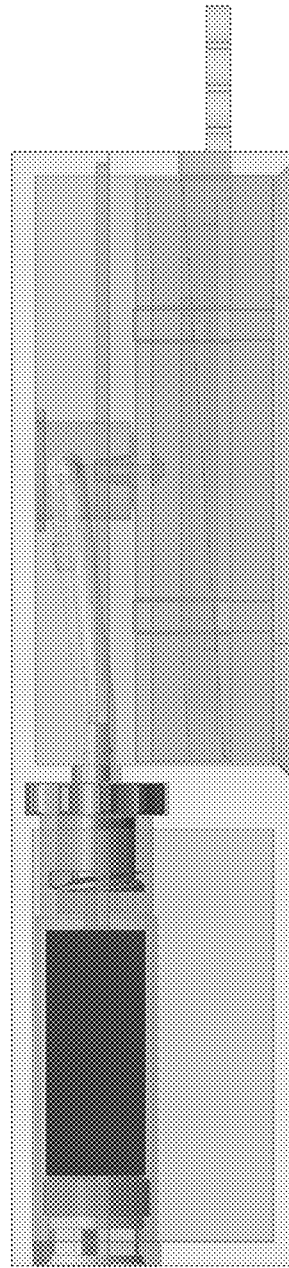
Figure 10C:
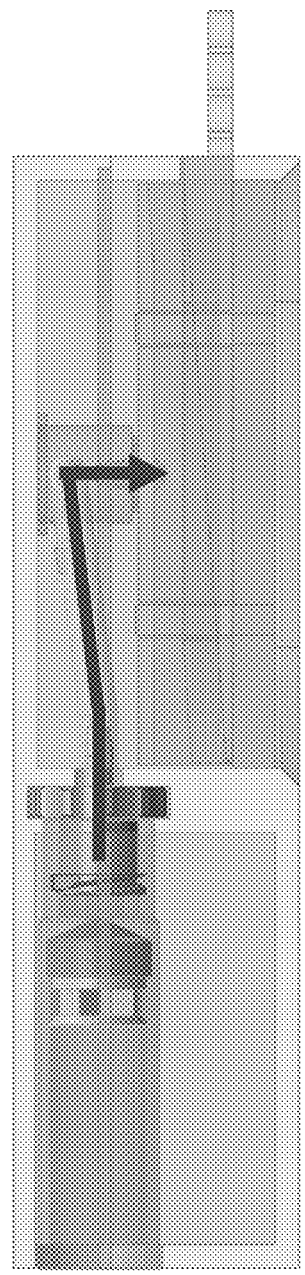

Staining in accordance with some embodiments of the present inventive concept will now be discussed with respect to FIGS. 10A through 10C. FIGS. 10A through 10C are cross sections of the disposable module having the insert positioned there in accordance with some embodiments of the present inventive concept. As illustrating FIG. 10B, stain-containing syringes are located within in the disposable module. In some embodiments, these syringes are activated by linear motors housed on the stage. As illustrated in FIG. 10C, this causes stain to move from the syringe, into a tube, through the syringe manifold, through the hollow barb in the sled, and onto the biopsy insert, staining the biopsy in accordance with some embodiments of the present inventive concept.

It will be understood that FIGS. 9A through 10D illustrate an example only and embodiments of the present inventive concept are not limited thereto. For example, a screw-driven mechanism, linear actuators, linear servos, stepper motors with rack and pinion, pneumatic, magnetic, pumps (positive and negative pressure), gravity, an external mechanism that attached to disposable outside of system, then disposable is put in position, user could push stains manually, biopsy could be stained before placement in disposable and the like may be used. Furthermore, the movement may be accomplished by allowing the stage to move, the disposable to move, the object to move and the like. Alternatively, a wide field of view (FOV) may be used so the nothing has to move.

Figure 11E:
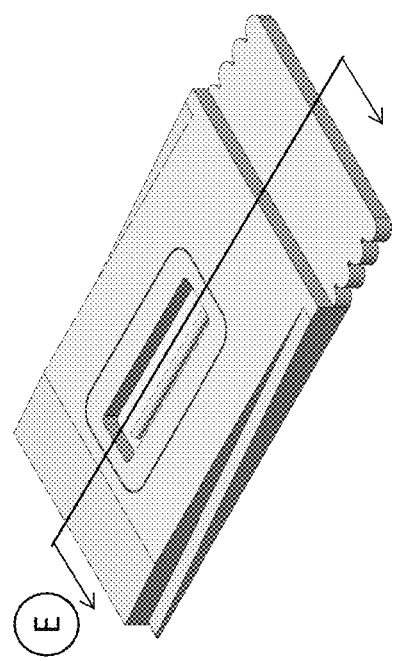
Figure 11D:
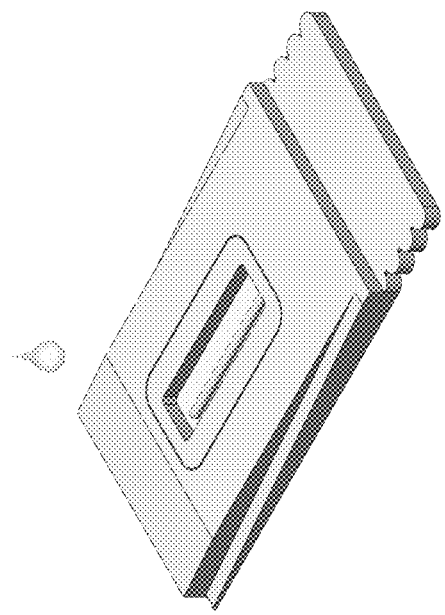
Figure 11F:
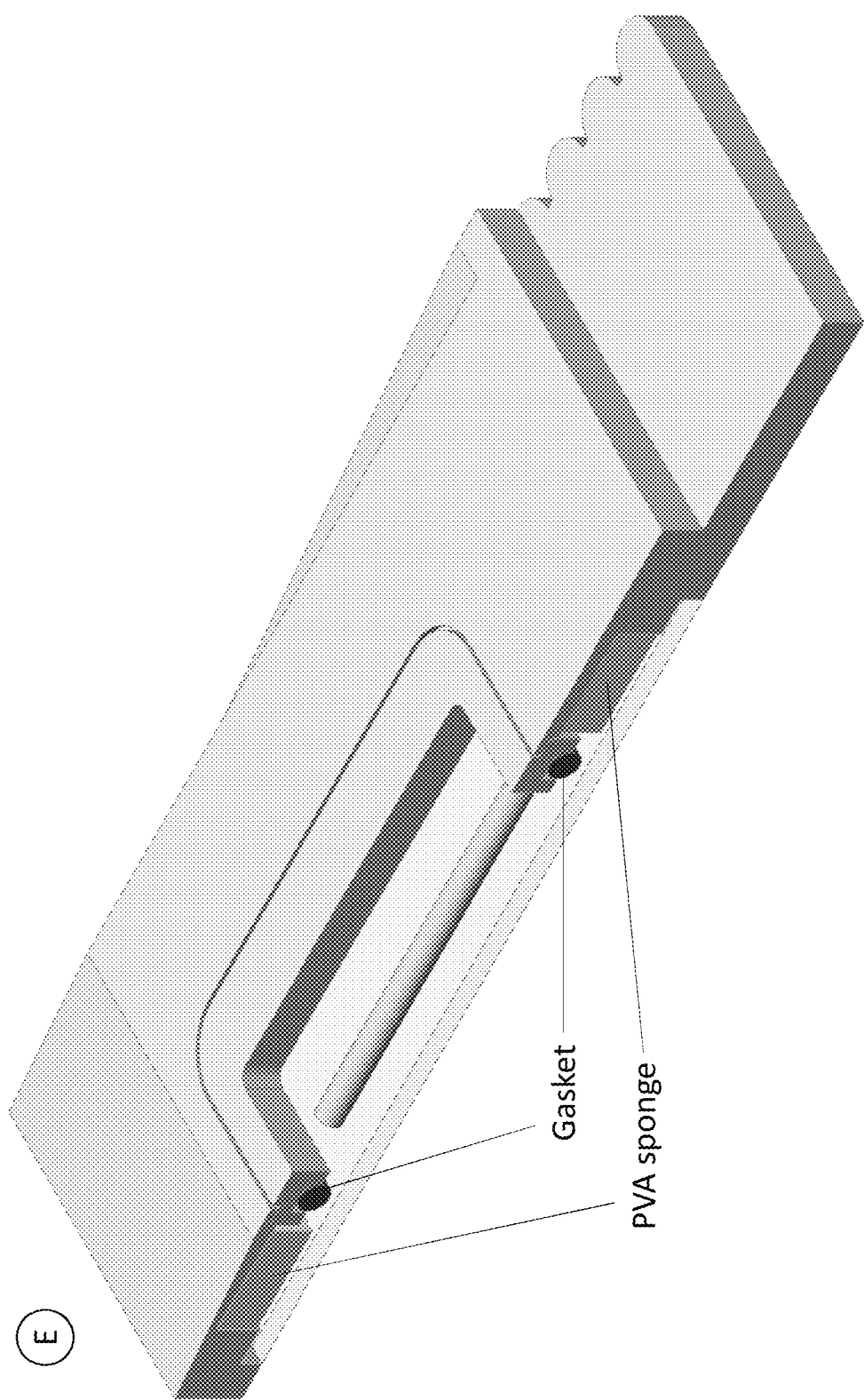
FIG. 11F is a cross section along the line E of FIG. 11E in accordance with some embodiments of the present inventive concept.

FIGS. 11A through 11F are diagrams illustrating a sixth step in the process discussed herein. FIGS. 11A through 11E are diagrams illustrating the insert and spring seal mechanism in accordance with some embodiments of the present inventive concept. FIG. 11F is a cross section along the line E of FIG. 11E in accordance with some embodiments of the present inventive concept. FIGS. 11A through 11F illustrate a method where force on the spring seal mechanism is released after a certain amount of time, allowing the stain to flow under the gasket and make contact with the PVA sponge.

In particular, as illustrated in FIG. 11A, stain from the syringes moves onto the biopsy via the previously described pathway and is held in place around the biopsy by the spring seal. Force on the spring seal is maintained for a certain amount of time during which the biopsy is stained as shown in FIG. 11B. FIG. 11C illustrates releasing the force on the spring seal, allowing the linear wave springs on the underside of the spring seal to push the mechanism up, removing the gasket from the slide and releasing the stain and allowing it to come into contact with the PVA sponge which wicks it off of the slide as will be discussed below. FIG. 11F illustrates a wash pushed onto the biopsy via the same pathway as the stain.

After the downward force on the spring seal mechanism has been released, linear wave springs lift the mechanism off the imaging window. This allows stain to flow under the previously compressed gasket and make contact with the PVA sponge as illustrated in FIG. 11F. The sponge wicks the stain away from the biopsy but leaves the biopsy in place to be imaged.

Figure 13:
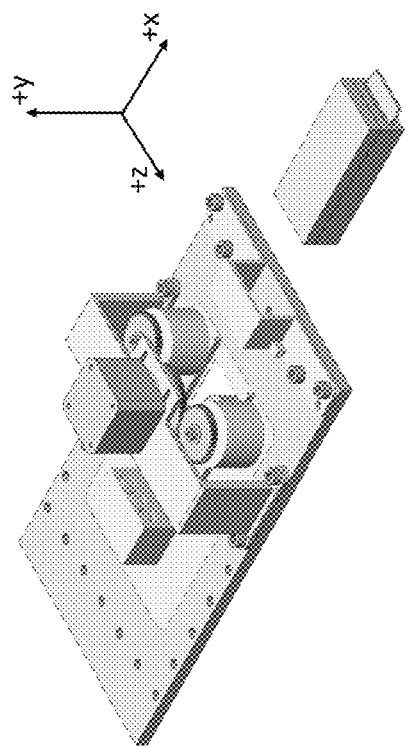
FIG. 13 is a diagram illustrating the removal of the disposable module from the system dock in accordance with some embodiments of the present inventive concept.
Figure 14:
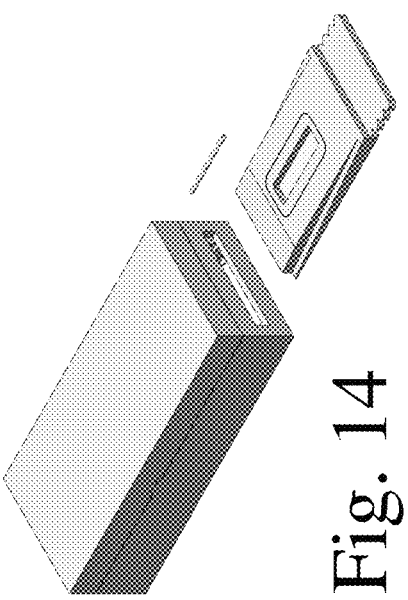
FIG. 14 is a diagram illustrating the removal of the insert from the chamber in accordance with some embodiments of the present inventive concept.
Figure 12:
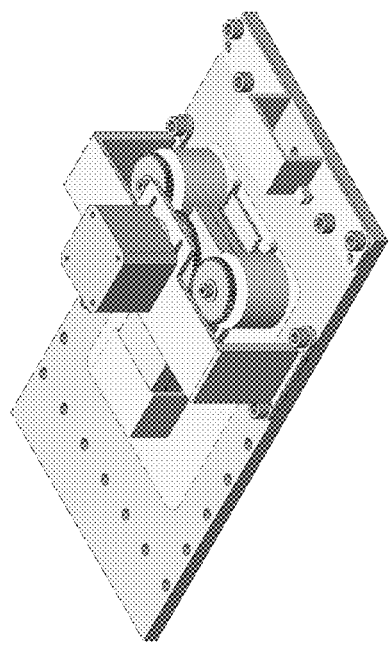
FIG. 12 is plan view of the system dock having the disposable unit positioned therein in accordance with some embodiments of the present inventive concept.
Figure 15:
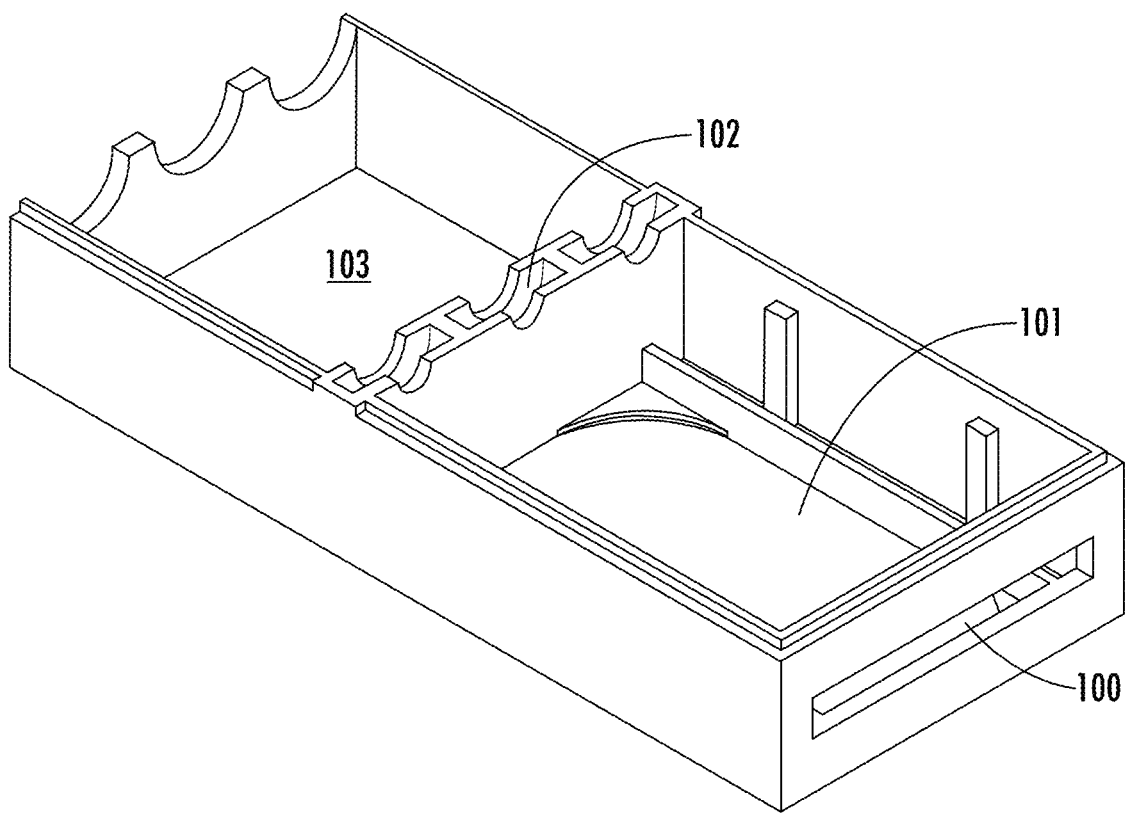
FIG. 15 is a diagram illustrating an isometric view that shows the bottom shell in accordance with some embodiments of the present inventive concept.
Figure 16:
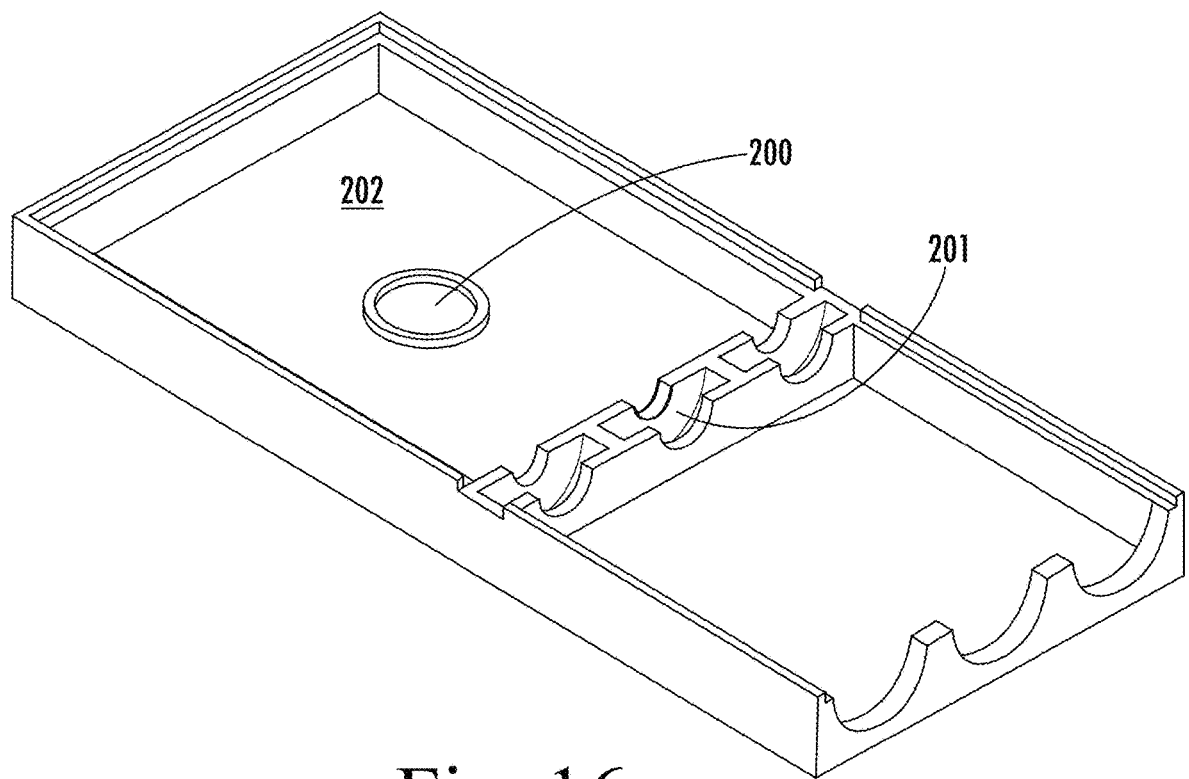
FIG. 16 is a diagram illustrating an isometric view that shows the top shell in accordance with some embodiments of the present inventive concept.
Figure 17:
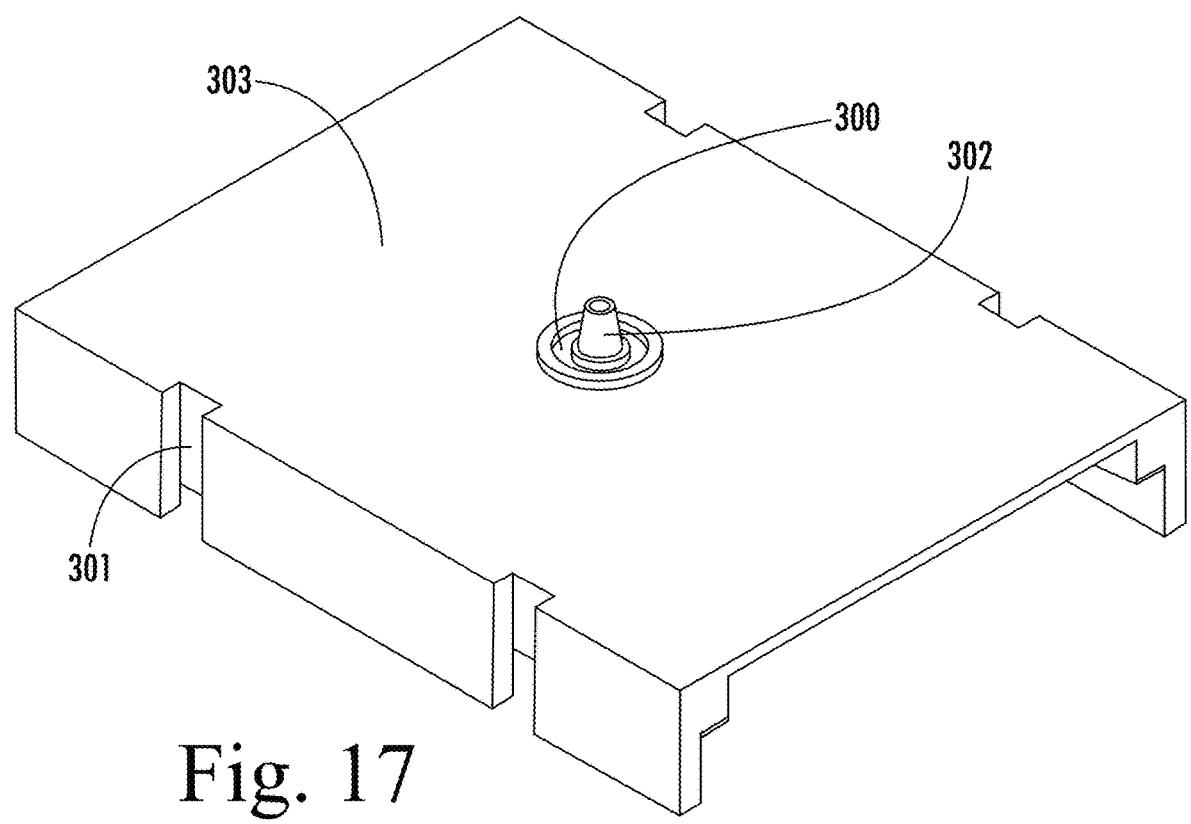
FIG. 17 is a diagram illustrating an isometric view that shows the barbed sled in accordance with some embodiments of the present inventive concept.
Figure 18:
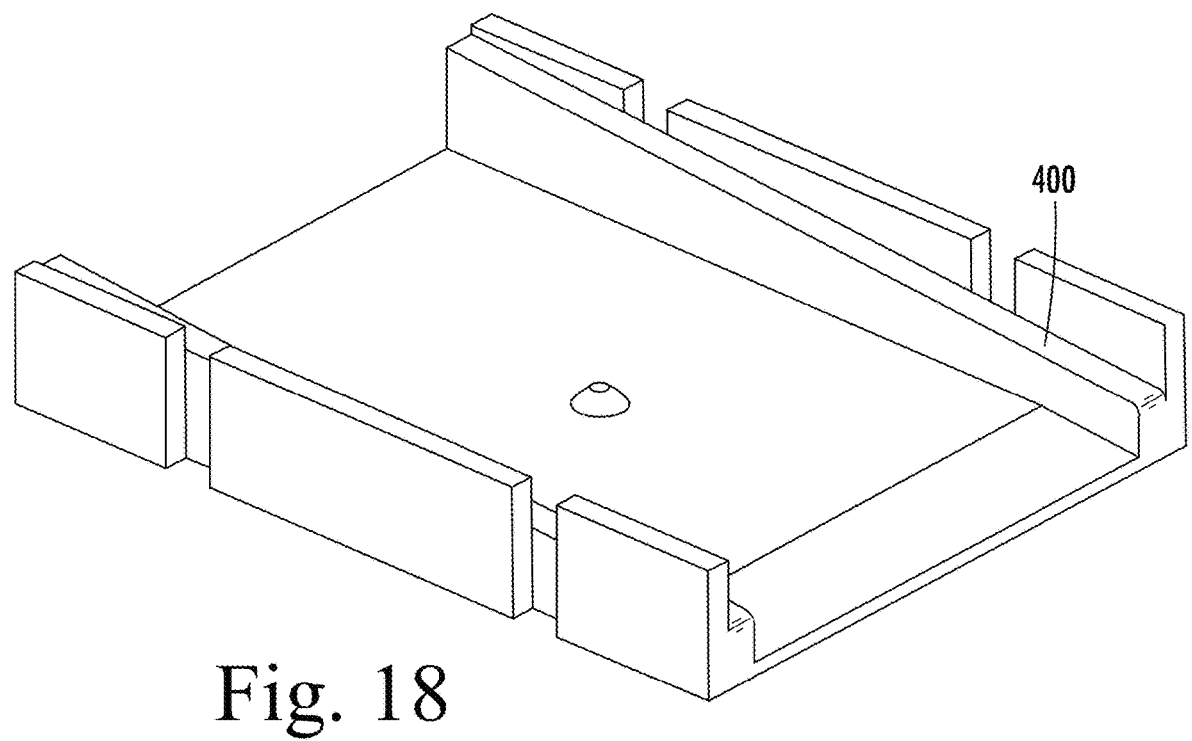
FIG. 18 is a diagram illustrating an isometric view that shows the underside of the barbed sled in accordance with some embodiments of the present inventive concept.
Figure 19:
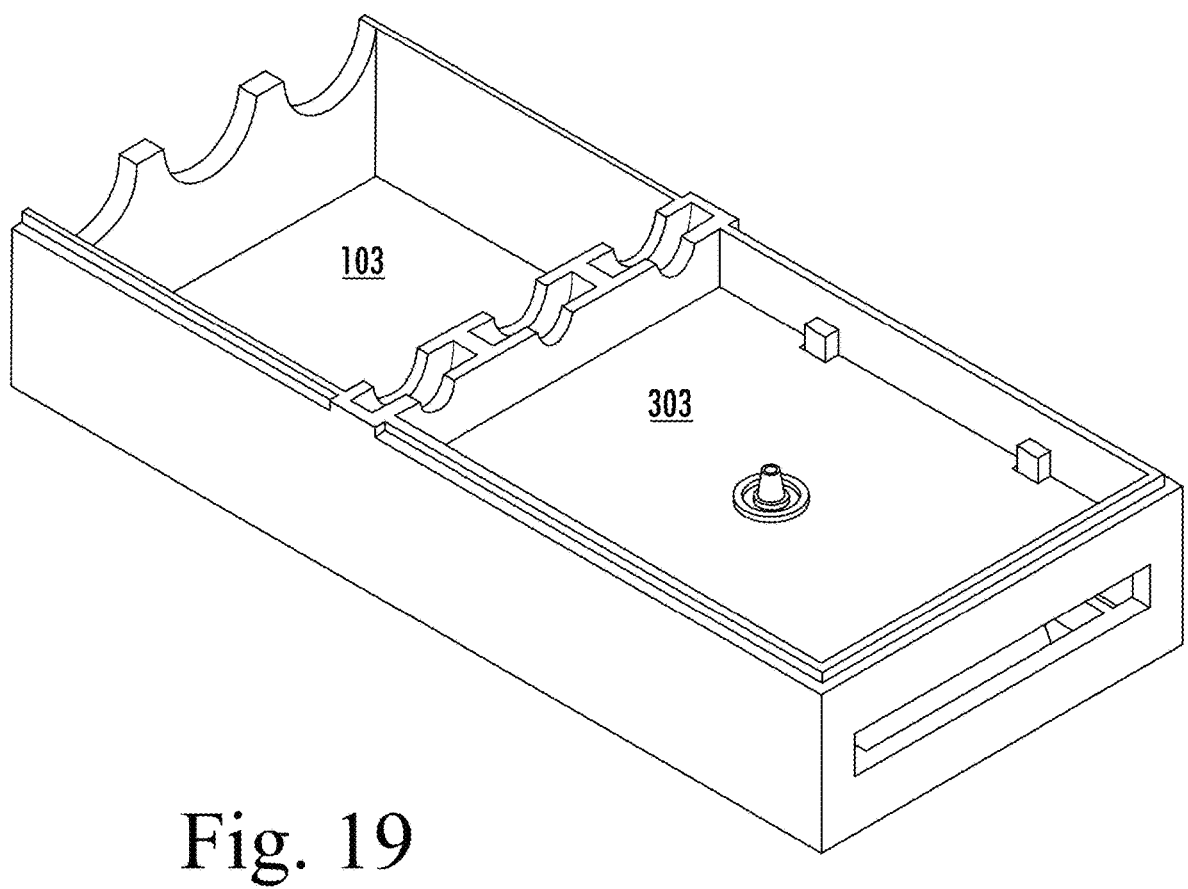
FIG. 19 is a diagram illustrating an isometric view that shows how the bottom shell and sled fit together in accordance with some embodiments of the present inventive concept.
Figure 20:
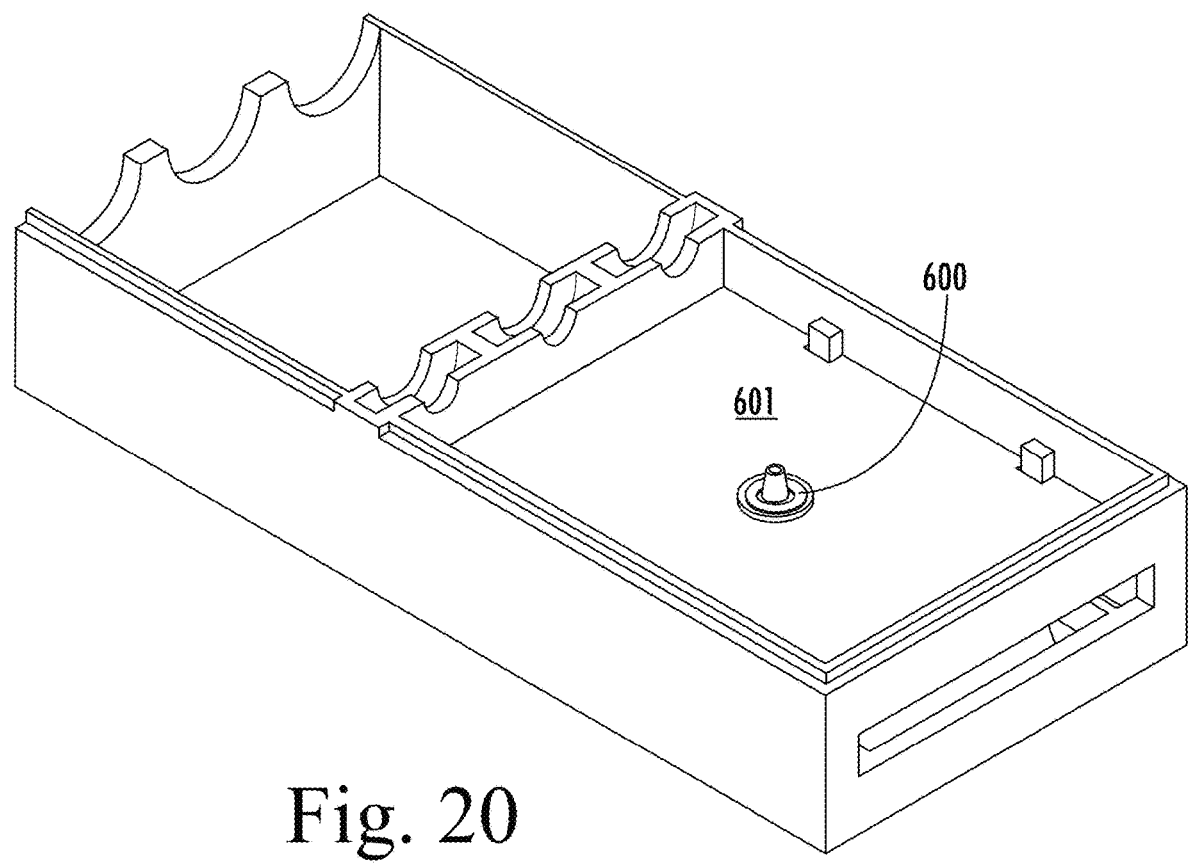
FIG. 20 is a diagram illustrating an isometric view that shows bottom shell with sled and gasket in place in accordance with some embodiments of the present inventive concept.
Figure 21:
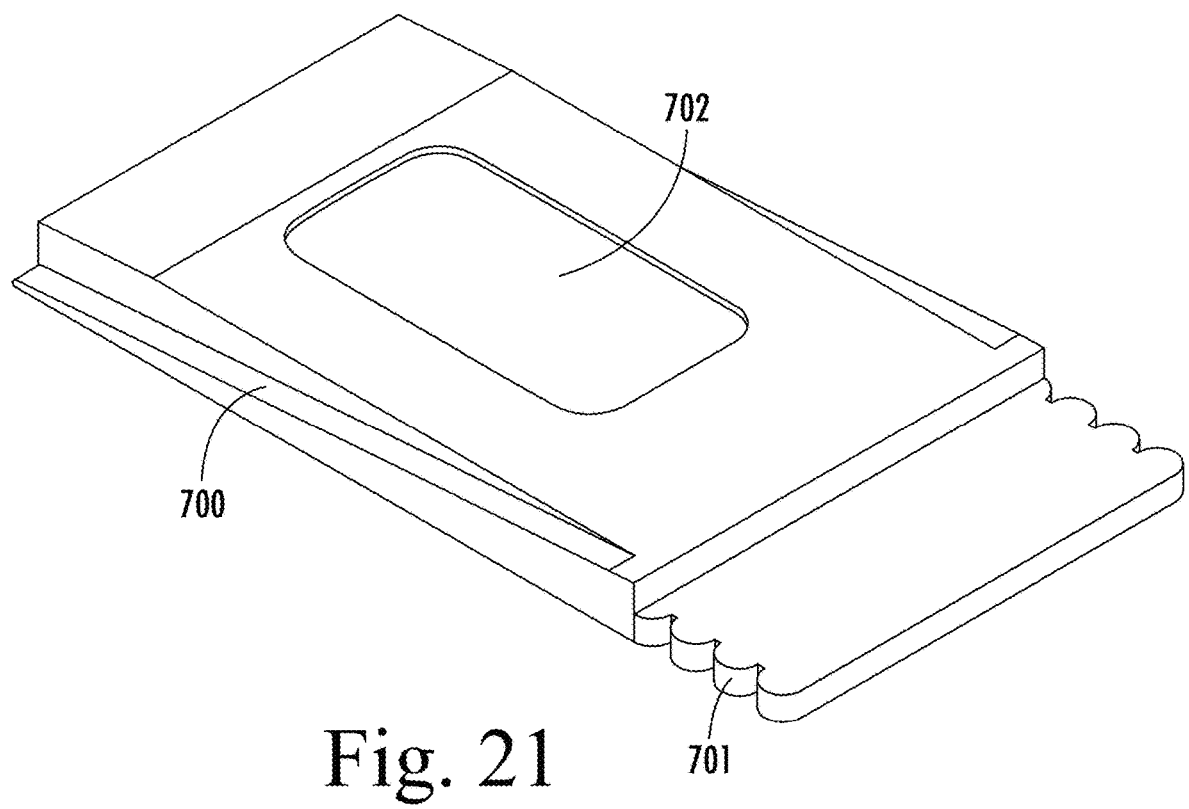
FIG. 21 is a diagram illustrating an isometric view that shows the ramped insert body in accordance with some embodiments of the present inventive concept.
Figure 22:
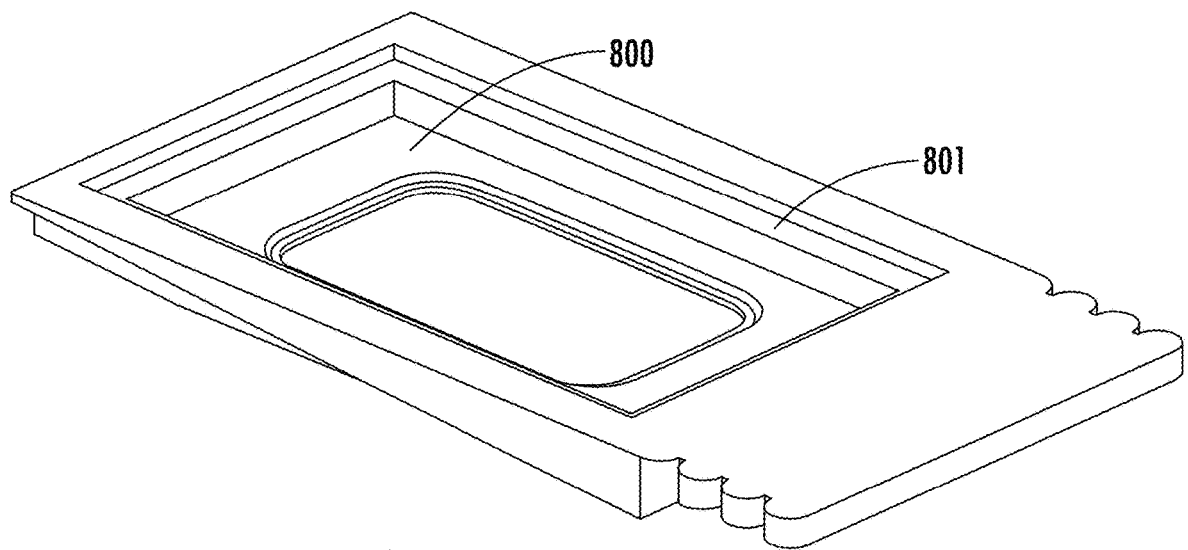
FIG. 22 is a diagram illustrating an isometric view that shows the underside of the ramped insert in accordance with some embodiments of the present inventive concept.
Figure 23:
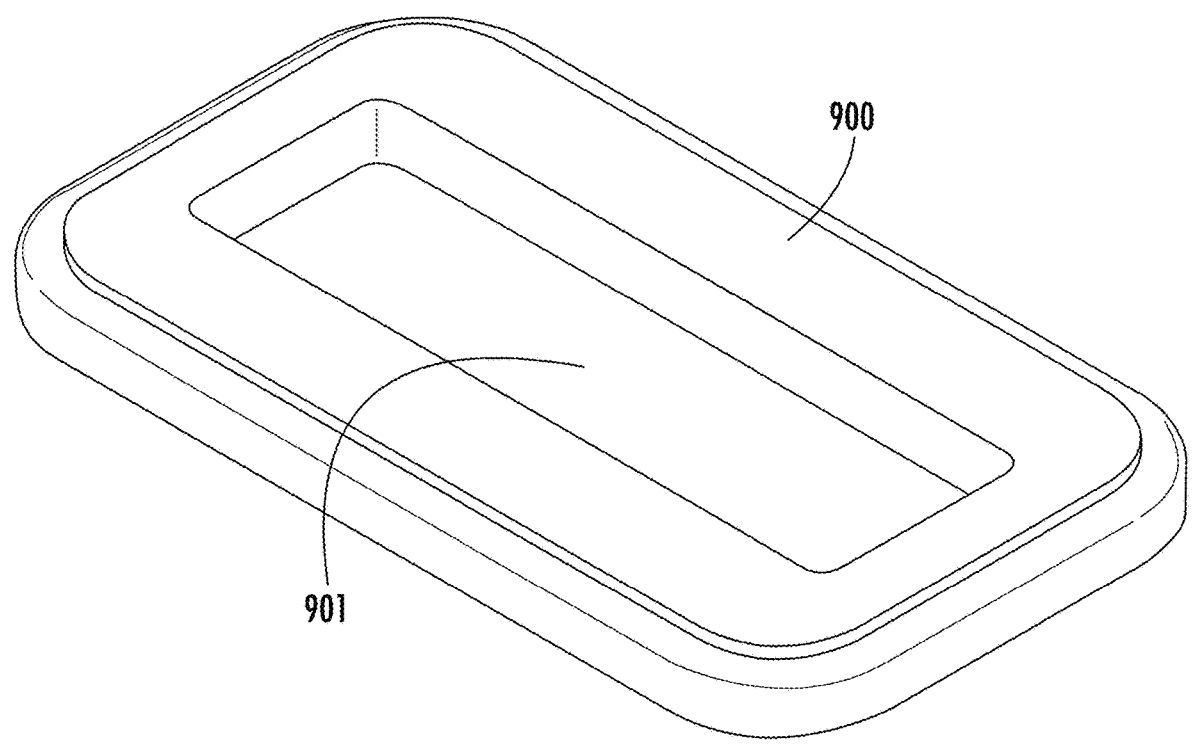
FIG. 23 is a diagram illustrating an isometric view that shows the spring seal mechanism body in accordance with some embodiments of the present inventive concept.
Figure 24:
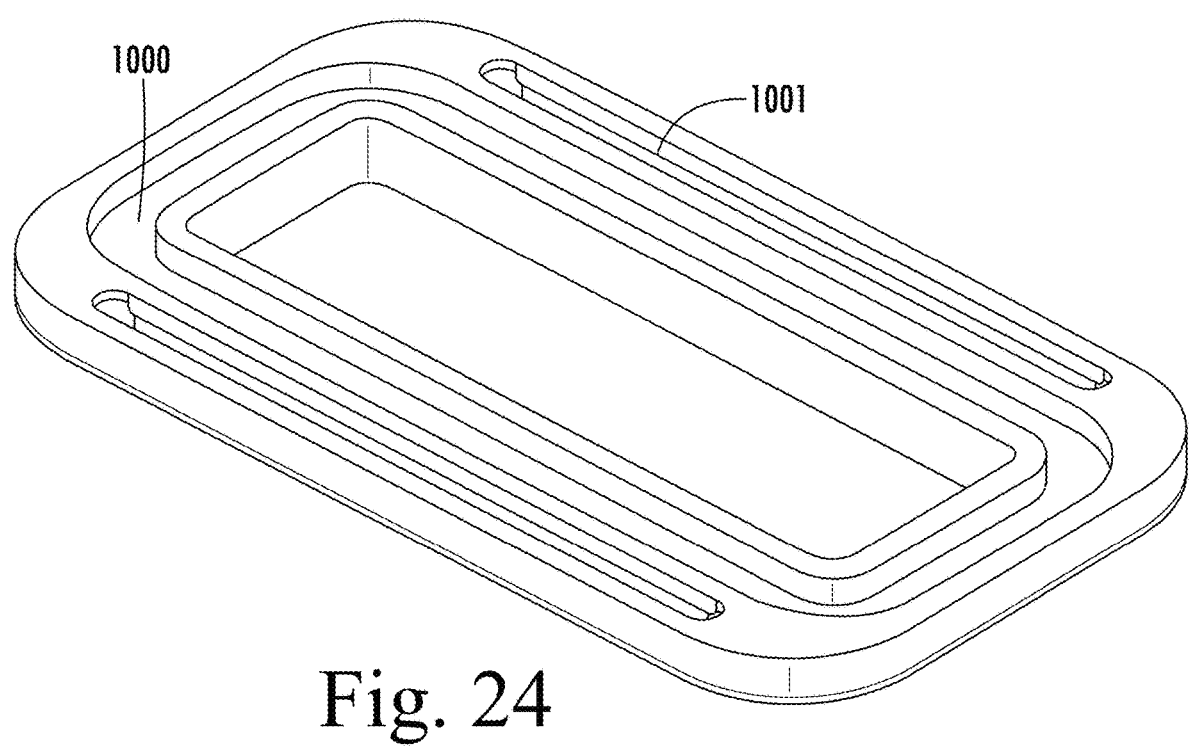
FIG. 24 is a diagram illustrating an isometric view that shows the underside of the spring seal body in accordance with some embodiments of the present inventive concept.
Figure 25:
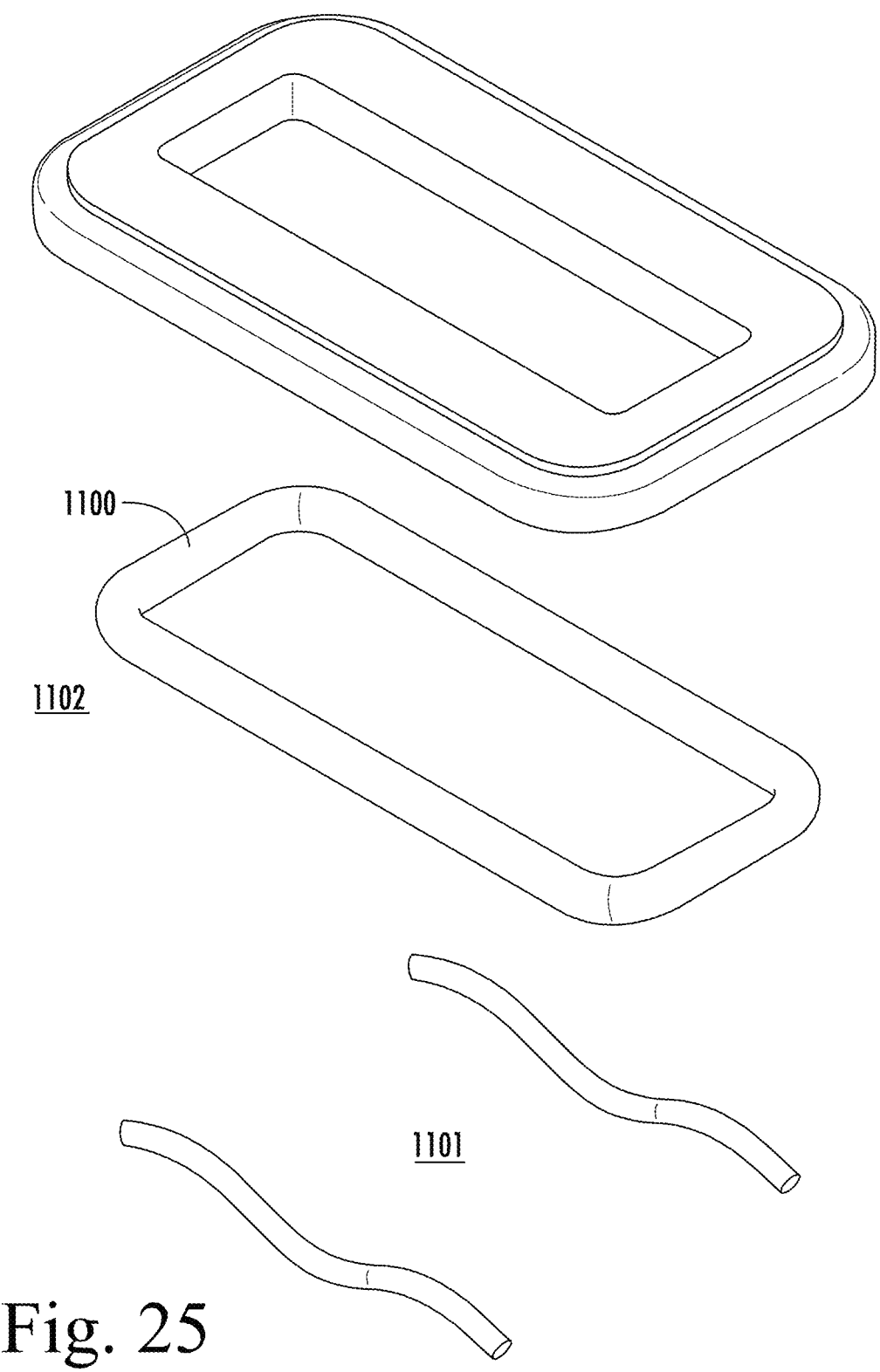
FIG. 25 is a diagram illustrating an isometric view that shows an exploded view of the spring seal assembly in accordance with some embodiments of the present inventive concept.
Figure 26:
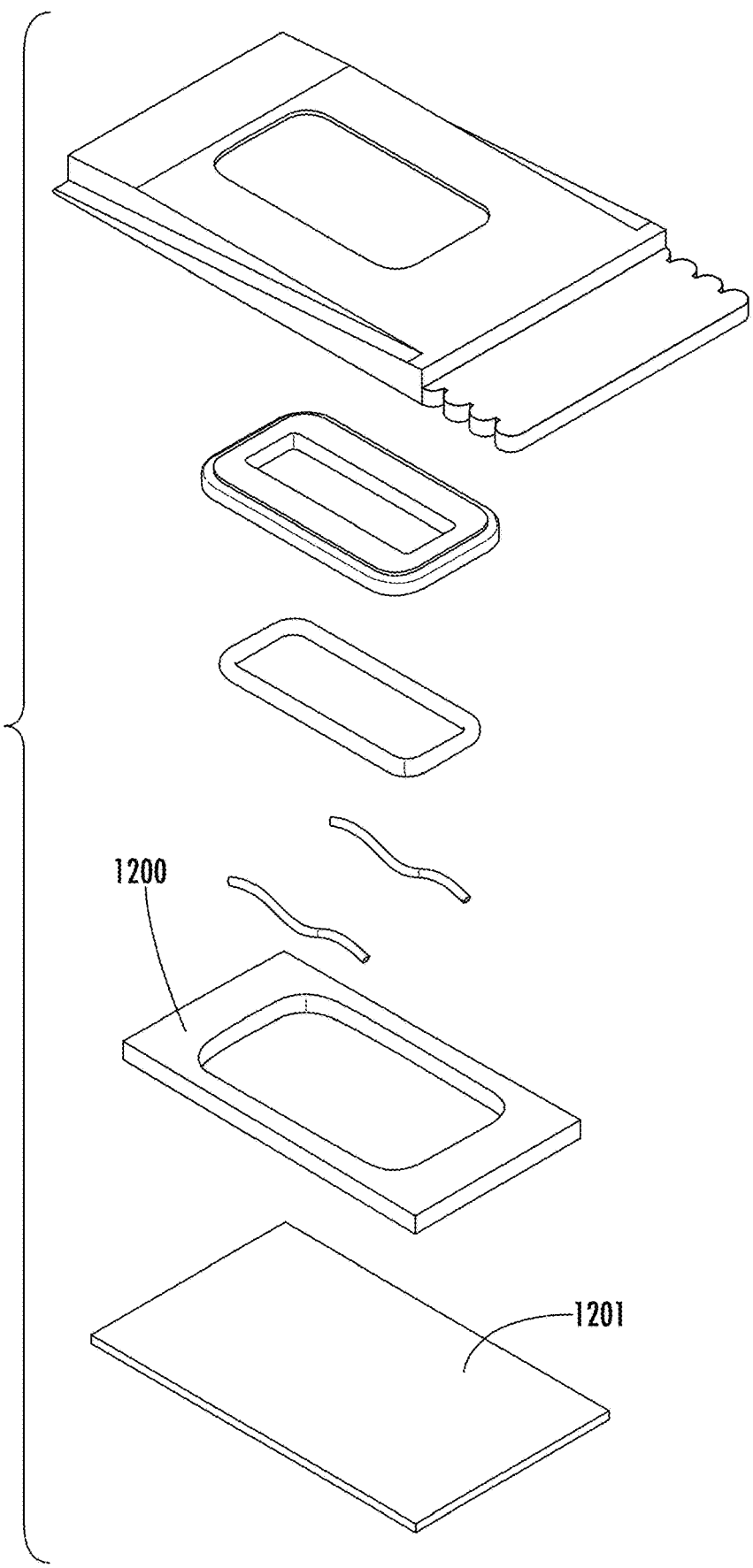
FIG. 26 is a diagram illustrating an isometric view that shows an exploded view of the ramped insert assembly in accordance with some embodiments of the present inventive concept.
Figure 27:
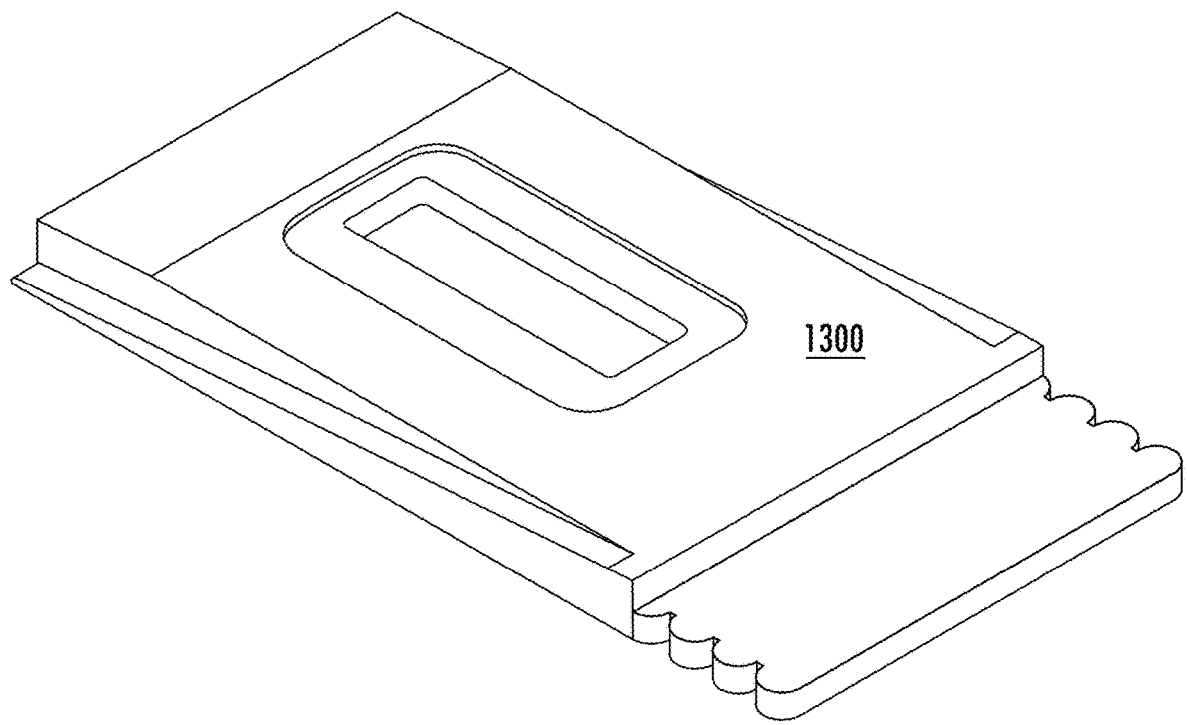
FIG. 27 is a diagram illustrating an isometric view that shows the ramped insert and spring seal assembly in accordance with some embodiments of the present inventive concept.
Figure 28:
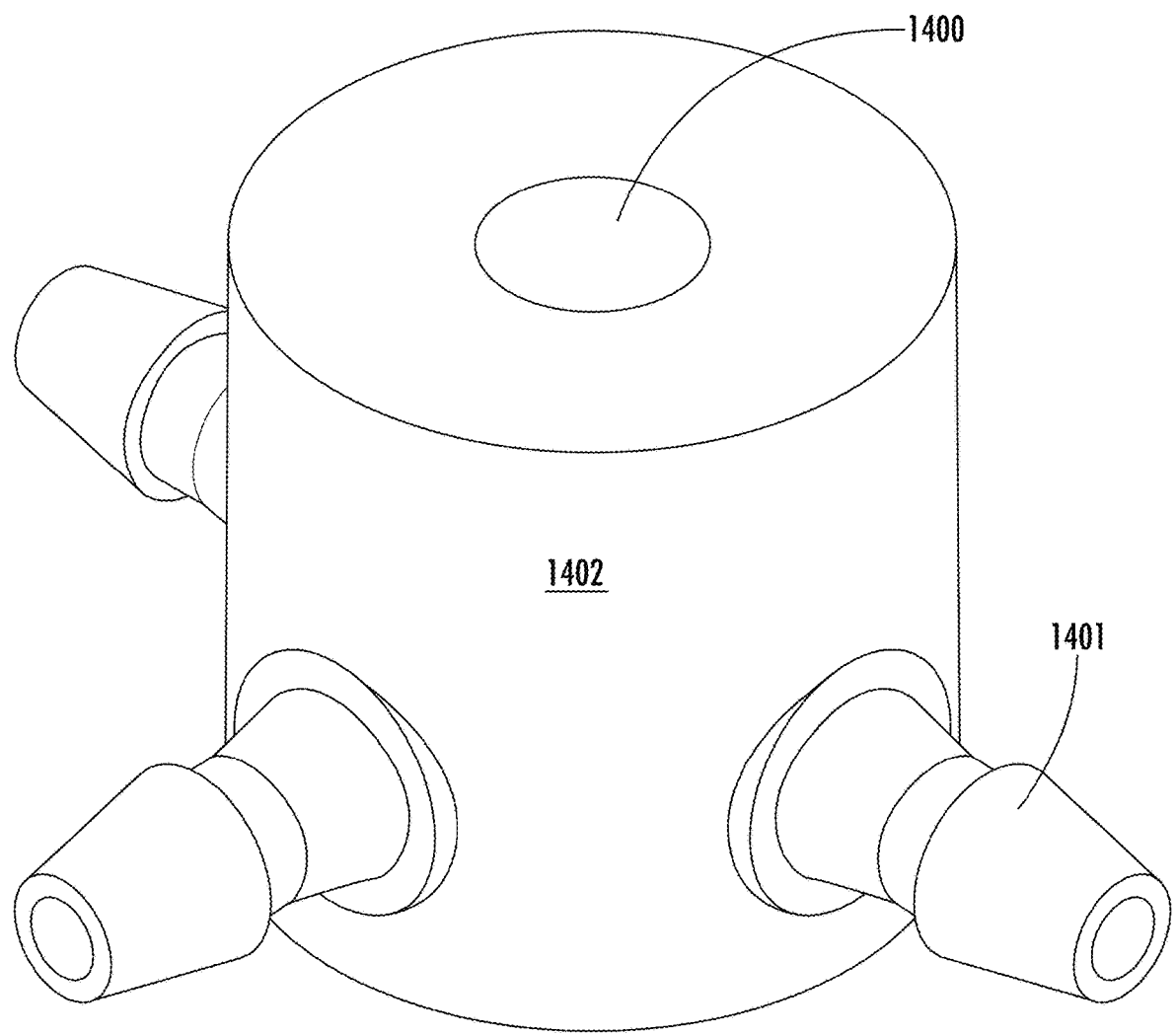
FIG. 28 is a diagram illustrating an isometric view that shows the syringe manifold in accordance with some embodiments of the present inventive concept.
Figure 29:
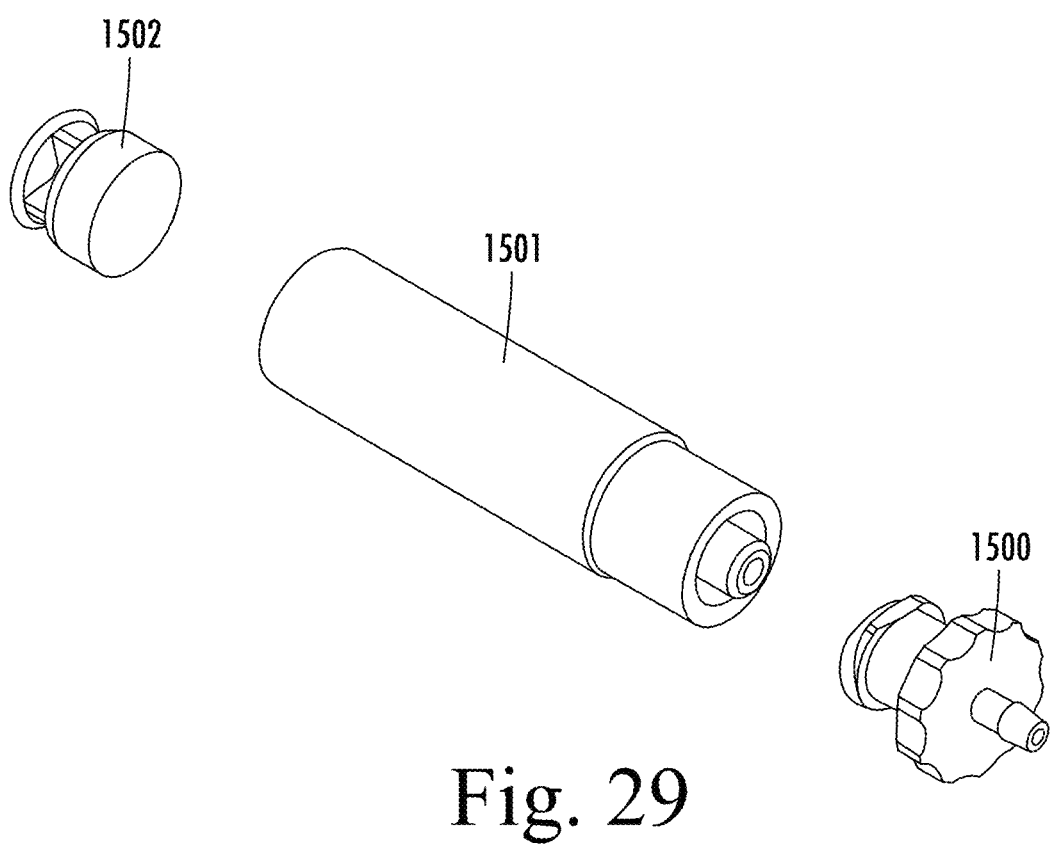
FIG. 29 is a diagram illustrating an isometric view that shows an exploded view of the stain storage mechanism in accordance with some embodiments of the present inventive concept.
Figure 30:
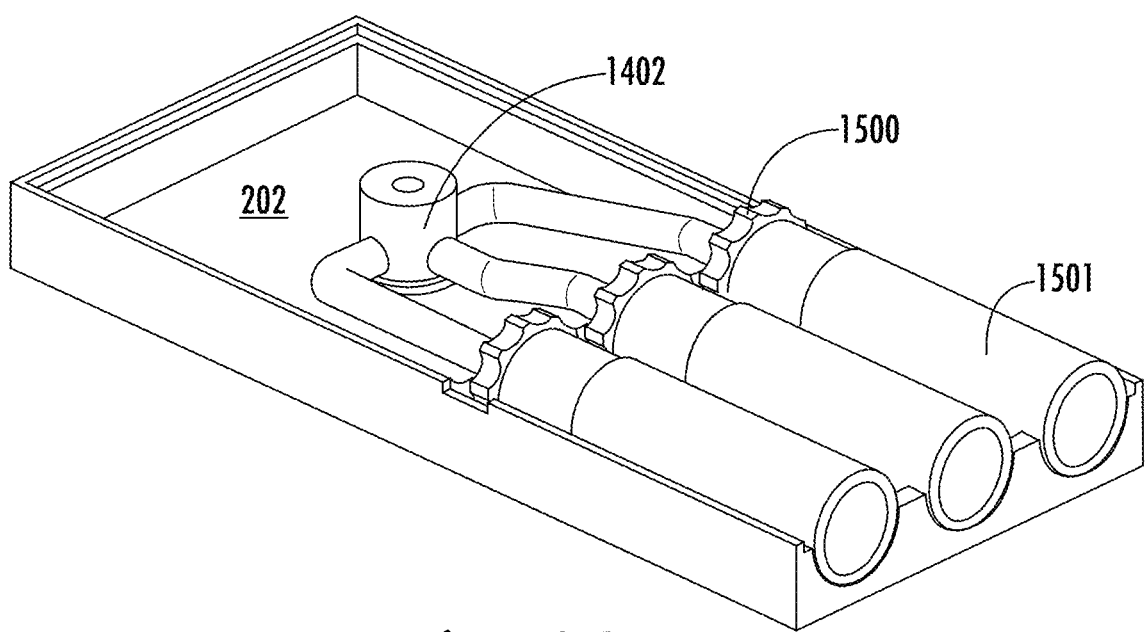
FIG. 30 is a diagram illustrating an isometric view that shows the top shell of the disposable with stain storage mechanism and syringe manifold in accordance with some embodiments of the present inventive concept.
Figure 31:
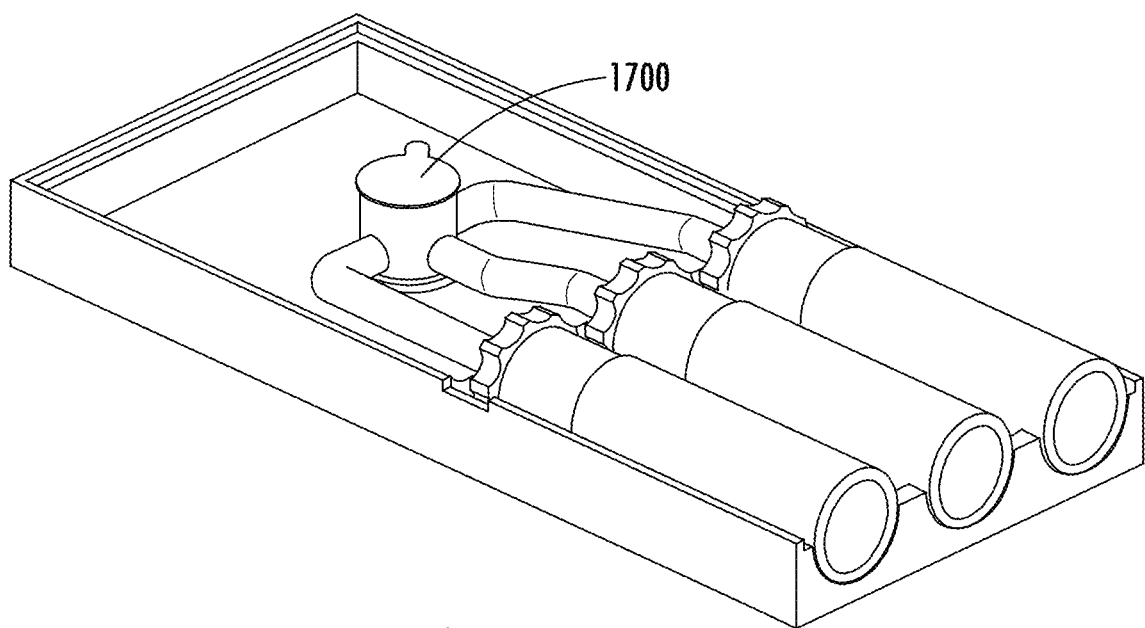
FIG. 31 is a diagram illustrating an isometric view that shows the top shell with stain storage mechanism and syringe manifold covered with a seal in accordance with some embodiments of the present inventive concept.
Figure 32:
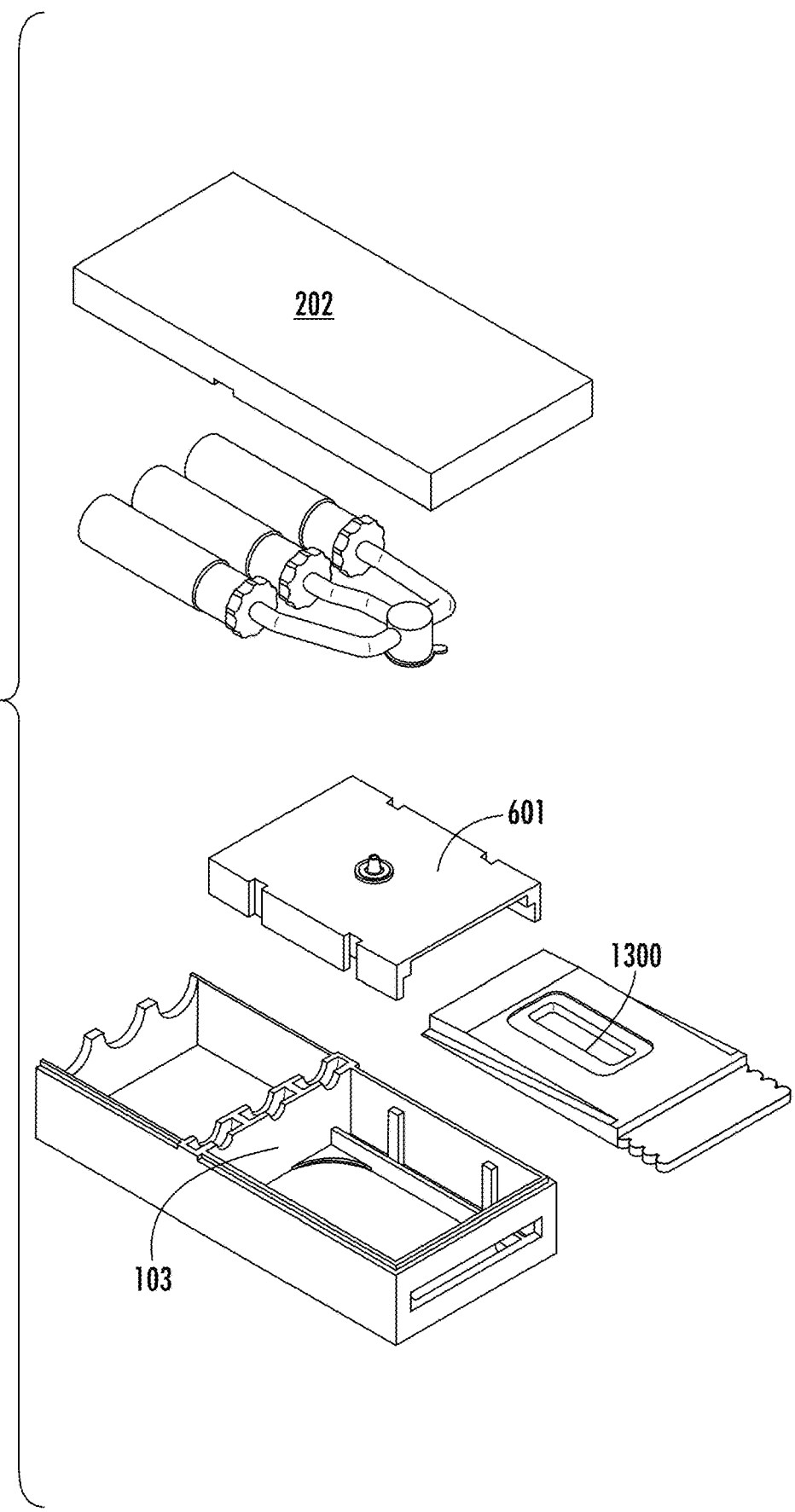
FIG. 32 is a diagram illustrating an isometric view that shows an exploded view of the full disposable in accordance with some embodiments of the present inventive concept.
Figure 34A:
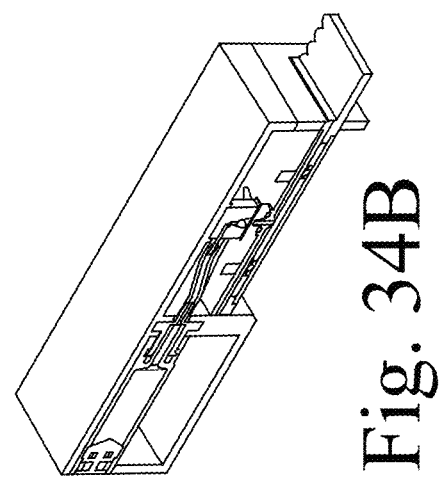
FIGS. 34A through 34C are diagrams illustrating an isometric view that shows a cross section of the disposable when the ramped insert is placed in accordance with some embodiments of the present inventive concept.
Figure 34B:
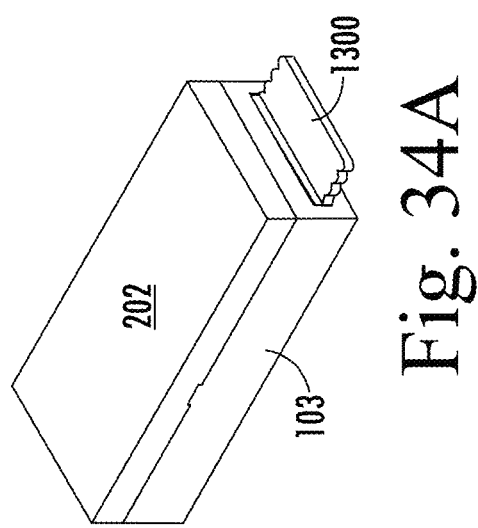
Figure 34C:
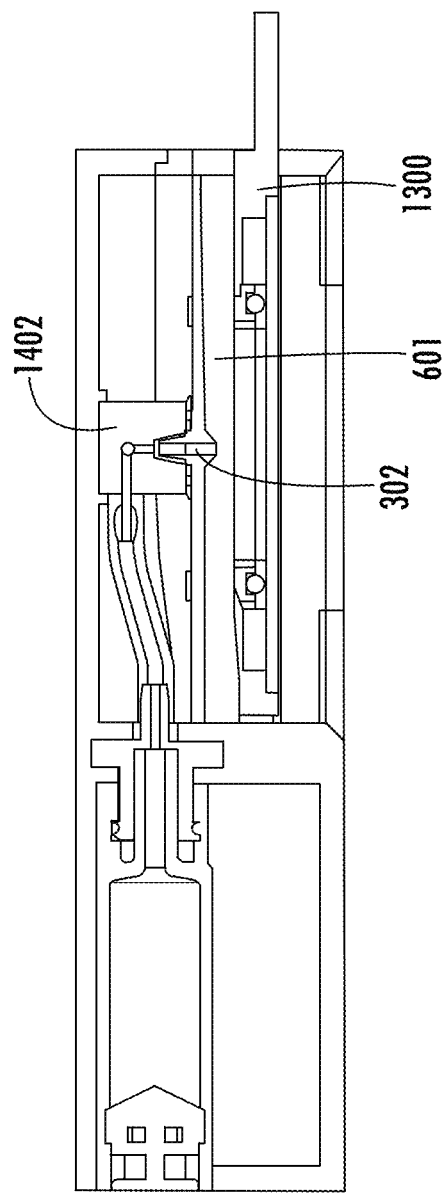

The final steps, seven and eight, of the process discussed herein will be discussed with respect to FIGS. 12 through 14. Referring now to FIG. 12, one the process is complete as discussed above, the stage is stepped in the x-z plane in a serpentine pattern over the objective (x) as the tissue is imaged. After imaging, the feeder wheels are reversed and the disposable is removed from the system dock as illustrated in FIG. 13. The, the insert is removed from the disposable as illustrated in FIG. 14. The biopsy is removed from the insert. The insert is discarded and the biopsy is set aside for downstream processing. The process discussed with respect to FIGS. 5A through 14 may be repeated with the same staining/imaging chamber until all biopsies for a single organ site have been imaged. In some embodiments, staining/imaging chamber may be used a maximum of five times. Thus, FIGS. 12 through 14 illustrate the disposable module being removed from the system and the biopsy is removed from the disposable module.

As discussed briefly above, some embodiments of the present inventive concept provide a system for rapid on-site evaluation (ROSE) of biological tissues that improves speed, efficiency and accuracy of biopsies. Some embodiments of the present inventive concept greatly reduce the number of repeat biopsies needed, save costs associated with personnel and rooms and may greatly increase revenue associated with biopsy procedures.

Various details of the disposable module will not be discussed with respect to FIGS. 15 through 34. A disposable biopsy staining kit in accordance with some embodiments includes a stain movement mechanism, stain storage mechanism, housing and biopsy Insert 1300. In some embodiments, the disposable biopsy staining kit may be defined as collection of components responsible for housing the biopsy while it is stained and imaged.

In some embodiments, the stain movement mechanism includes Luer-Lock barbed adapters 1500, Transport tubes, a Syringe Manifold 1402, a Barbed sled 601 and a Syringe Manifold Seal 1700. In some embodiments, the Stain movement mechanism may be defined as the components responsible for the transport of stain from the Stain storage mechanism onto the biopsy.

The Stain storage mechanism may include Modified Syringes Barrels 1501 and Modified syringe plungers 1502. In some embodiments, the Stain storage mechanism may be defined as the collection of components and features responsible for housing the stain.

The biopsy insert 1300 may include an Imaging Window 1201, Biopsy insert body, Absorbent Material 1200, and a Spring Seal mechanism 1102. In some embodiments, the biopsy insert 1300 may be defined as where the biopsy is placed for staining and imaging. The Biopsy Insert 1300 may interact with the Barbed sled 601 in some embodiments. The Biopsy Insert 1300 may be configured to push up the Barbed sled 601 once inserted into the Insert slot 100 in the front of the Disposable Biopsy Staining Kit.

In some embodiments, the microscope slide compatible insert preferably comprises Microscope slide compatible insert body, Microscope slide and Microscope slide rubber Gasket. In some embodiments, the Microscope slide compatible insert may be defined as a sample carrier that adapts whole microscope slides for use in the system.

In some embodiments, the Modified Syringes Barrels 1501 may be defined as the three barrel that hold stains separately prior to imaging. The Modified Syringes Barrels 1501 may be coupled with the Luer-Lock barbed adapters 1500. The Modified Syringes Barrels 1501 may interact with the Modified syringe plungers 1502 in some embodiments. Spatially, the Modified Syringes Barrels 1501 may be positioned between within the Top Shell 202 and within the Top half of stain storage mechanism holder 201. The Modified Syringes Barrels 1501 may be shaped as a cylindrical.

In some embodiments, the Modified syringe plungers 1502 may be defined as the mechanism that pushes stain through the Modified Syringes Barrels 1501 and into the transport tubes. Spatially, the Modified syringe plungers 1502 may be positioned within the Modified Syringes Barrels 1501 in some embodiments. The Modified syringe plungers 1502 may interact with the Stain delivery mechanism in some embodiments.

In some embodiments, the housing includes a Top Shell 202 and a Bottom Shell 103. In some embodiments, the Housing may be defined as the two part shell that holds internal parts of the Disposable Biopsy Staining Kit in place.

The Top Shell 202 may include a top half of stain storage mechanism holder 201 and a syringe manifold seat 200. In some embodiments, the Top Shell 202 may be defined as the top half of the Housing. The Top Shell 202 may be shaped as a rectangle.

The Bottom Shell 103 may include an Objective window 101, an Insert slot 100, Male guiding grooves for the barbed sled and a Bottom half of stain storage mechanism holder 102. In some embodiments, the Bottom Shell 103 may be defined as the collection of components and features that make up the bottom half of the Housing. The Bottom Shell 103 may be shaped as a rectangle.

In some embodiments, the Imaging Window 1201 may be defined as the clear window where the biopsy rests while being stained and imaged. The Imaging Window 1201 may be configured to support the biopsy while allowing the Objective to image the biopsy from beneath. Spatially, the Imaging Window 1201 may be positioned in the Imaging window seat 801 in some embodiments. The Imaging Window 1201 may contain the material acrylic in some embodiments. However in other embodiments, Imaging Window 1201 may contain the material glass, polycarbonate or any clear plastic. The Imaging Window 1201 may be a rectangle.

In some embodiments, the Absorbent Material 1200 may be defined as the material used to wick fluids off of the Imaging Window 1201. Spatially, the Absorbent Material 1200 may be positioned between within the Absorbent material seat 800 and on the underside of the Biopsy Insert 1300. The Absorbent Material 1200 may interact with stain that is present on the microscope slide in some embodiments.

In some embodiments, the Biopsy insert body may include adjacent Incline planes for barbed sled interface 700, Finger Grips 701, a Spring seal mechanism window 702, an Imaging window seat 801 and Absorbent material seat 800. In some embodiments, the Biopsy insert body may be defined as the plastic portions of the Biopsy Insert 1300 that is made up of a collection of features.

In some embodiments, the Luer-Lock barbed adapters 1500 may be defined as the components that connects Modified Syringes Barrels 1501 to the transport tubes. The Luer-Lock barbed adapters 1500 may be configured for the connecting of the transport tubes to the Modified Syringes Barrels 1501. The Luer-Lock barbed adapters 1500 may be coupled with transport tubes and the Modified Syringes Barrels 1501.

In some embodiments, the Transport tubes may be defined as component that connects Luer-Lock barbed adapters 1500 to the Syringe Manifold 1402. The Transport tubes may be configured for the transportation of stain from the Modified Syringes Barrels 1501, through the Luer-Lock barbed adapters 1500, to the Syringe Manifold 1402. The Transport tubes may be coupled with Syringe Manifold 1402 and Luer-Lock barbed adapters 1500.

In some embodiments, the Syringe Manifold 1402 includes Barbed connectors for transport tubes 1401 and Hollow barb port 1400. In some embodiments, the Syringe Manifold 1402 may be defined as the common component that all transport tubes connect to. The Syringe Manifold 1402 may be configured for serving as a common outlet to which all stains flow before being pushed onto the biopsy. The Syringe Manifold 1402 may interact with the Barbed sled gasket 600 to create a liquid-tight seal in some embodiments. The Syringe Manifold 1402 may be coupled with transport tubes and the Syringe Manifold Seal 1700.

In some embodiments, the barbed sled 601 includes a Barbed sled body 303 and a Barbed sled gasket 600. In some embodiments, the Barbed sled 601 may be defined as collection of features and components that is pushed up by the Biopsy Insert 1300, puncturing the Syringe Manifold Seal 1700 via the Hollow barb 302 and allowing for the flow of stain onto the biopsy.

In some embodiments, the barbed sled body 303 includes a Barbed sled gasket seat 300, Female Guiding Grooves for bottom shell 301, a Hollow barb 302 and adjacent inclined planes for biopsy insert interface 400. In some embodiments, the Barbed sled body 303 may be defined as the collection of features that make up the Barbed sled 601.

In some embodiments, the Barbed sled gasket 600 may be defined as component responsible for creating a seal between the Syringe Manifold 1402 and the Barbed sled 601. The Barbed sled gasket 600 may be configured for the creation of a liquid-tight seal between the Syringe Manifold 1402 and the Barbed sled 601. The Barbed sled gasket 600 may be positioned in the middle of the Barbed sled 601, on the top surface of the Barbed sled 601 and within the Barbed sled gasket seat 300 in some embodiments. The Barbed sled gasket 600 may be shaped as a donut. In some embodiments, the Barbed sled gasket 600 has a diameter of mm.

In some embodiments, the Adjacent Incline planes for barbed sled interface 700 may be defined as Feature of the Biopsy Insert 1300 that allows for vertical motion of the barbed sled when interfaced with the Adjacent Incline planes for barbed sled interface 700. Spatially, the Adjacent Incline planes for barbed sled interface 700 may be positioned on the left and right sides of the Biopsy Insert 1300 body in some embodiments. The Adjacent Incline planes for barbed sled interface 700 may interact with the corresponding Adjacent inclined planes for biopsy insert interface 400 located on the Barbed sled body 303 in some embodiments. The Adjacent Incline planes for barbed sled interface 700 may be configured for pushing up the Barbed sled 601 once the Biopsy Insert 1300 is placed in the Insert slot 100 of the Disposable Biopsy Staining Kit.

In some embodiments, the Finger Grips 701 may be defined as the bumps on the left and right sides of the Biopsy Insert 1300 that allow for easy grip. The Finger Grips 701 may be configured for ease of insertion and removal of the Biopsy Insert 1300. Spatially, the Finger Grips 701 may be positioned on the left and right side of the back of the Biopsy Insert 1300 body in some embodiments. The Finger Grips 701 may be shaped as a semi-circle.

In some embodiments, the Barbed sled gasket seat 300 may be defined as the area where the sled rubber seal is housed. The Barbed sled gasket seat 300 may be configured for housing the Barbed sled gasket 600. The Barbed sled gasket seat 300 may be positioned on the top of the Barbed sled body 303, in the middle of the Barbed sled body 303 and around the Hollow barb 302 in some embodiments. In some embodiments, the Barbed sled gasket seat 300 has a diameter of mm. In some embodiments, the diameter of the Barbed sled gasket seat 300 may be calculated by the diameter of the Barbed sled gasket 600. The Barbed sled gasket seat 300 may be shaped as a circle.

In some embodiments, the Female Guiding Grooves for bottom shell 301 may be defined as the two pair of grooves on the left and right side the Barbed sled 601 responsible for guiding the motion of the sled as it moves up and down. The Female Guiding Grooves for bottom shell 301 may be configured for guiding the vertical motion of the Barbed sled 601 as it interacts with the Biopsy Insert 1300. Spatially, the Female Guiding Grooves for bottom shell 301 may be positioned in pairs on the outer left and right sides of the Barbed sled body 303 in some embodiments. The Female Guiding Grooves for bottom shell 301 may interact with the male guiding grooves on the inner wall of the Bottom Shell 103 in some embodiments. In some embodiments, the Female Guiding Grooves for bottom shell 301 has a width of 3.25 mm. In some embodiments, the width of the Female Guiding Grooves for bottom shell 301 may be calculated by the width of the male guiding grooves+0.25 mm.

In some embodiments, the Hollow barb 302 may be defined as the feature of the Barbed sled 601 that punctures the Syringe Manifold Seal 1700. The Hollow barb 302 may be configured for piercing the Syringe Manifold Seal 1700 and allowing stain to flow onto the biopsy. The Hollow barb 302 may be positioned in the middle of the Barbed sled body 303, in the center of the Barbed sled gasket seat 300 and on top of the Barbed sled body 303 in some embodiments. The Hollow barb 302 interacts with multiple entities: It interacts with the Syringe Manifold 1402 and it also interacts with Syringe Manifold Seal 1700. In some embodiments, the Hollow barb 302 has a height of mm. The Hollow barb 302 may be shaped as a cone.

In some embodiments, the Adjacent inclined planes for biopsy insert interface 400 may be defined as the feature of the Barbed sled 601 that allows for vertical motion when interfaced with the Biopsy Insert 1300. The Adjacent inclined planes for biopsy insert interface 400 may be configured for promoting the vertical movement of the Barbed sled 601. Spatially, the Adjacent inclined planes for biopsy insert interface 400 may be positioned on the inner left and right walls of the Barbed sled 601 in some embodiments. The Adjacent inclined planes for biopsy insert interface 400 may interact with the Adjacent Incline planes for barbed sled interface 700 on the Biopsy Insert 1300 to push the Barbed sled 601 upwards in some embodiments.

In some embodiments, the Objective window 101 may be defined as the hole in the bottom of the Bottom Shell 103 where the objective is positioned while imaging the biopsy. The Objective window 101 may be configured for allowing the objective image the biopsy without hitting the Bottom Shell 103. Spatially, the Objective window 101 may be positioned on the bottom of the Bottom Shell 103 in some embodiments. The Objective window 101 may be shaped as a rectangle.

In some embodiments, the Insert slot 100 may be defined as the slot in the front of the bottom shell where the insert is placed prior to imaging. Spatially, the Insert slot 100 may be positioned on the front face of the Bottom Shell 103 in some embodiments. The Insert slot 100 may be shaped as a rectangle.

In some embodiments, the Male guiding grooves for barbed sled may be defined as the two pairs of grooves on the left and right inner walls of the Bottom Shell 103 that act to guide the Barbed sled 601 in the vertical direction once the Biopsy Insert 1300 has placed in the Insert slot 100. The Male guiding grooves for barbed sled may be configured for guiding the Barbed sled 601 upwards as the Biopsy Insert 1300 is placed in the Insert slot 100. Spatially, the Male guiding grooves for barbed sled may be positioned in pairs on the left and right inner walls of the Bottom Shell 103 in some embodiments. The Male guiding grooves for barbed sled may interact with the Female Guiding Grooves for bottom shell 301 on the Barbed sled 601 in some embodiments.

In some embodiments, the Bottom half of stain storage mechanism holder 102 may be defined as the feature in the Bottom Shell 103 that interfaces with the Modified Syringes Barrels 1501 and Luer-Lock barbed adapters 1500 to hold the Stain storage mechanism in place. The Bottom half of stain storage mechanism holder 102 may interact with the Stain storage mechanism in some embodiments.

In some embodiments, the RFID chip for data tracking may be defined as the component in the Bottom Shell 103 that enables an RFID scanner to identify individual disposables for the purpose of data tracking.

In some embodiments, the Top half of stain storage mechanism holder 201 may be defined as the feature in the Top Shell 202 that interfaces with the Modified Syringes Barrels 1501 and Luer-Lock barbed adapters 1500 to hold the Stain storage mechanism in place. The Top half of stain storage mechanism holder 201 may interact with the Stain storage mechanism in some embodiments.

In some embodiments, the Syringe manifold seat 200 may be defined as the feature on the Top Shell 202 that holds the Syringe Manifold 1402 in place. Spatially, the Syringe manifold seat 200 may be positioned in the center of the Top Shell 202 in some embodiments. The Syringe manifold seat 200 may be shaped as a circle.

In some embodiments, the Syringe Manifold Seal 1700 may be defined as thin puncturable adhesive material that seals the Syringe Manifold 1402 prior to being punctured by the Hollow barb 302 of the Barbed sled 601. The Syringe Manifold Seal 1700 may be configured for sealing the Syringe Manifold 1402 until punctured by the Hollow barb 302. Spatially, the Syringe Manifold Seal 1700 may be positioned between on the bottom side of the Syringe Manifold 1402 and covering the Hollow barb port 1400 barb. The Syringe Manifold Seal 1700 may be shaped as a circle.

The Spring Seal mechanism 1102 preferably comprises Spring Seal body 900, Linear wave springs 1101 and Spring seal gasket 1100. In some embodiments, the Spring Seal mechanism 1102 may be defined as the collection of components responsible for pressing the Spring seal gasket 1100 onto the Imaging Window 1201 to reduce the likelihood, or possibly prevent, stain from coming into contact with the Absorbent Material 1200 prematurely. Spatially, the Spring Seal mechanism 1102 may be positioned between in the middle of the Biopsy Insert 1300 and in between the ramped insert body and the Imaging Window 1201. The Spring Seal body 900 preferably comprises Spring seal gasket seat 1000, Linear wave spring seats 1001 and Biopsy well 901. In some embodiments, the Spring Seal body 900 may be defined as plastic portion of the Spring Seal mechanism 1102. Spatially, the Spring Seal body 900 may be positioned within the Spring seal mechanism window 702 in some embodiments. The Spring Seal body 900 may contain the material plastic.

In some embodiments, the Linear wave springs 1101 may be defined as the spring material responsible for pushing the Spring Seal mechanism 1102 off of the Imaging Window 1201 of the Biopsy Insert 1300. Spatially, the Linear wave springs 1101 may be positioned between within the Linear wave spring seats 1001 and on the bottom side of the Spring Seal body 900. The Linear wave springs 1101 may interact with the Imaging Window 1201 to push the Spring Seal mechanism 1102 up off of the Imaging Window 1201 in some embodiments. The Linear wave springs 1101 may include a dimension of 18 and in some embodiments may also have a minimum length of 15 mm. In other embodiments, the length of the Linear wave springs 1101 may be calculated by the length of the Spring Seal mechanism 1102. The Linear wave springs 1101 may contain the material steel. The Linear wave springs 1101 may be shaped as a wave.

In some embodiments, the Spring seal gasket 1100 may be defined as the component responsible for sealing the Spring Seal mechanism 1102 to the Imaging Window 1201. Spatially, the Spring seal gasket 1100 may be positioned between within the Spring seal gasket seat 1000 and on the underside of the Spring Seal body 900. The Spring seal gasket 1100 may interact with the Imaging Window 1201 to prevent stain from reaching the Absorbent Material 1200 when the Spring Seal mechanism 1102 is being compressed in some embodiments. The Spring seal gasket 1100 may contain the material rubber. The Spring seal gasket 1100 may be shaped as a rectangle.

In some embodiments, the Spring seal gasket seat 1000 may be defined as the hollow space within the Spring Seal body 900 that houses the Spring seal gasket 1100. Spatially, the Spring seal gasket seat 1000 may be positioned on the bottom of the Spring Seal body 900 in some embodiments.

In some embodiments, the Linear wave spring seats 1001 may be defined as areas on the Spring Seal body 900 where Linear wave springs 1101 are housed.

In some embodiments, the Biopsy well 901 may be defined as the window in the middle of the Spring Seal body 900 where the biopsy is placed. The Biopsy well 901 may be shaped like a rectangle, in some embodiments. In alternative embodiments, the Biopsy well 901 may be shaped like Circle, oval or square.

In some embodiments, the Spring seal mechanism window 702 may be defined as Feature of the Biopsy Insert 1300 where the Spring Seal mechanism 1102 resides. The Spring seal mechanism window 702 may be shaped as a rectangle. Spatially, the Spring seal mechanism window 702 may be positioned in the middle of the Biopsy Insert 1300 in some embodiments.

In some embodiments, the Imaging window seat 801 may be defined as the feature on the Biopsy Insert 1300 where the Imaging Window 1201 sits. The Imaging window seat 801 may be shaped as a rectangular.

In some embodiments, the Absorbent material seat 800 may be defined as the feature on the Biopsy Insert 1300 where the Absorbent Material 1200 sits. Spatially, the Absorbent material seat 800 may be positioned on the underside of the Biopsy Insert 1300 in some embodiments.

In some embodiments, the Rubber gasket seat may be defined as feature on the Microscope slide compatible insert body where the rubber gasket sits.

In some embodiments, the Microscope slide seat may be defined as the feature on the Microscope slide compatible insert body where the Microscope slide is placed.

In some embodiments, the Barbed connectors for transport tubes 1401 may be defined as three barbed connectors on the Syringe Manifold 1402 positioned 90 degrees apart from one another that serve as connection points for the transport tubes. The Barbed connectors for transport tubes 1401 may be configured for the tight seal between the transport tubes and the Syringe Manifold 1402. Spatially, the Barbed connectors for transport tubes 1401 may be positioned between near the base of the Syringe Manifold 1402 and positioned 90 degrees apart from one another. The Barbed connectors for transport tubes 1401 may interact with the transport tubes in some embodiments. The Barbed connectors for transport tubes 1401 may be shaped as a cone.

In some embodiments, the Hollow barb port 1400 may be defined as the location where the Hollow barb 302 punctures the Syringe Manifold Seal 1700. Spatially, the Hollow barb port 1400 may be positioned between on top of the Syringe Manifold 1402 and in the center of the Syringe Manifold 1402. The hollow barb port 1400 may be shaped as a cone.

Figure 35A:
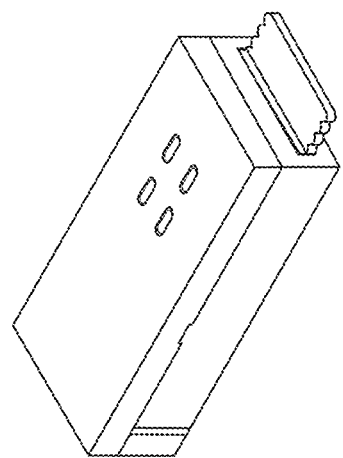
FIG. 35A is an isometric view of a biopsy being placed in the biopsy well of the biopsy insert in accordance with some embodiments of the present inventive concept.
Figure 35B:
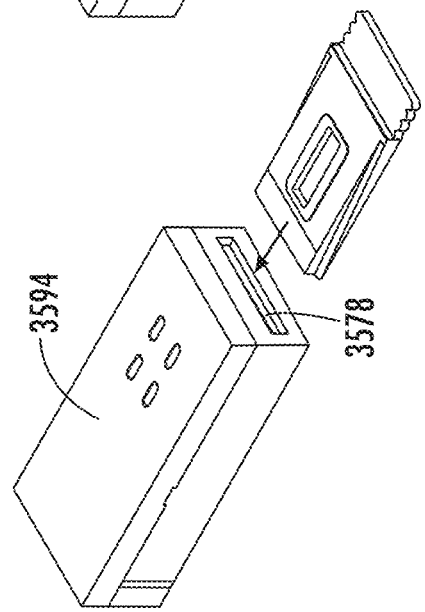
FIG. 35B is an isometric view of the biopsy insert being slid into the insert slot 3578 of the staining cartridge/chamber in accordance with some embodiments of the present inventive concept.
Figure 35C:
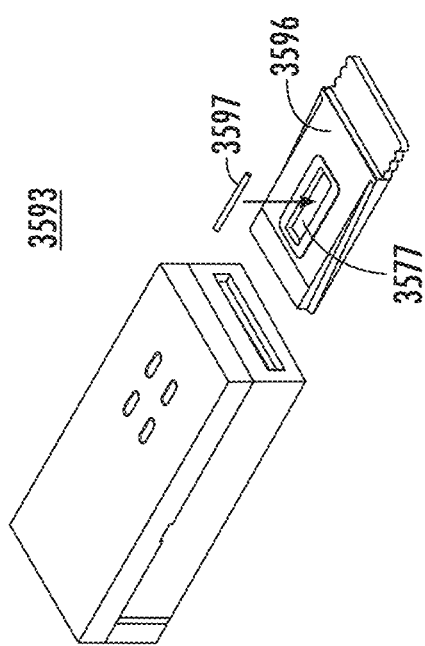
FIG. 35C is an isometric view of the staining cartridge/chamber having the biopsy insert positioned therein with the biopsy in place in accordance with some embodiments of the present inventive concept.

Further embodiments of disposables 3593 in accordance with some embodiments of the present inventive concept will be discussed below with respect to FIGS. 35A through 47B. Referring to FIGS. 35A through 35C, various stages of a biopsy being placed in the biopsy insert will be discussed. FIG. 35A is an isometric view of a biopsy 3597 being placed in the biopsy well 3577 of the biopsy insert 3596. FIG. 35B is an isometric view of the biopsy insert 3596 being slid into the insert slot 3578 of the staining cartridge/chamber 3594. FIG. 35C is an isometric view of the staining cartridge/chamber 3594 having the biopsy insert 3596 positioned therein with the biopsy 3597 in place. In some embodiments, the biopsy 3597 may be removed from, for example, a biopsy gun, using tweezers and may be placed in the biopsy well 3577 of the of the biopsy insert 3596 where it rests on the imaging window 3501 as shown in FIG. 35A. The biopsy insert 3596 is then pushed into the staining cartridge/chamber 3594 through the insert slot 3578 as shown in FIGS. 35B and 35C.

FIGS. 36A through 36D will now be discussed. FIG. 36A is an isometric view illustrating the relative positions of the Sled 3602 and biopsy insert 3596 prior to placing the biopsy insert 3596 into the staining cartridge (not shown). FIG. 36B is a diagram illustrating the relative positions of the sled 3602 and the biopsy insert 3596 after the biopsy insert 3596 has been placed in the staining cartridge (not shown). The sled 3602 is pushed up by the biopsy insert 3596 via interaction between the adjacent inclined planes (Insert) 3604 and the adjacent inclined planes (sled) 3606 as shown in FIG. 36C. FIG. 36C is a side view of FIG. 36A illustrating the relative positions of the sled 3602 and biopsy insert 3596 prior to the biopsy insert 3596 being placed in the staining cartridge (not shown). Similarly, FIG. 36D is a side view of FIG. 36B illustrating the relative positions of a sled 3602 and biopsy insert 3596 after the biopsy insert 3596 has been placed in the staining cartridge (not shown). The sled 3602 is pushed up by the biopsy insert 3596 via interaction between the adjacent inclined planes (Insert) 3604 and the adjacent inclined planes (sled) 3606. In other words, adjacent inclined planes (Insert) 3604 on the left- and right-hand sides of the top surface of the biopsy insert 3596 interact with corresponding adjacent inclined planes (sled) 3606 on the bottom surface of the Sled 3602. This transforms the horizontal movement of the biopsy insert 3596 to vertical movement of the sled 3602.

Figure 48:
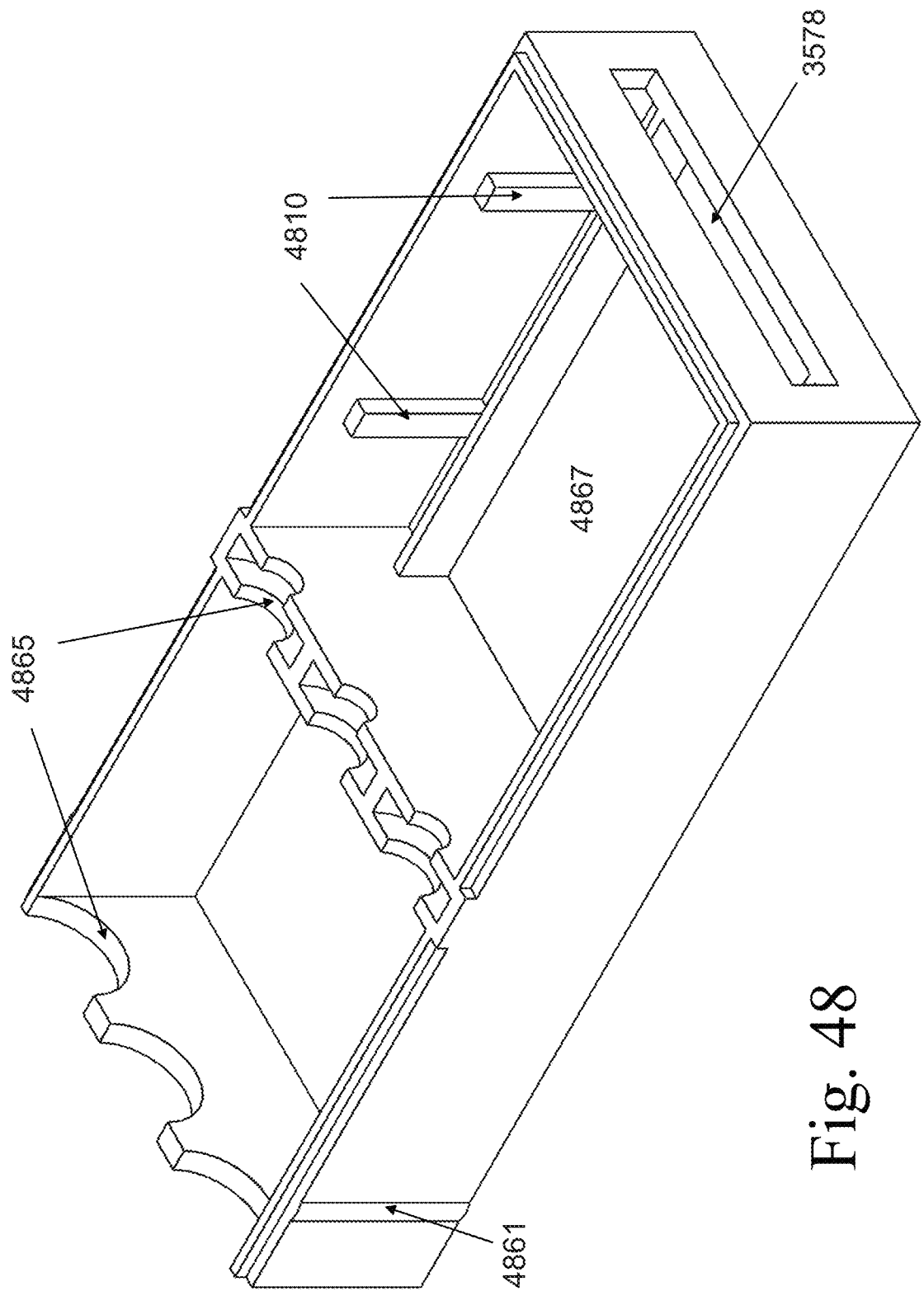
Figure 49:
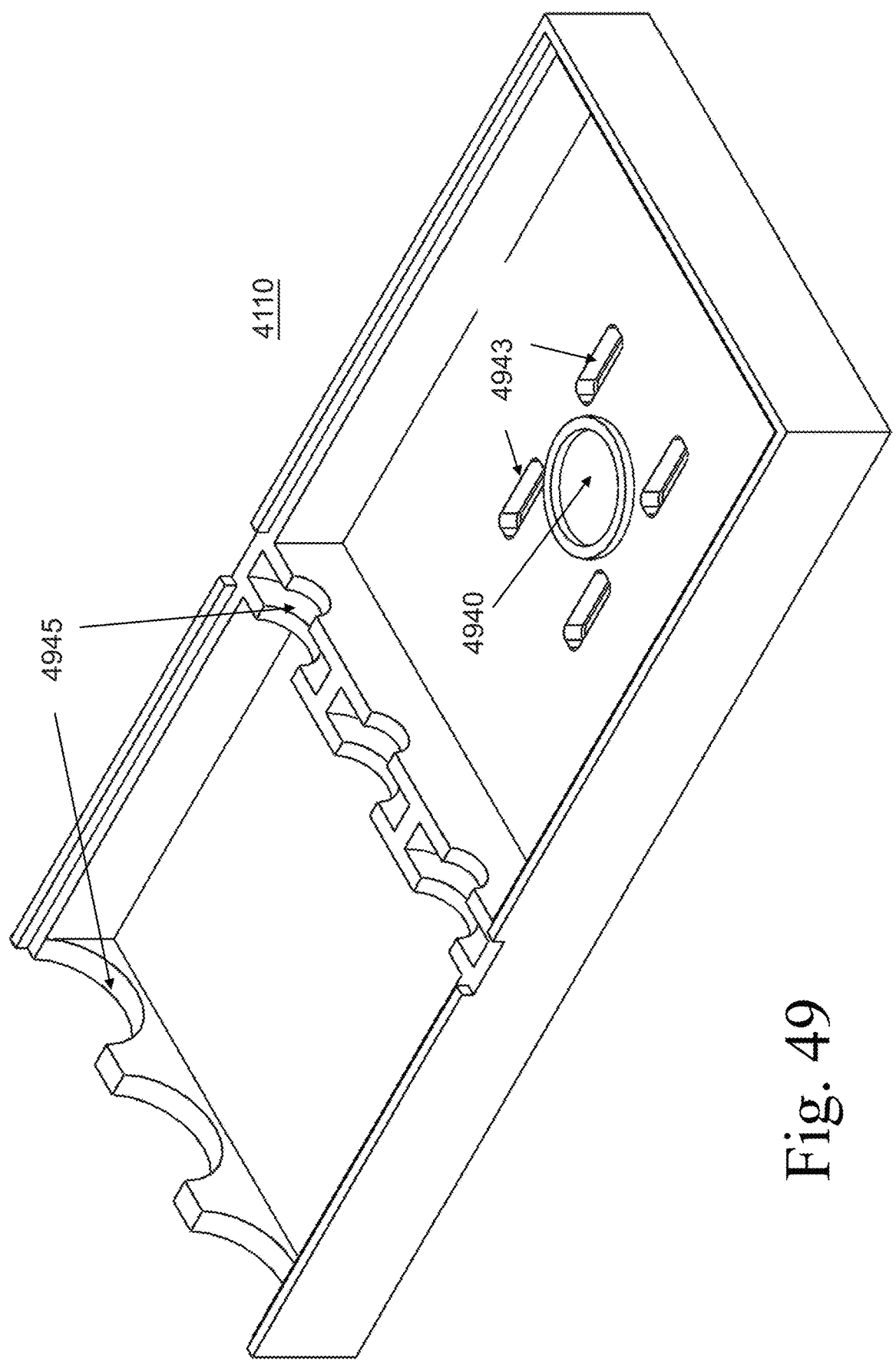

This movement is guided by the sled male guiding grooves 4810 (FIG. 48) and the sled female guiding grooves 4812. As a result of this vertical movement, the piercing barb 3720 on a top surface of the sled 3602 punctures the stain manifold seal 3721 that covers the piercing barb port 3723 of the stain manifold 3723 which resides in the stain manifold seat 4940 (FIG. 49). The sled gasket 3725 that sits on top of the sled 3602 in the sled gasket seat 3727 is pressed up against the bottom surface of the stain manifold 3723, around the piercing barb port 5430, making a seal as shown in FIGS. 37A through 37C.

In some embodiments, the biopsy insert may be configured such that a whole microscope slide can be used as an imaging window. In other embodiments, the piercing barb 3720 may be a part of the biopsy insert and the stain manifold seal may be positioned in line with the piercing barb 3720. These embodiments may not require the sled, as the piercing barb may be part of the biopsy insert.

Figure 38:
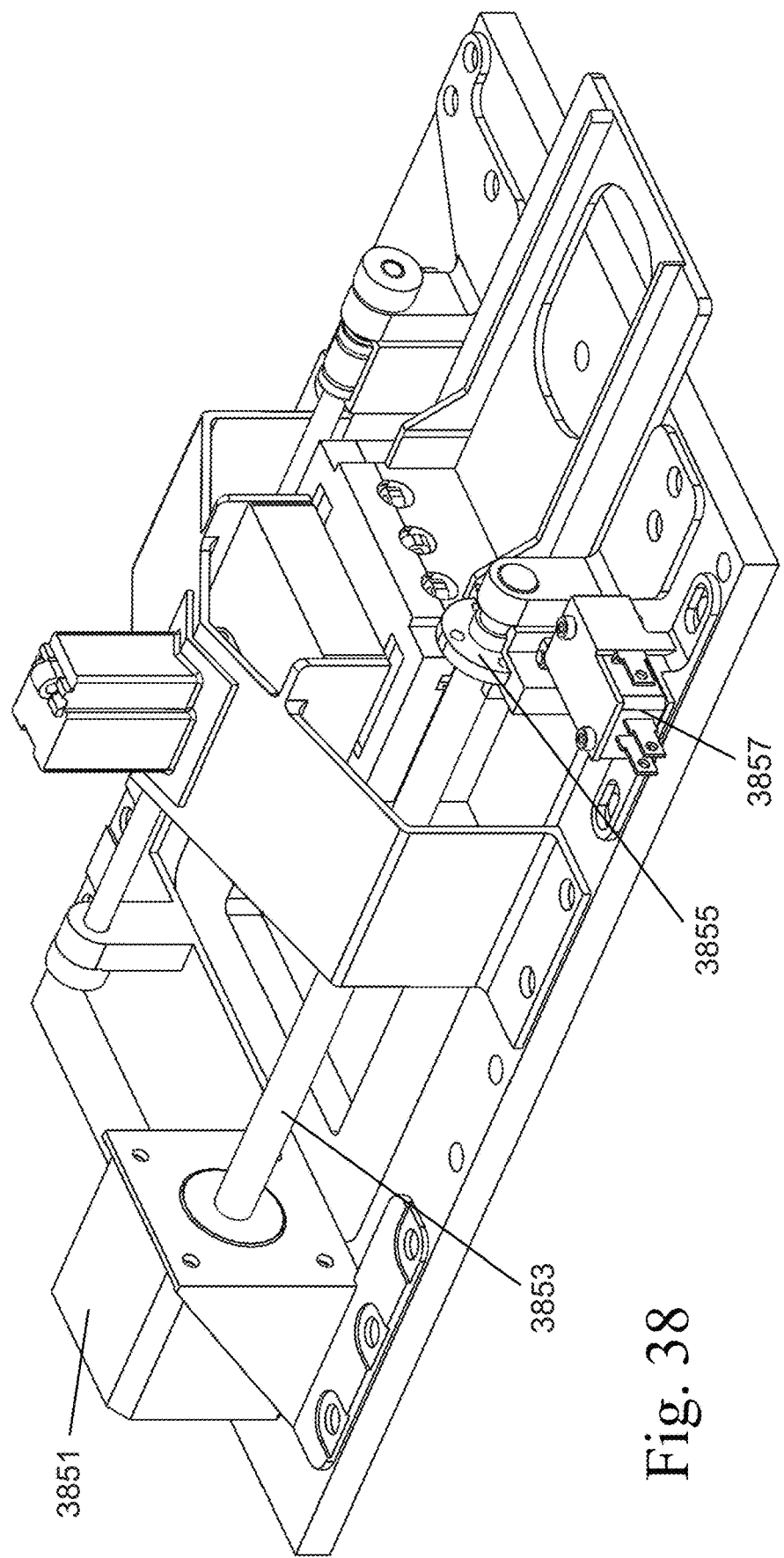
FIG. 38 is a diagram illustrating a carriage in a fully extended position on the stage in accordance with some embodiments of the present inventive concept.

Referring now to FIG. 38, is a diagram illustrating a carriage 3941 in the fully extended position on the stage in accordance with some embodiments of the present inventive concept. In particular, as illustrated the carriage 3941 (FIG. 39) is forwarded to the fully extended position on the stage. This movement is achieved via a stepper motor 3851 with a lead screw 3853 attached to the shaft and a lead nut 3855 attached to the carriage 3941. As the stepper motor 3851 spins, the lead nut 3855 is prevented from spinning, thus, creating linear motion of the carriage 3941. The carriage 3941 continues to be extended until it contacts a limit switch 3857 which stops the stepper motor 3851 as illustrated in FIG. 38.

FIGS. 39A through 39C are diagrams of the staining cartridge 3594, the biopsy insert 3596 and the carriage 3941 in various stages in accordance with embodiments of the present inventive concept. In particular, in FIG. 39A, the insert 3596 is in the staining cartridge 3594 and is not yet positioned in the carriage 3941. In FIG. 39B, the cartridge 3594 is positioned in the carriage 3941. In FIG. 39C, the carriage 3941 is being retracted after the cartridge 3594 has been positioned on the carriage 3941.

Figure 68:
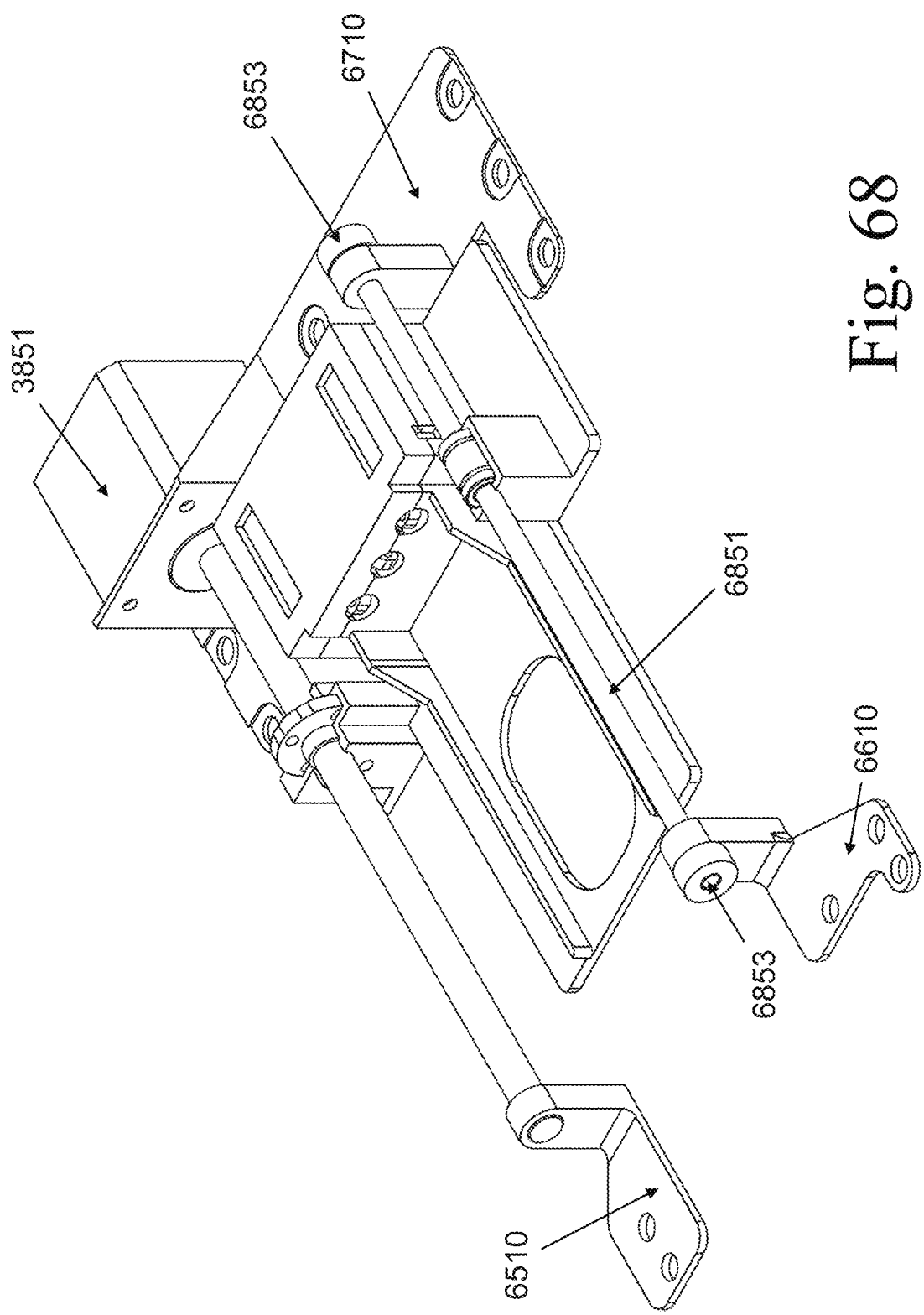

The carriage 3941 is supported on the opposite side of the lead screw 3853 by the carriage shaft 6851 (FIG. 68). The carriage shaft 6851 runs through a linear ball bearing 6461 and is held in place on both ends by carriage shaft collars 6853. The staining cartridge 3594 is slid into the carriage 3941 with the biopsy insert 3596 facing outwards, away from the stage. Haptic feedback ridges (bottom shell) 4861 on the bottom shell 4863 interact with corresponding haptic feedback ridges (Carriage) 6171 on the carriage 3941 to deliver haptic feedback to the user once the staining cartridge 3594 has been pushed far enough into the carriage 3941. After the staining cartridge 3594 has been placed, the carriage 3941 is retracted back onto the stage via the same stepper motor 3851, lead screw 3853, lead nut 3855 mechanism as illustrated in FIGS. 39A though 39C.

It will be understood that embodiments illustrated above are provided for example only and, thus, do not limit the present inventive concept. For example, although embodiments are discussed herein with respect to the stepper motor, lead screw and lead nut mechanism used to move the carriage, other methods may be used. These mechanisms may include a rack-and-pinion, linear servos, or conveyor belt without departing from the scope of the present inventive concept. In some embodiments, a limit switch may not be used to halt the movement of the stepper motor. In these embodiments, alternate ways to halt the movement of the stepper motor may include a magnetic sensor or a light emitting diode (LED)-Photoresistor pair.

FIG. 40A is a diagram. illustrating carriage in the fully retracted position prior to the clamp mechanism assembly deploying the cartridge clamp in accordance with some embodiments of the present inventive concept. FIG. 40B is a diagram of the carriage in the fully retracted position and the cartridge clamp deployed by the cartridge clamp linear servo in accordance with some embodiments of the present inventive concept.

In particular, the clamp mechanism assembly 4081 including the cartridge clamp 4083 and the clamp linear servo 4085 will be discussed. The clamp mechanism assembly 4081 serves at least two purposes. First, the cartridge clamp 4083 holds the staining cartridge 3594 in place on the stage. Second, the cartridge clamp 4083 presses down on the spring seal stamp 5391 (FIG. 53) via the spring seal stamp pegs 5393 (FIG. 53). Once the carriage 3941 has been fully retracted, the cartridge clamp linear servo 4085 deploys the cartride clamp 4083 which presses down on top of the staining cartridge 3594 as shown in FIGS. 40A and 40B. In some embodiments, the cartridge clamp 4083 may be actuated by a stepper motor or solenoid.

Figure 41C:
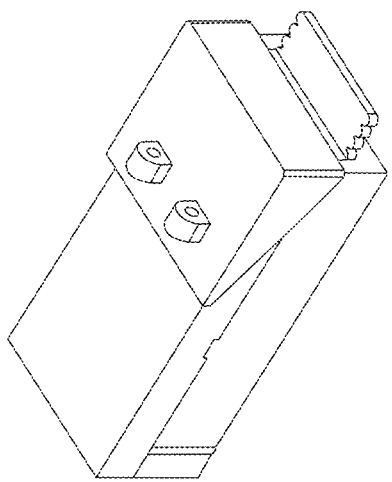
FIG. 41C is a diagram illustrating the orientation between the staining cartridge and the cartridge claim after the deployment of the cartridge clamp in accordance with some embodiments of the present inventive concept.
Figure 41B:
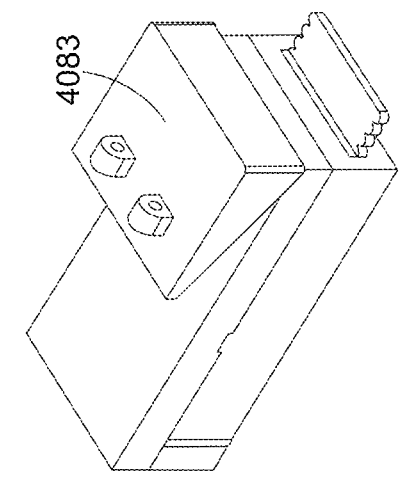
FIG. 41B is a diagram illustrating the orientation between the staining cartridge and the cartridge clamp prior to the deployment of the cartridge clamp in accordance with some embodiments of the present inventive concept.
Figure 41A:
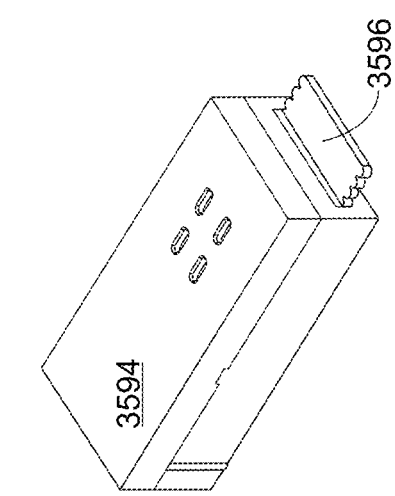
FIG. 41A is a diagram of the staining having the biopsy insert in place in accordance with some embodiments of the present inventive concept.
Figure 41F:
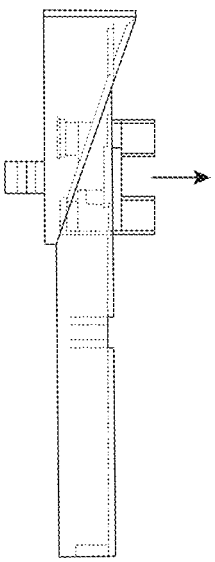
FIG. 41F is a side view illustrating orientation of the top shell, the spring seal stamp, and the cartridge clamp after the deployment of the cartridge clamp in accordance with some embodiments of the present inventive concept.
Figure 41E:
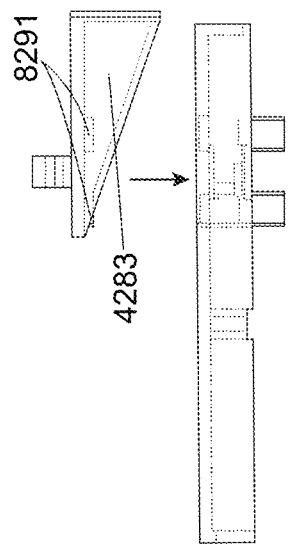
FIG. 41E is a side view illustrating orientation of the top shell, the spring seal stamp, and the cartridge claims prior to the deployment of the cartridge clamp in accordance with some embodiments of the present inventive concept.
Figure 41D:
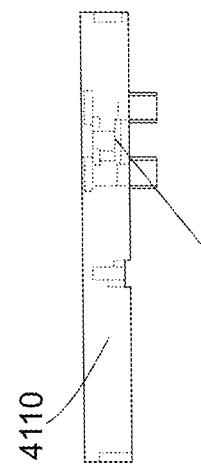
FIG. 41D is a side view illustrating orientation of top shell and the spring seal stamp in accordance with some embodiments of the present inventive concept.

FIG. 41A is a diagram of the staining cartridge having the biopsy insert in place in accordance with some embodiments of the present inventive concept. FIG. 41B is a diagram illustrating the orientation between the staining cartridge and the cartridge clamp prior to the deployment of the cartridge clamp in accordance with some embodiments of the present inventive concept. FIG. 41C is a diagram illustrating the orientation between the staining cartridge and the cartridge claim after the deployment of the cartridge clamp in accordance with some embodiments of the present inventive concept. FIG. 41D is a side view illustrating orientation of top shell and the spring seal stamp in accordance with some embodiments of the present inventive concept. FIG. 41E is a side view illustrating orientation of the top shell, the spring seal stamp, and the cartridge claims prior to the deployment of the cartridge clamp in accordance with some embodiments of the present inventive concept. FIG. 41F is a side view illustrating orientation of the top shell, the spring seal stamp, and the cartridge clamp after the deployment of the cartridge clamp in accordance with some embodiments of the present inventive concept. It will be understood that some components of the present inventive concept have not been shown in FIGS. 41A through 41F for clarity. As shown in FIGS. 41A through 41F, the cartridge clamp pegs 8291 of the on the bottom of the cartridge clamp 4083 transfer the downward force of the cartridge clamp linear servo 4085 to the spring seal stamp 5391, pushing it down.

The spring seal stamp holes (top shell) 4943 in the top shell 4110 allow for the cartridge clamp pegs 8291 on the bottom of the cartridge clamp 4083 to apply force to the spring seal stamp 5391. The spring seal stamp 5391 has corresponding extrusions that, when not being pushed, rest in the spring seal stamp holes (top shell) 4943. The spring seal stamp 5391 transfers the force from the cartridge clamp 4083 to the spring seal 5210 through the spring seal stamp holes (sled) 5020 in the top surface of the sled 3602 as illustrated in FIGS. 41A through 41F.

FIG. 42A is a diagram illustrating relative positions of the spring seal stamp and the sled in accordance with some embodiments of the present inventive concept. FIG. 42B is a diagram illustrating relative positions of the spring seal stamp and the spring seal in accordance with some embodiments of the present inventive concept. In particular, as illustrated in Fig, On the bottom of the spring seal stamp 5391 are two restoring springs 5395. These restoring springs 5395 apply force between the spring seal stamp 5391 and the sled 3602. This serves two purposes: to push the sled 3602 back down when the biopsy insert 3596 is eventually removed; and to restore the spring seal stamp 5391 to its original position when the cartridge clamp 4083 is retracted as shown in FIGS. 42A and 42B.

FIG. 43A is a diagram illustrating orientation between the biopsy insert, the sled and the spring seal stamp in accordance with some embodiments of the present inventive concept. FIG. 43B is a diagram illustrating orientation between the biopsy insert and the spring seal stamp in accordance with some embodiments of the present inventive concept. FIG. 43C is a diagram illustrating orientation between the spring seal and the imaging window of the biopsy insert in accordance with some embodiments of the present inventive concept. FIG. 44F is a side view of the orientation between the spring seal, spring seal gasket and imaging window prior to the spring seal stamp pushing down on the spring seal in accordance with some embodiments of the present inventive concept. FIG. 43E is a side view illustrating orientation between the spring seal, spring seal gasket, and imaging window after the spring seal stamp pushes down on the spring seal in accordance with some embodiments of the present inventive concept. This results in the spring seal gasket making contact with the imaging window and the formation of a seal.

As illustrated, the spring seal 5210 is the component of the biopsy insert 3596 that is responsible for creating a seal around the biopsy. On the bottom surface of the spring seal 5210 are spring tabs 5220 that, when not being pushed down, lift the spring seal 5210 off the imaging window 3501. When the spring seal 5210 is being pushed down, however, this lifting force provided by the spring tabs 5220 is overcome by the downward force provided by the spring seal stamp 5391, which is pushed by the cartridge clamp 4083, which is pushed by the cartridge clamp linear servo 4085 as illustrated in FIGS. 43A through 43E. On the bottom of the spring seal 5210 is the spring seal gasket 5510 (FIG. 55). The spring seal gasket 5510 creates a seal with the imaging window 3501 when the spring seal 5210 is pressed down.

In some embodiments, the spring tabs on the bottom of the spring seal may not be inherent to the body of the spring seal. In these embodiments, alternate methods of lifting the spring seal off of the imaging window may include, for example, a linear wave spring or similar spring type.

FIG. 44A is a diagram illustrating a stage adapter assembly 8410 with staining cartridge in place and carriage fully retracted in accordance with some embodiments of the present inventive concept. FIG. 44B is a diagram illustrating orientation between the staining cartridge and the carriage linear servos when the staining cartridge is placed on the carriage in accordance with some embodiments of the present inventive concept. FIG. 44C is a diagram illustrating orientation between the carriage linear servos and the inner components of the staining cartridge with the biopsy insert in place in accordance with some embodiments of the present inventive concept.

As illustrated, with the staining cartridge 3594 held in place and the spring seal 5210 deployed by the force of the cartridge clamp 4083, the biopsy is ready to be stained. The carriage linear servos 6210 housed in the linear servo bay 6173 in the back of the carriage 3941 actuate to push plungers within stain syringes 5610 that are loaded with stain or wash and housed within the staining cartridge 3594. The stain syringes 5610 are held in place by the syringe slots (Bottom Shell) 4865 and the syringe slots (Top Shell) 4945. Stain is pushed from the stain Syringes 5610, through the stain transport tubes 5620 into the stain manifold 3723, though the piercing barb 3720 on the sled 3602, and into the biopsy well 3577 where it stains the biopsy as illustrated in FIGS. 44A through 44C.

Although embodiments of the present inventive concept are illustrated as using linear servos to stain the biopsy, embodiments of the present inventive concept are not limited to this configuration. For example, the biopsy may be stained using small pumps or microfluidic techniques without departing from the scope of the present inventive concept.

FIG. 45A is a diagram illustrating the biopsy insert with stain being dropped into the biopsy well while the spring seal is pressed down, sealing the area around the biopsy and allowing stain to accumulate in accordance with some embodiments of the present inventive concept. FIG. 45B is a diagram illustrating the biopsy insert while the biopsy is being stained in accordance with some embodiments of the present inventive concept. FIG. 45C is a diagram illustrating the biopsy insert after the staining time has elapsed and the spring seal is released in accordance with some embodiments of the present inventive concept. FIG. 45D is a diagram illustrating the biopsy insert after the stain is removed from the imaging window in accordance with some embodiments of the present inventive concept.

As illustrated, because the spring seal 5210 has sealed the area around the biopsy, the stain pools up and ensures all parts of the biopsy are stained. The spring seal is maintained during this time. When the biopsy has been stained for the appropriate amount of time, the cartridge clamp 4083 is released. The spring tabs on the bottom of the spring seal lift the spring seal off of the imaging window, allowing stain to drain out under the spring seal gasket and away from the biopsy. This allows the spring tabs 5220 on the bottom of the spring seal 5210 to push the spring seal 5210 up off the imaging window 3501 as illustrated in FIGS. 45A through 45D. After the stain is removed from the imaging window. Wash is then pushed onto the biopsy via the same pathway as the stains.

FIGS. 46A and 46B are diagrams illustrating the biopsy insert in accordance with some embodiments. FIG. 46B is a cross section of the biopsy insert of FIG. 46A along the line A-A' in accordance with some embodiments of the present inventive concept. As illustrated, within the biopsy insert 3596, surrounding the spring seal 5210, is a region filled with an absorbent material 5520. When then spring seal 5210 is released lifting the spring seal gasket 5510, the stain contacts the absorbent material 5520 and it is wicked away from the imaging window 3501, leaving behind a stained biopsy as illustrated in FIG. 46. One of the carriage linear servos 6210 in the carriage 3941 then actuates, washing the biopsy. Substantially all the wash is wicked away by the absorbent material 5520 and the biopsy is ready to be imaged.

In some embodiments, an absorbent material may not be used to remove stain from the imaging window. In these embodiments, pumps or microfluidic techniques may be used to remove the stain without departing from the scope of the present inventive concept.

Once the stain is removed using any method, the biopsy is imaged though the imaging window 3501.

FIG. 47A is a diagram of the stage adapter assembly with the carriage fully extended in accordance with some embodiments of the present inventive concept. FIG. 47B is a diagram illustrating the stage adapter assembly with the carriage fully extended and the biopsy insert removed from the staining cartridge in accordance with some embodiments of the present inventive concept.

As illustrated, after the biopsy is imaged, the carriage 3941 extends until it contacts the limit switch 4710. Using the Finger Grips 5110 on the sides of the biopsy insert 3596 the user removes the used biopsy insert 3596, the biopsy is set aside for downstream processing, and a fresh biopsy insert 3596 with a different biopsy is placed in the staining cartridge 3594 as illustrated in FIGS. 47A and 47B. The whole process may be repeated for each new biopsy. In some embodiments, the staining cartridge 3594 holds enough stain and wash to stain at least five biopsies, however, embodiments of the present inventive concept are not limited thereto.

In some embodiments, the staining cartridge 3594 may be modified to accommodate more or less volume of stain, allowing for more or fewer biopsies to be stained with one staining cartridge. Embodiments herein are provided as examples only.

FIGS. 48 through 60C are diagrams illustrating details with respect to the disposable component in accordance with some embodiments of the present inventive concept. In particular, FIG. 48 is a diagram illustrating a bottom shell 4863 of the disposable component in accordance with embodiments discussed herein. As illustrated, the bottom shell 4863 includes an insert slot 3578, an objective window (bottom shell) 4867, syringe slots 4865, sled male guiding grooves and haptic feedback ridges 4861.

FIG. 49 is a diagram of a top shell 4110 in accordance with some embodiments of the present inventive concept. As illustrated in FIG. 49, the top shell 4110 includes syringe slots 4945, a seat for the stain manifold 4940 and spring seal stamp holes 4943.

Figure 50A:
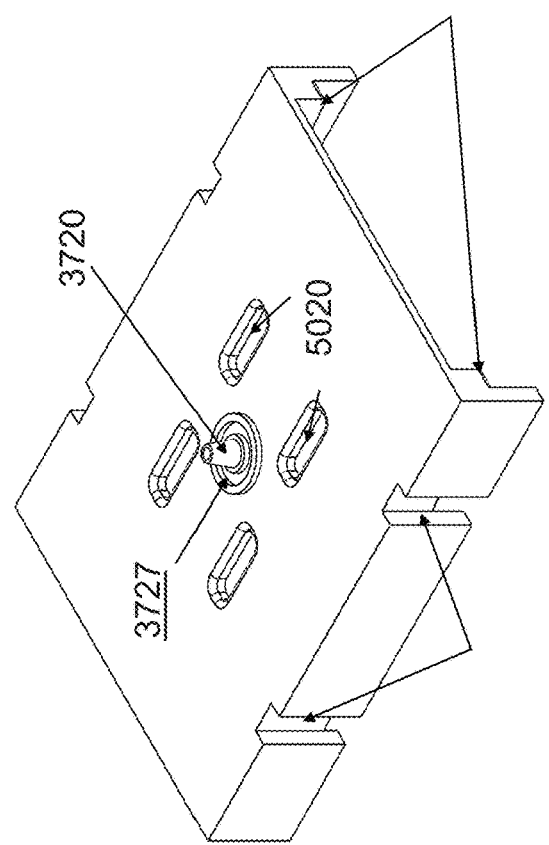
Figure 50B:
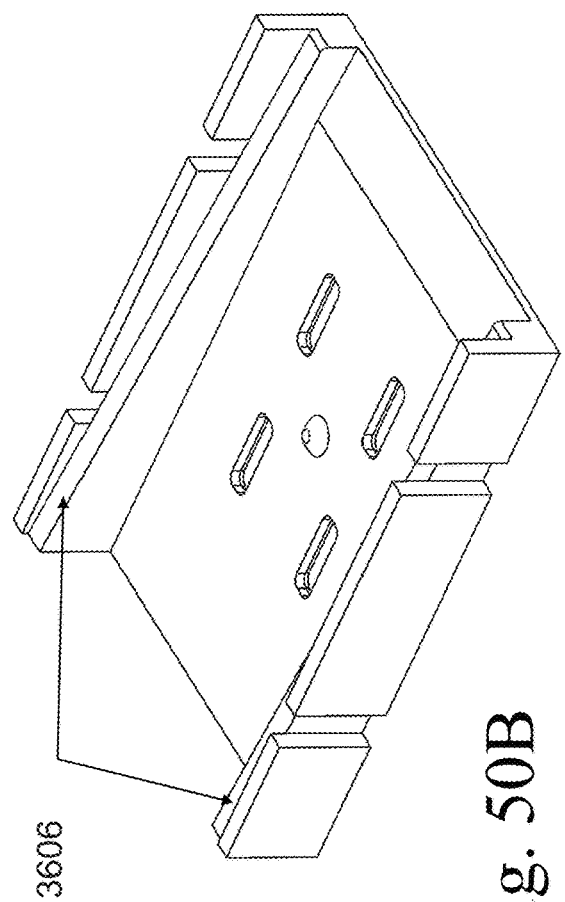

FIGS. 50A and 50B are diagrams illustrating diagrams of a top and bottom, respectively, of a sled in accordance with some embodiments of the present inventive concept. As illustrated, the sled 3602 includes female guiding grooves 4812, adjacent inclined planes (Sled) 3606, a piercing barb 3720, a sled gasket seat 3727 and spring seal stamp holes 5020.

FIGS. 51A and 51B are diagrams of the top and bottom, respectively, of the biopsy insert body 5120 in accordance with some embodiments of the present inventive concept. The biopsy insert body 5120 includes a spring seal seat 5150, finger grips 5110, adjacent inclined planes 3604, an imaging window seat 5140 and an absorbent material seat 5130.

FIGS. 52A and 52B are diagrams illustrating the top and bottom, respectively, of the spring seal 5210 in accordance with some embodiments of the present inventive concept. As illustrated, the spring seal 5210 includes a biopsy well 3577, spring tabs 3577 and a spring seal gasket seat 5230.

Figure 53A:
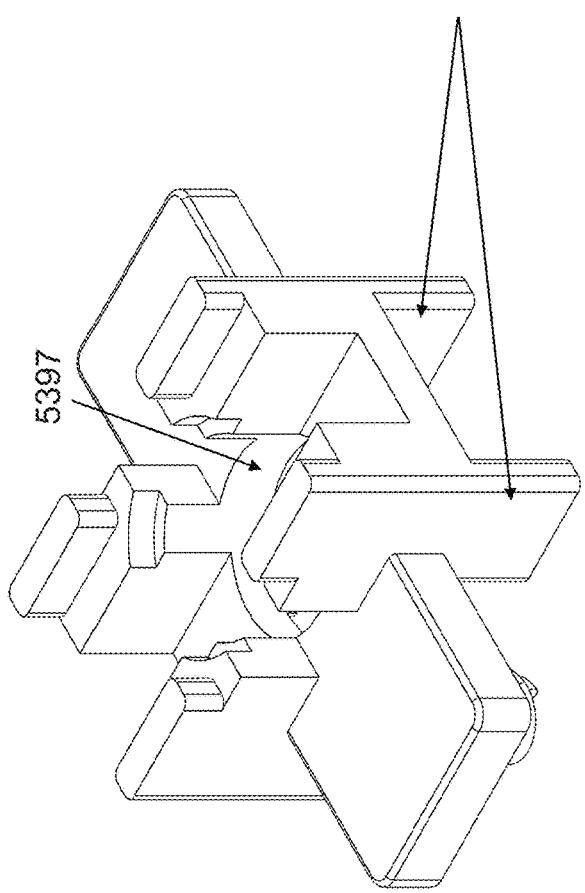
Figure 53B:
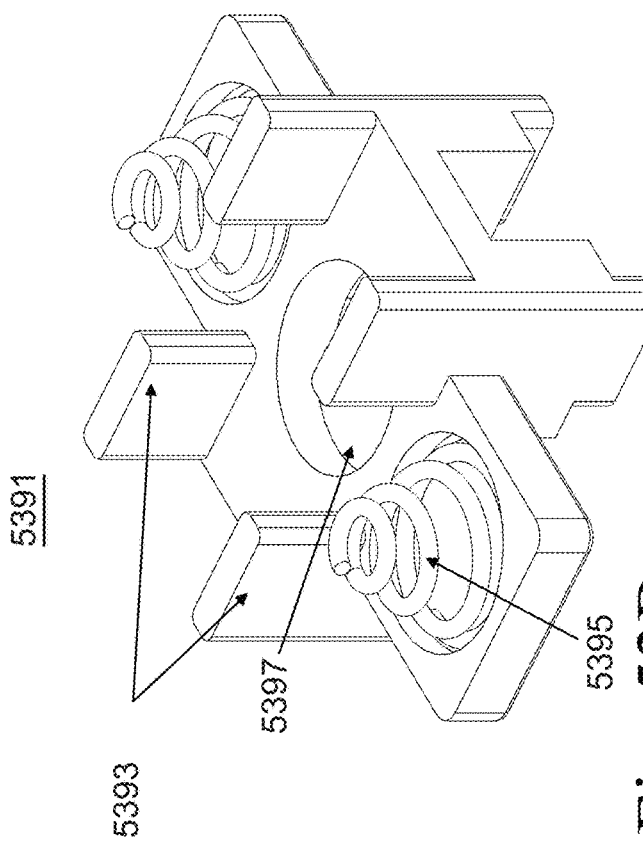

FIGS. 53A and 53B are diagrams illustrating the top and bottom view, respectively, of the spring seal stamp 5391 in accordance with some embodiments of the present inventive concept. As illustrated, the spring seal stamp 5391 includes spring seal stamp pegs 5393, a hole for the stain manifold 5397 and a restoring spring 5395. As illustrated in FIG. 53B, the restoring spring 5395 is in place.

Figure 54:
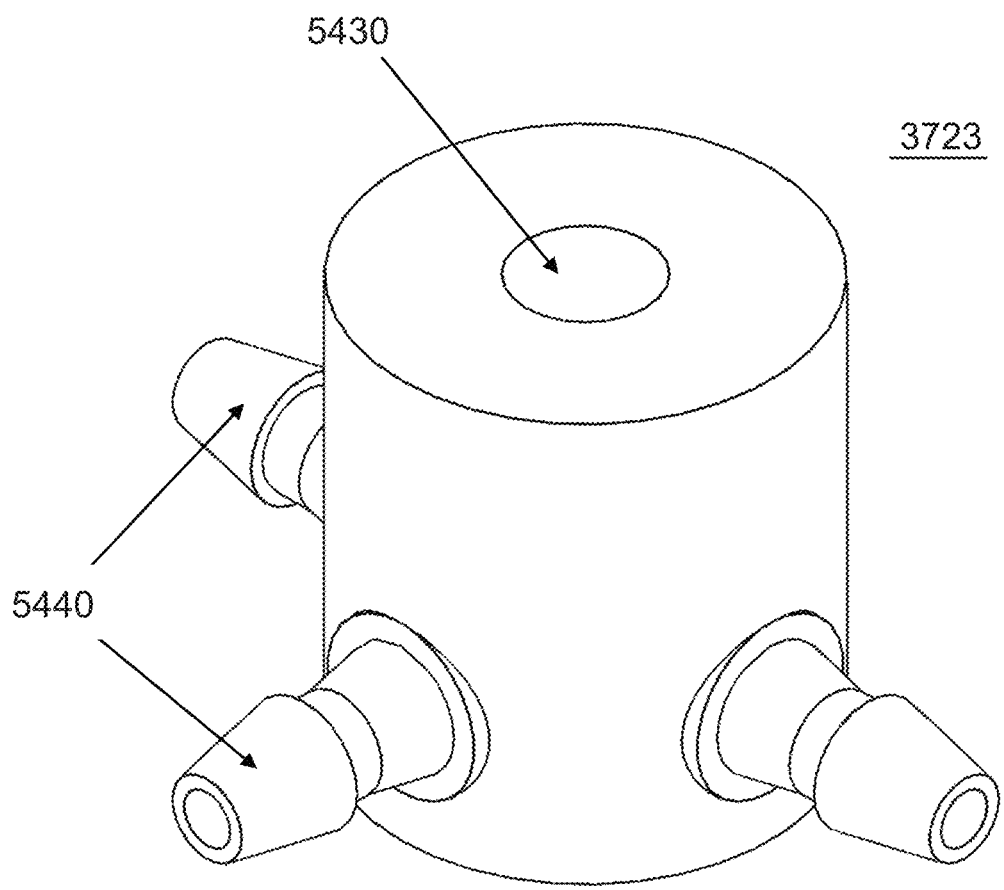

FIG. 54 is a diagram illustrating a stain manifold 3723 in accordance with some embodiments of the present inventive concept including a piercing barb port 5430 and barbed tube connectors 5440.

FIGS. 55A and 55B are a plan view and exploded view, respectively, of the insert assembly 3596 in accordance with some embodiments of the present inventive concept. As illustrated, the biopsy insert includes 3596 a spring seal gasket 5510, an absorbent material 5520 and an imaging window 3501.

Figure 56:
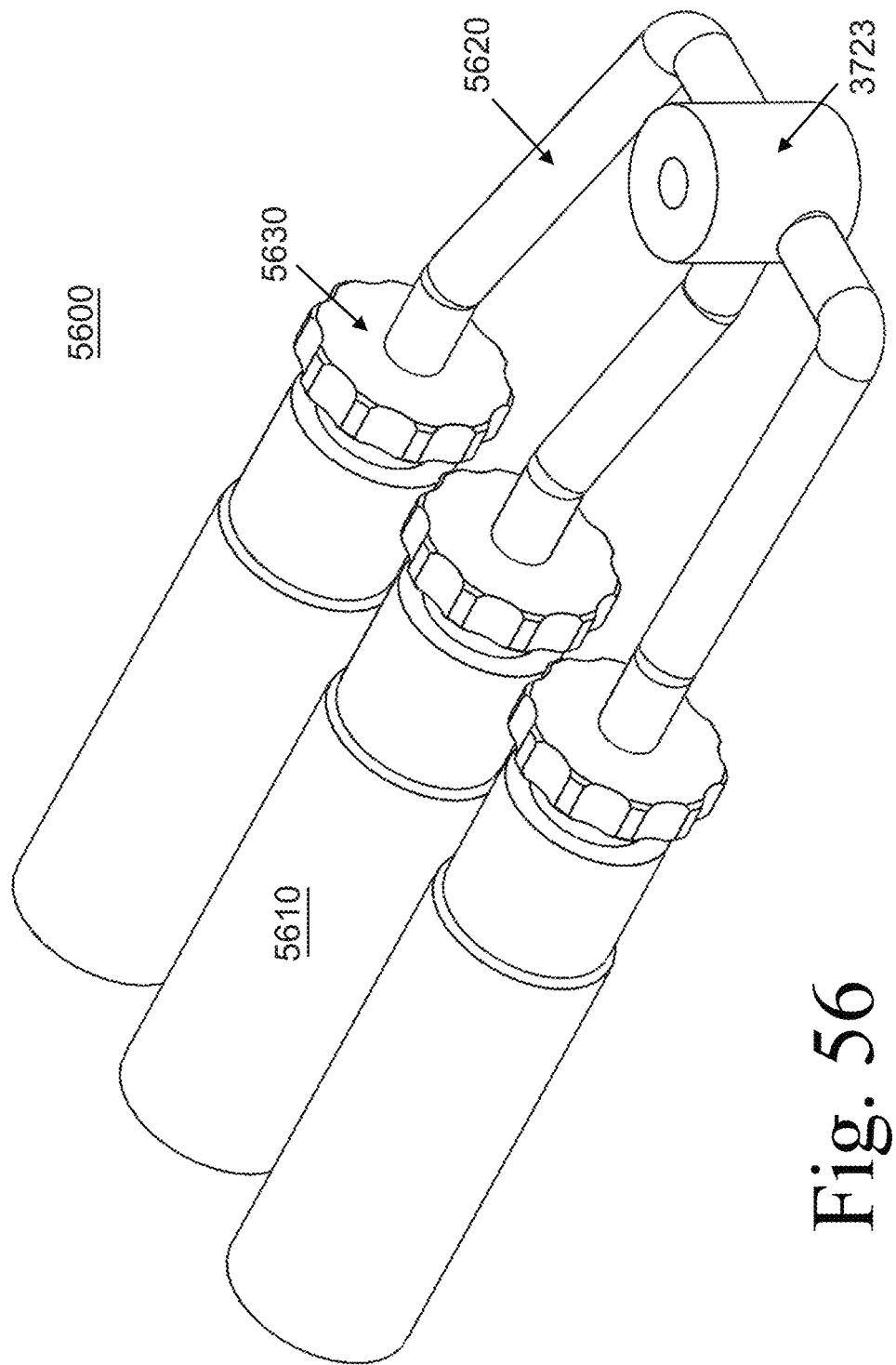

FIG. 56 is a diagram of a stain manifold 5395 connected to the stain transport tubes 3501 which lead to the stain syringes 5620 in accordance with some embodiments of the present inventive concept. As further illustrated, the staining storage assembly 5600 includes stain transport tube 5620, stain syringes 5610 and leur-lock barded adapters 5630.

Figure 57B:
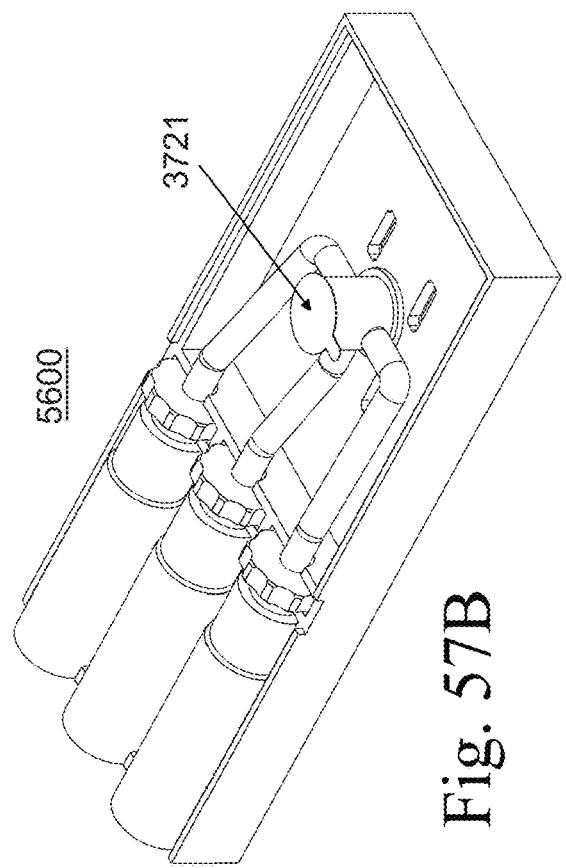
Figure 57A:
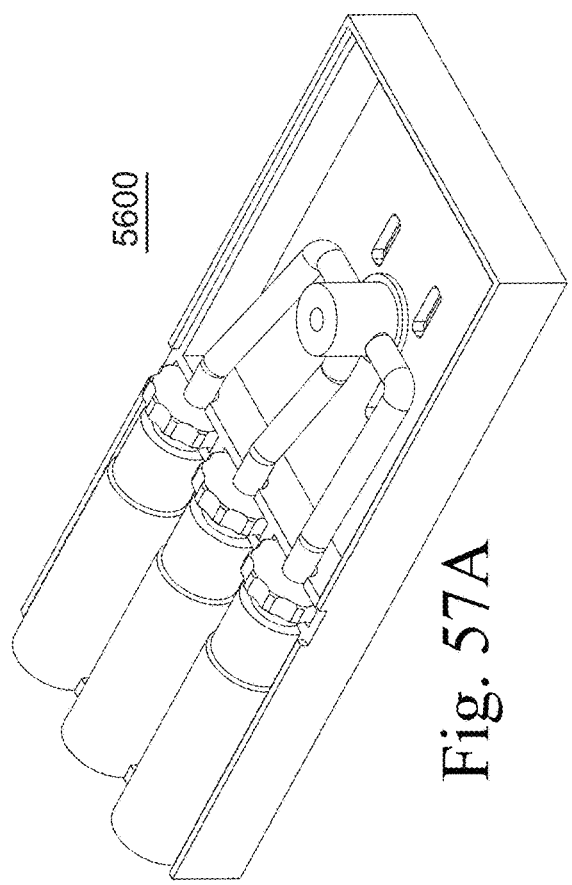

FIG. 57A is a diagram of the stain storage assembly 5600 positioned in the top shell 4110 in accordance with some embodiments of the present inventive concept. FIG. 57B is a diagram of stain storage assembly 5600 positioned in the top shell 4110 with the foil seal 3721 covering the piercing barb port 5430 of the syringe manifold 3723 in accordance with some embodiments of the present inventive concept.

Figure 58B:
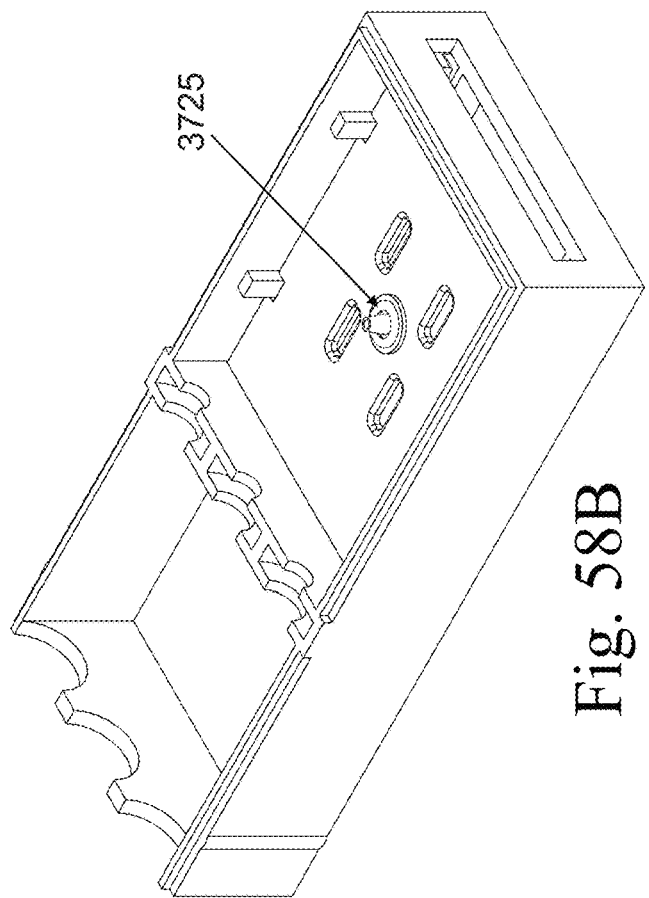
Figure 58A:
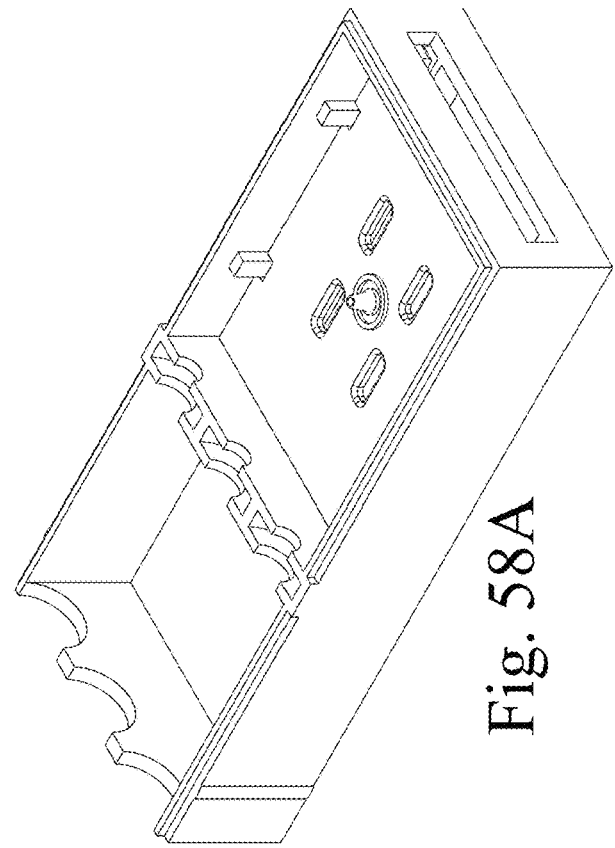

FIG. 58A is a diagram of the bottom shell 4863 with the sled 3602 in place in accordance with some embodiments of the present inventive concept. FIG. 58B is a diagram of the bottom shell 4863 with the Sled 3602 in place and the sled gasket 3725 in place in the sled gasket seat 3727 in accordance with some embodiments of the present inventive concept.

Figure 59B:
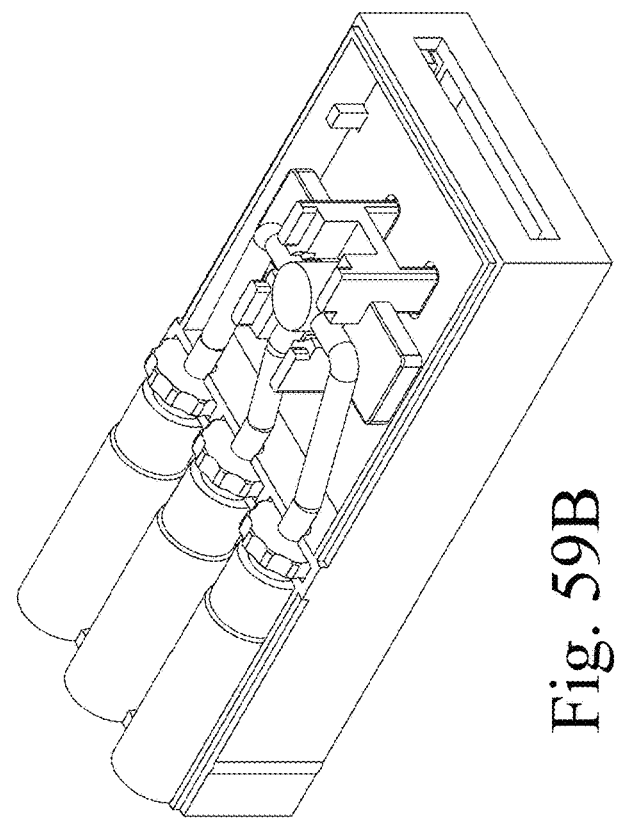
Figure 59A:
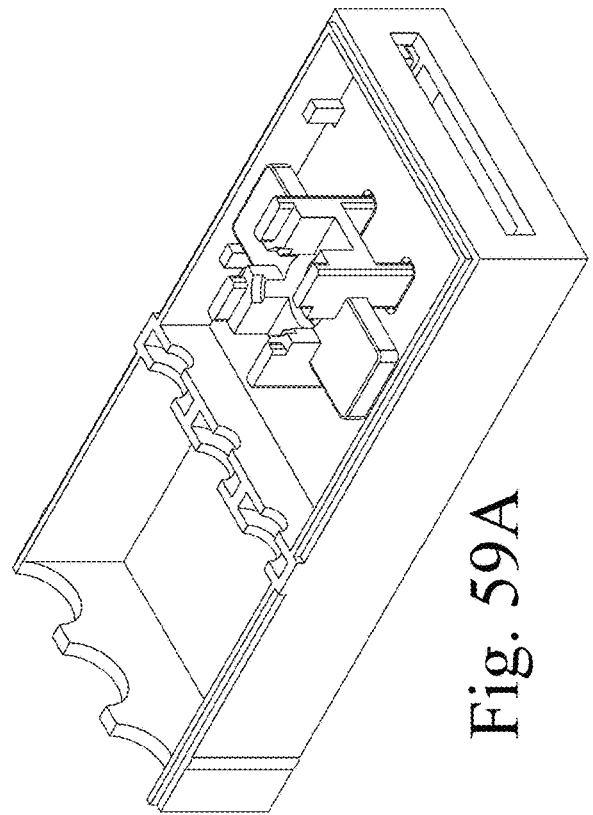

FIG. 59A is a diagram of a bottom shell 4863 with sled 3602 and spring seal stamp 5391 in place in accordance with some embodiments of the present inventive concept. FIG. 59B is a bottom shell 4863 with sled 3602, spring seal stamp 5391, and stain storage assembly 5600 in place in accordance with some embodiments of the present inventive concept.

Figure 60A:
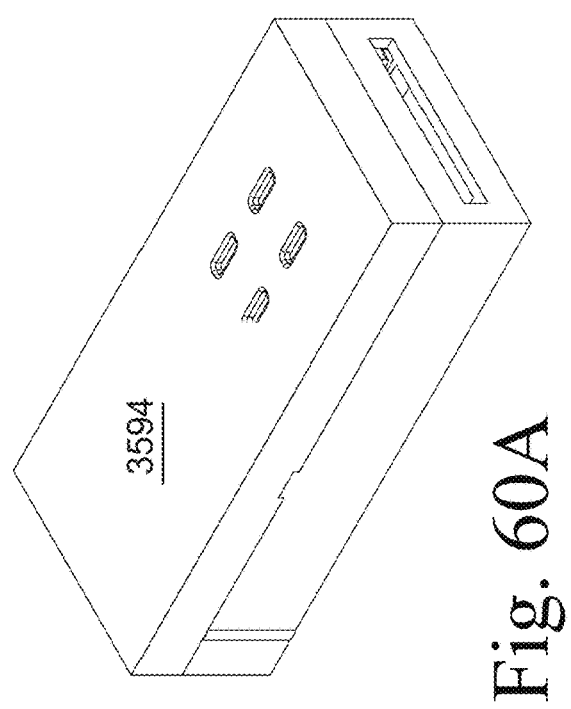
Figure 60B:
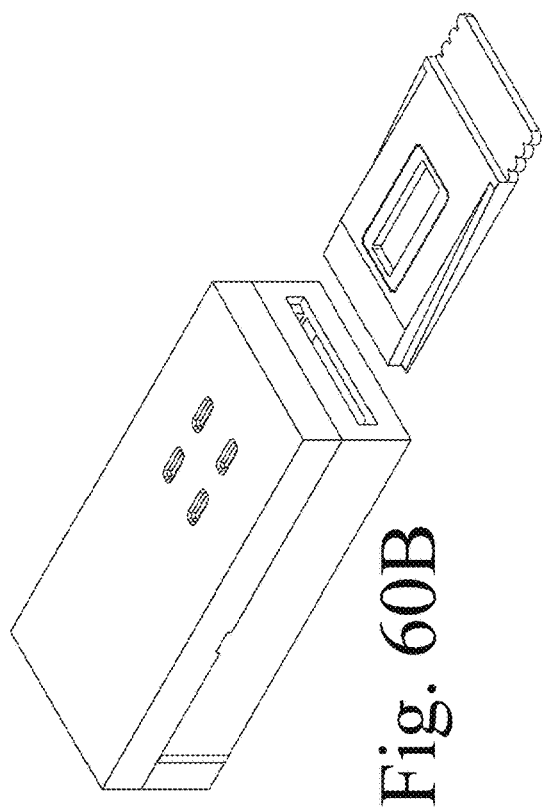
Figure 60C:
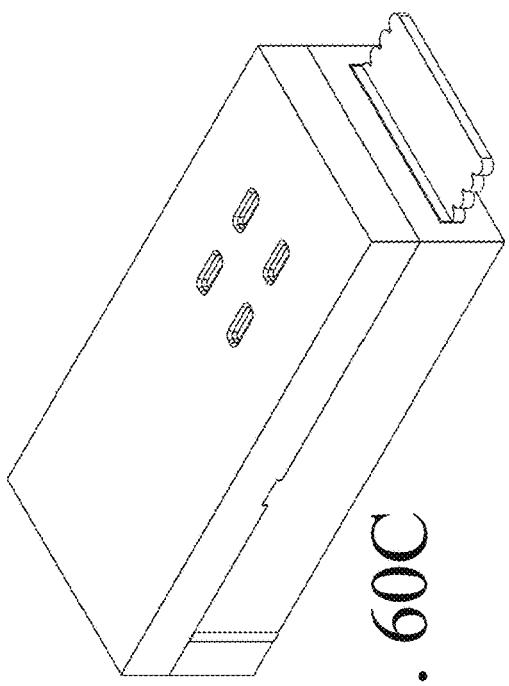

FIG. 60A is a diagram of an assembled staining cartridge 3594 in accordance with some embodiments of the present inventive concept. FIG. 60B is a diagram of a staining cartridge 3594 with biopsy insert 3596 ready for insertion in accordance with some embodiments of the present inventive concept. FIG. 60C is a diagram of the staining cartridge 3594 with biopsy insert 3596 in position in accordance with some embodiments of the present inventive concept.

FIGS. 61 through 78 are diagrams illustrating details with respect to the stage adapter in accordance with some embodiments of the present inventive concept. In particular, FIG. 61 is a plan view of a carriage 3941 in accordance with some embodiments of the present inventive concept. As illustrated, the carriage 3941 includes staining cartridge guiding rails 6175, an objective window (Carriage) 6177, haptic feedback ridges (Carriage) 6171, a linear servo bay 6173, lead nut housing 6178 and a linear ball bearing housing 6179.

Figure 62:
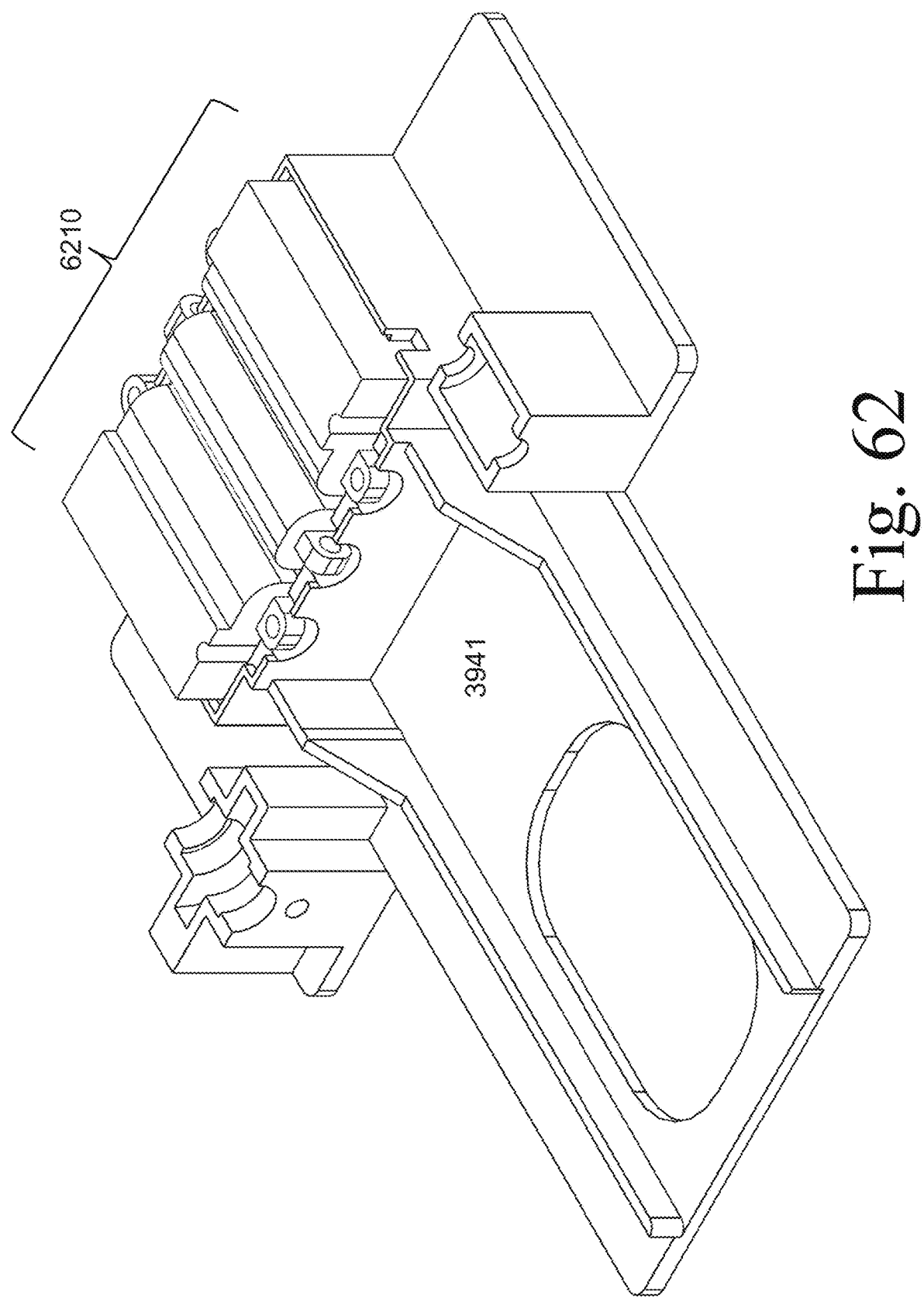

FIG. 62 is a diagram of a carriage 3941 with carriage linear servos 6210 in position in the Linear Servo Bay 617 in accordance with some embodiments of the present inventive concept.

Figure 63B:
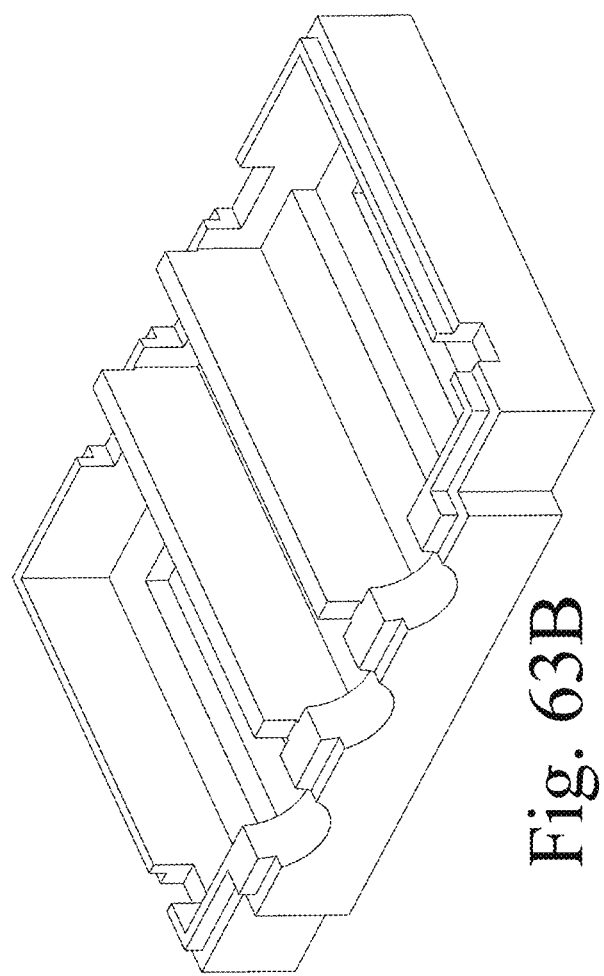
Figure 63A:
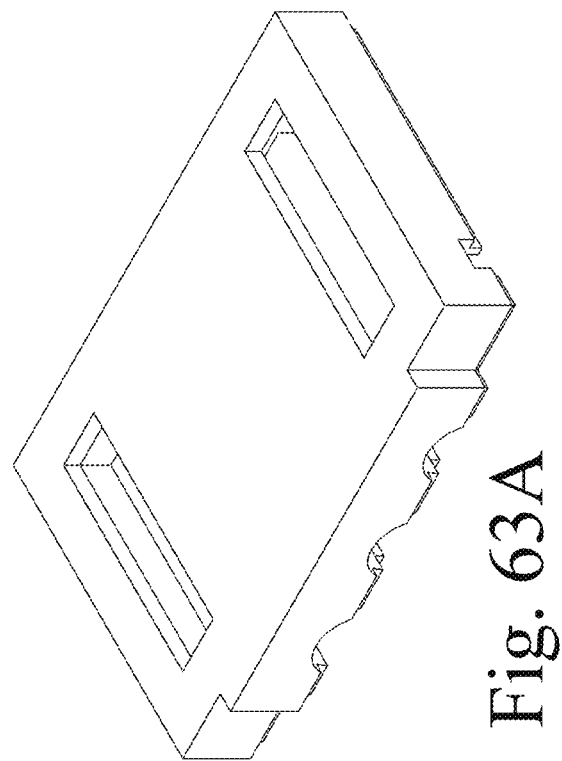

FIGS. 63A and 63B are diagrams of a top and bottom, respectively, of a linear servo bay lid 6310 in accordance with some embodiments of the present inventive concept.

FIG. 64 is a plan view of the carriage 3941 with carriage linear servos 6210 (not visible), linear servo bay lid 6310, lead nut 3855, and linear ball bearing 6461 in place in accordance with some embodiments of the present inventive concept.

Figure 65:
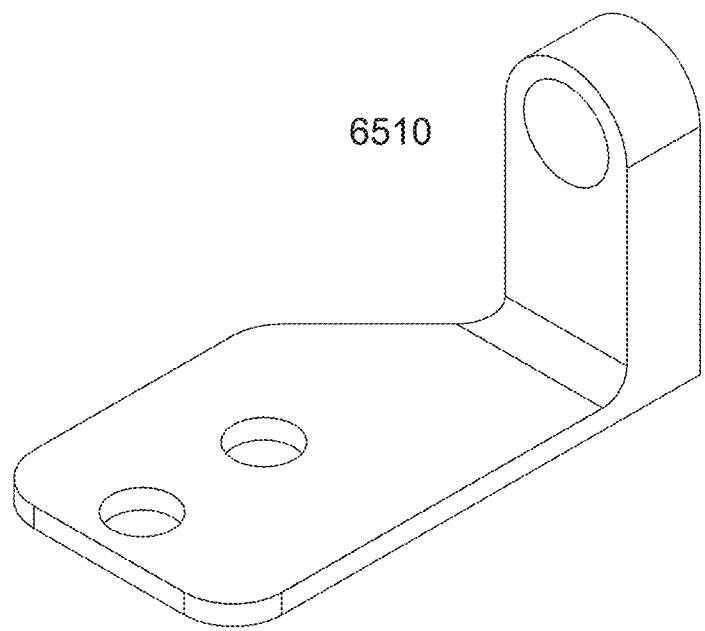

FIG. 65 is a diagram of a lead screw post 6510 in accordance with some embodiments of the present inventive concept.

Figure 66:
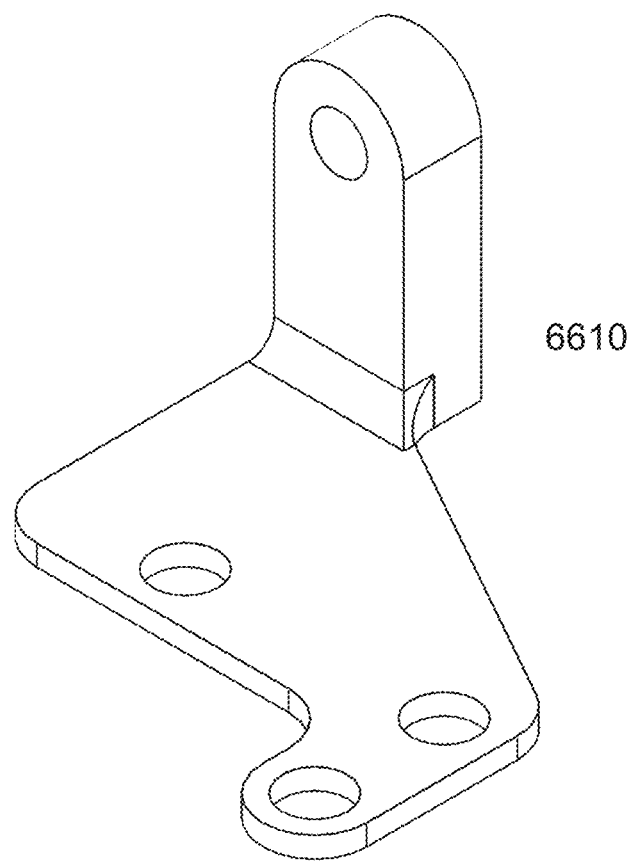

FIG. 66 is a diagram of a carriage shaft post 6610 in accordance with some embodiments of the present inventive concept.

Figure 67:
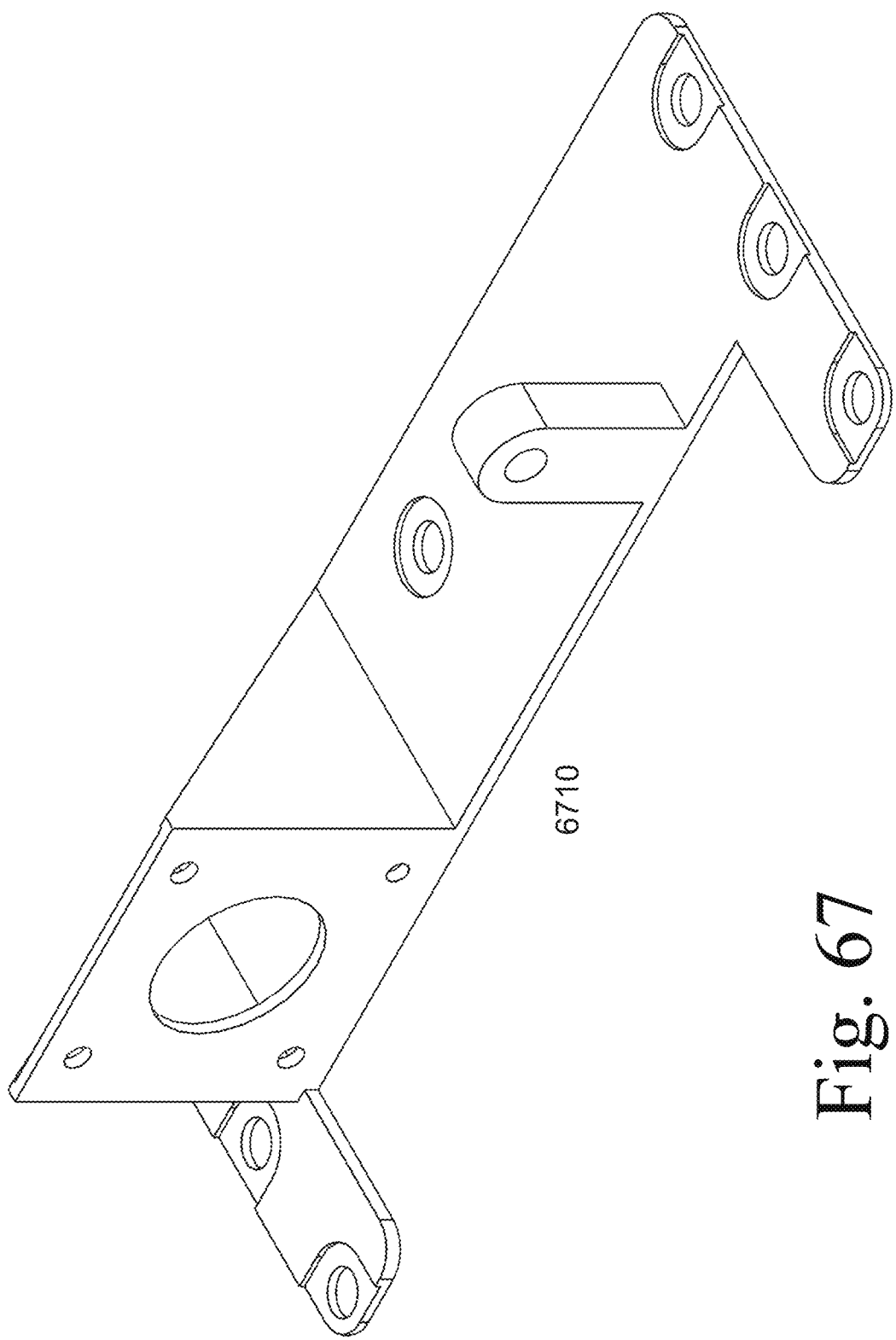

FIG. 67 is a diagram of a stepper motor mount 6710 in accordance with some embodiments of the present inventive concept.

FIG. 68 is a diagram illustrating the orientation of the stepper motor 3851, carriage shaft 6853 and carriage shaft collars 6853 in accordance with some embodiments of the present inventive concept.

Figure 69:
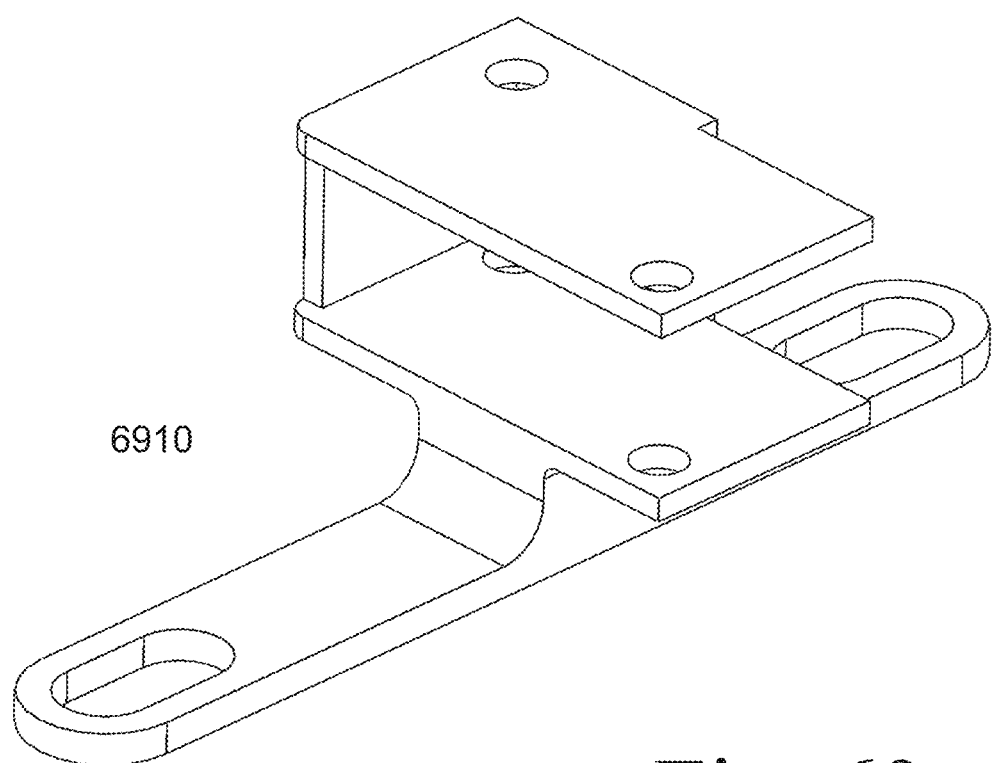

FIG. 69 is a diagram of an adjustable limit switch holder 6910 in accordance with some embodiments of the present inventive concept.

Figure 70:
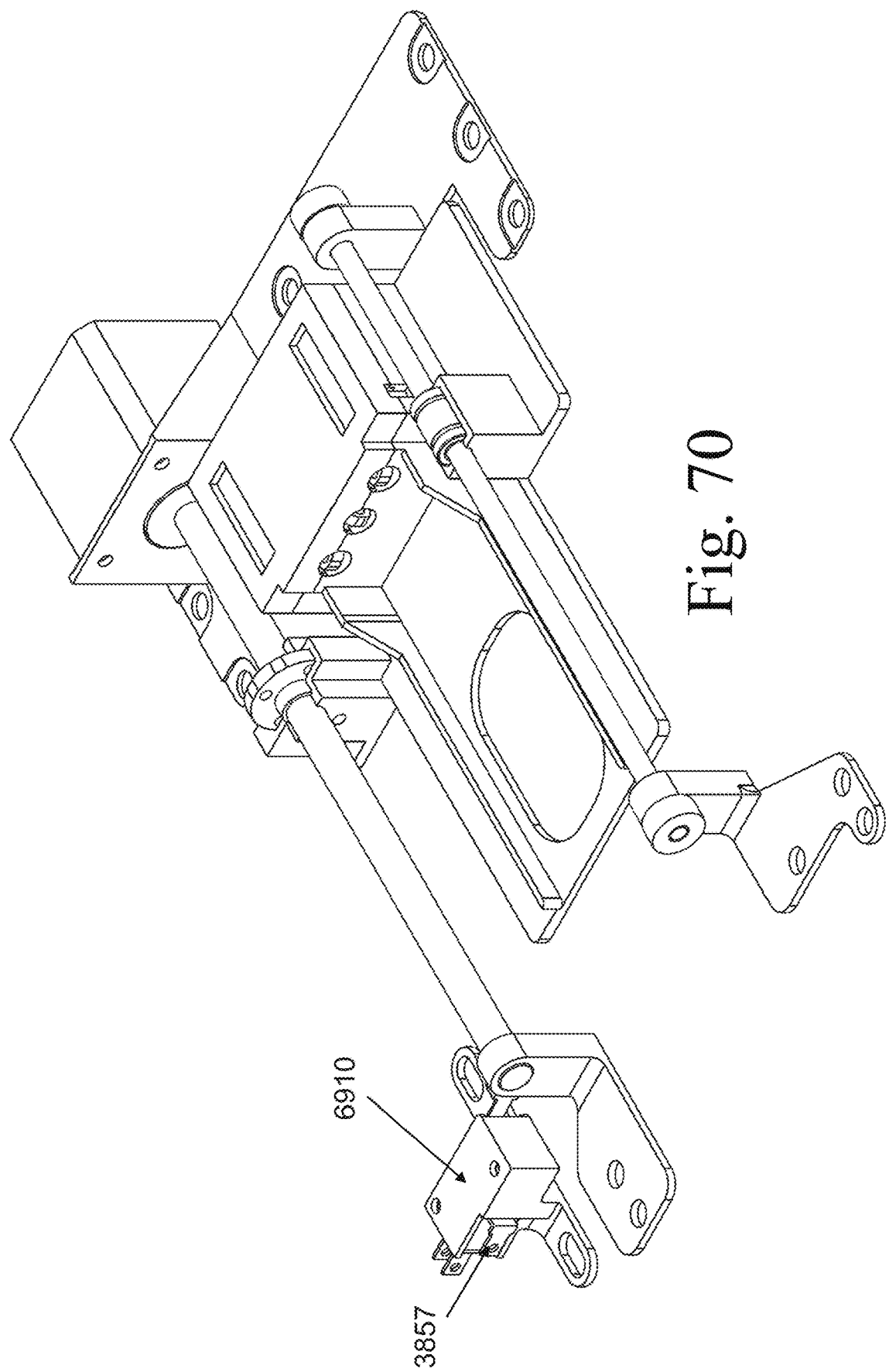

FIG. 70 is a diagram of adjustable limit switch holder 6910 with the limit switch 3857 in accordance with some embodiments of the present inventive concept.

Figure 71:
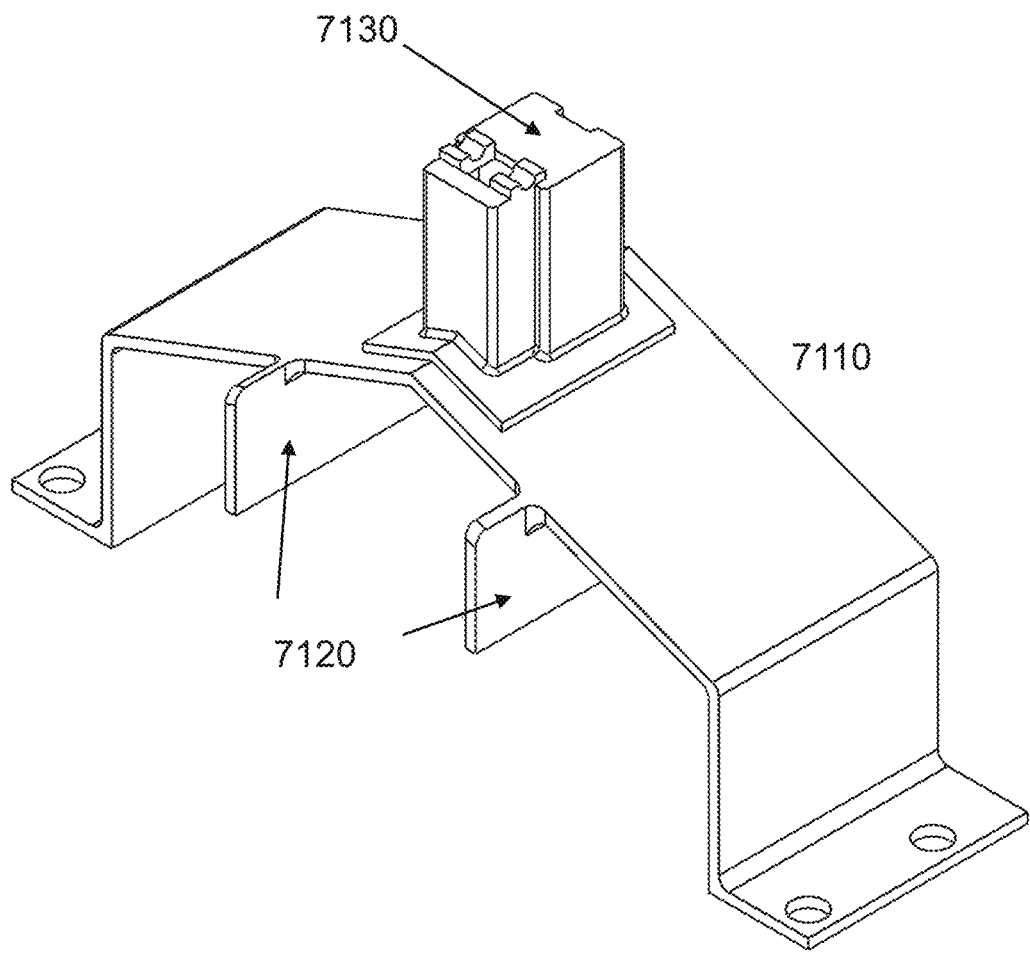

FIG. 71 is a diagram of a clamp mechanism housing 7110 including cartridge clamp guides 7120 and a cartridge clamp linear servo housing 7130 in accordance with some embodiments of the present inventive concept.

Figure 72B:
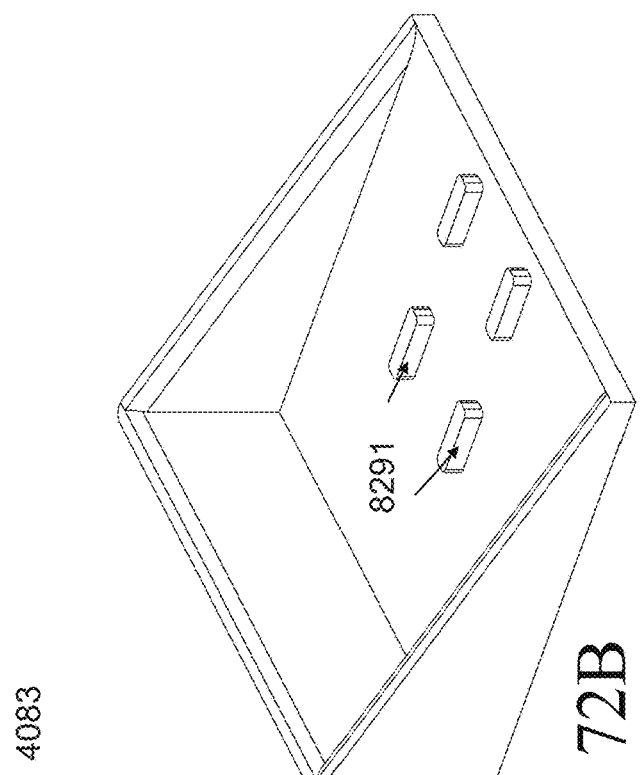
Figure 72A:
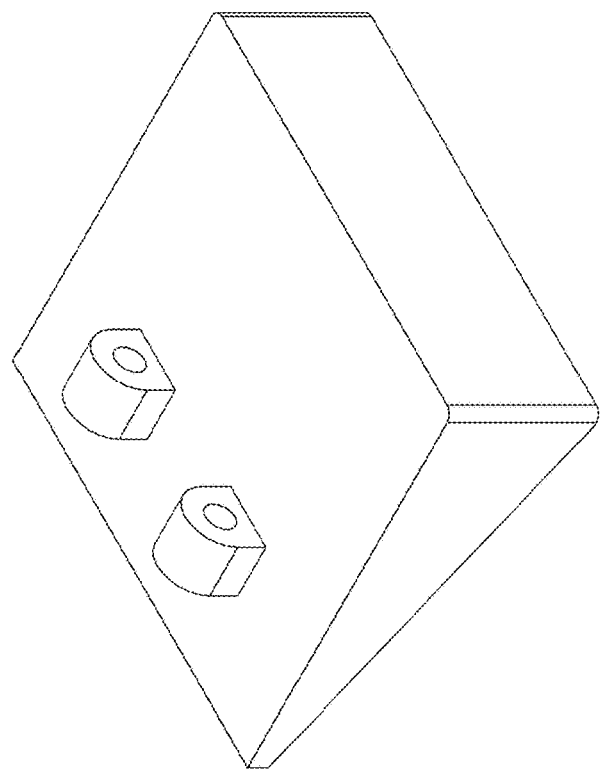

FIGS. 72A and 72B are diagrams of the top and bottom, respectively, of a cartridge clamp 4083 in accordance with some embodiments of the present inventive concept.

Figure 73:
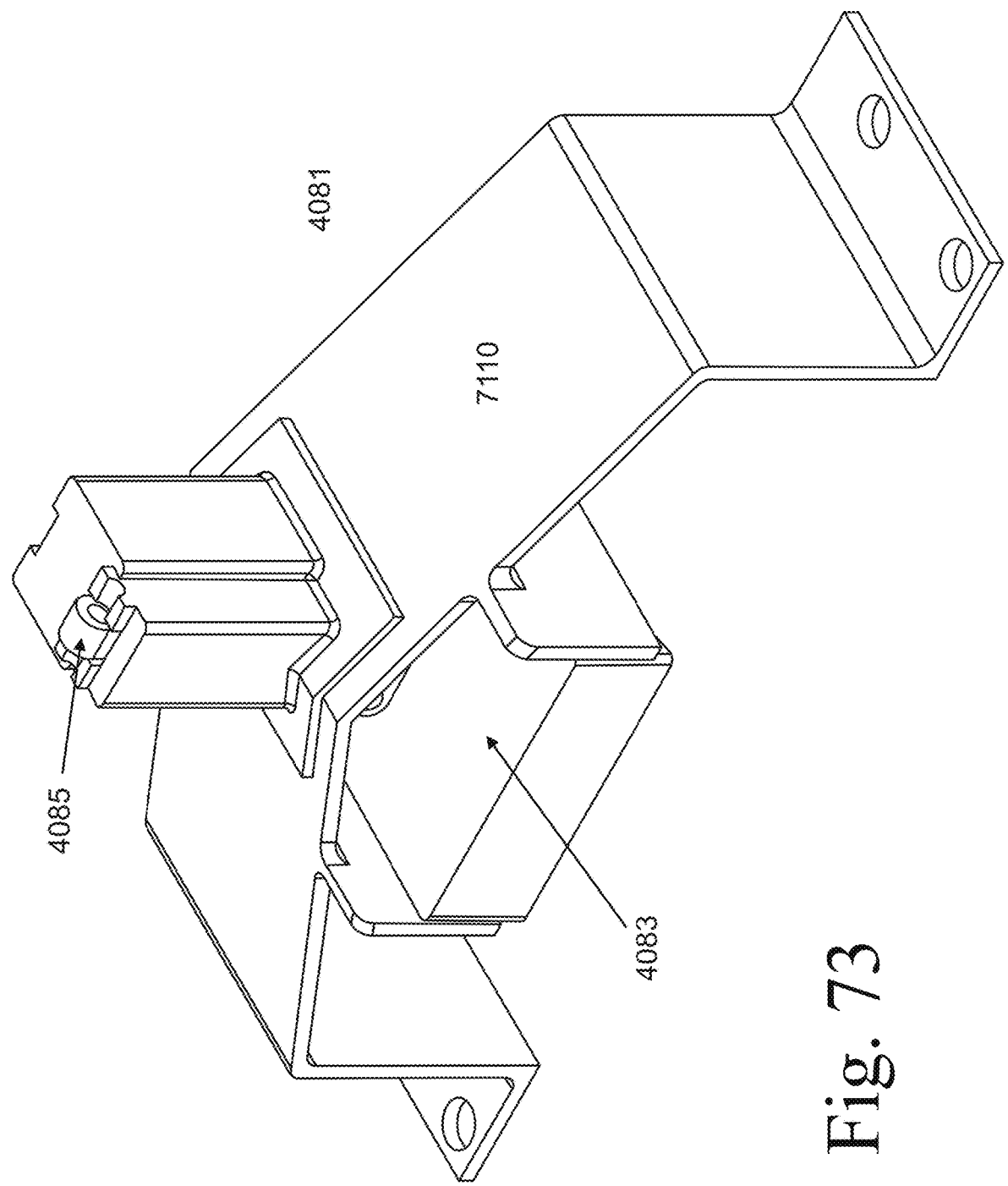

FIG. 73 is a diagram of a cartridge clamp 4083 and cartridge clamp linear servo 4085 in place in the clamp mechanism housing 7110 which together comprise the clamp mechanism assembly 4081 in accordance with some embodiments of the present inventive concept.

Figure 74:
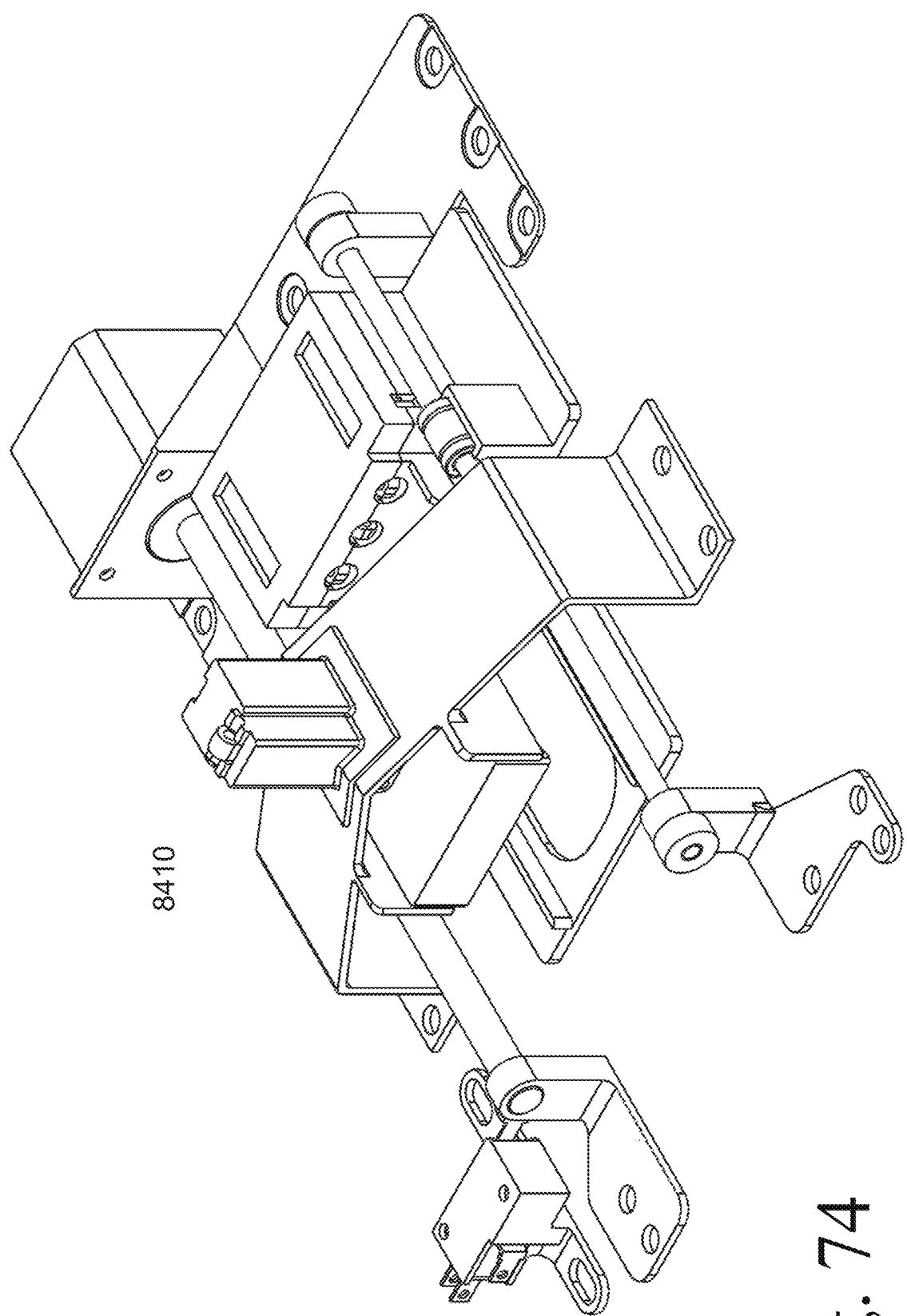

FIG. 74 is a diagram of a full stage adapter assembly 8410 in accordance with some embodiments of the present inventive concept.

Figure 75:
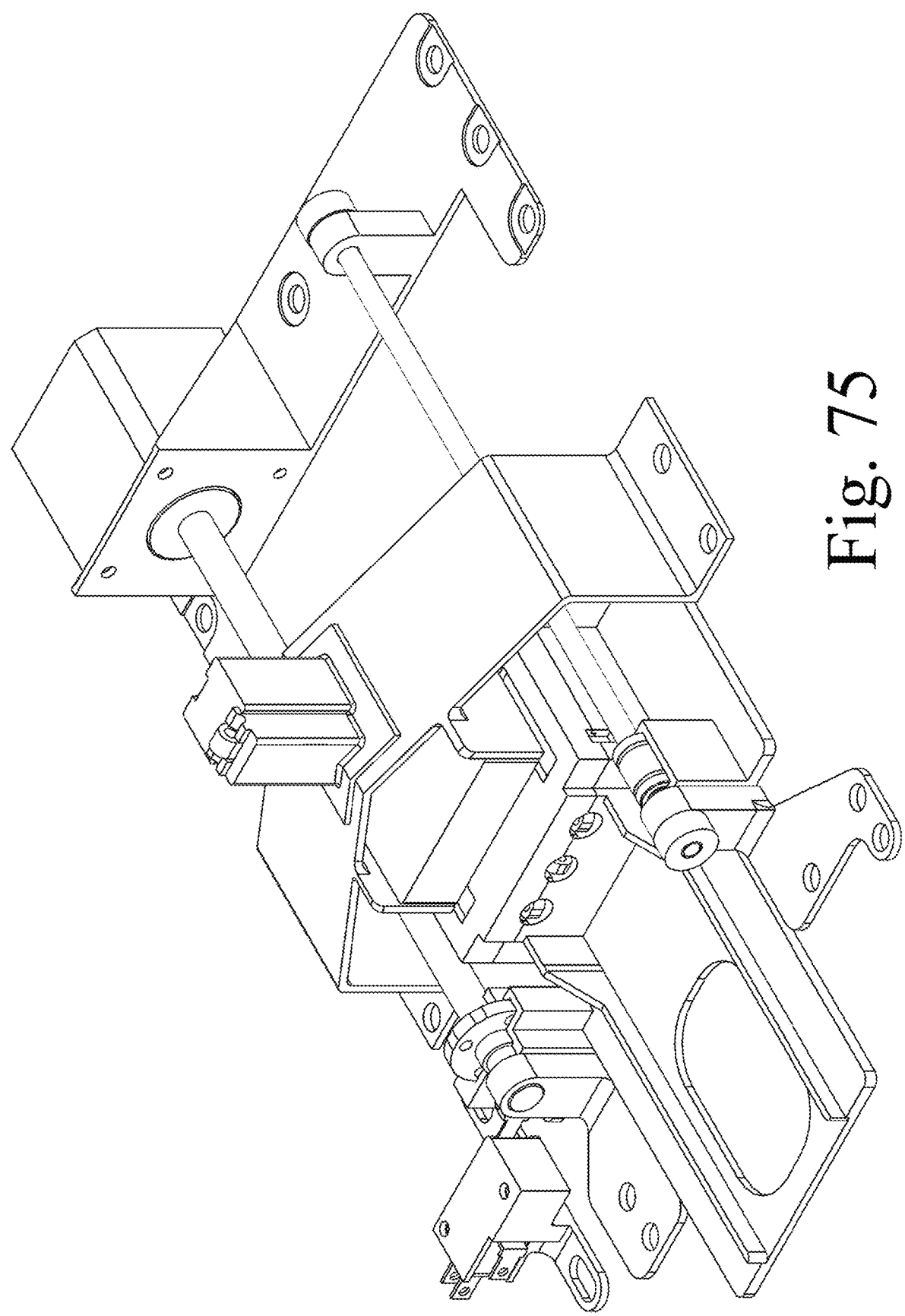

FIG. 75 is a diagram stage adapter assembly 8410 with carriage 3941 fully extended in accordance with some embodiments of the present inventive concept.

Figure 76:
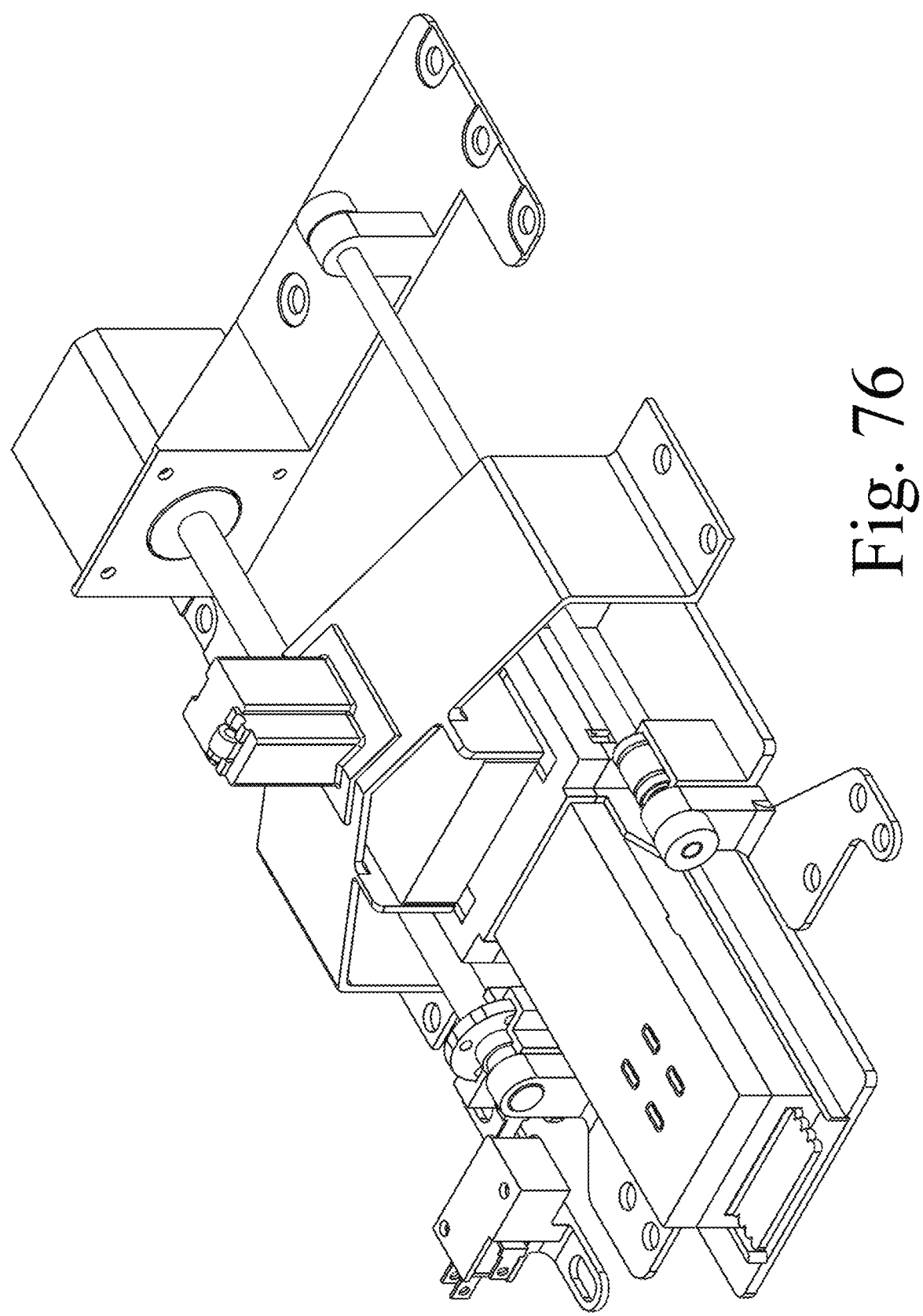

FIG. 76 is a diagram illustrating a stage adapter assembly 8410 with carriage 3941 fully extended and staining cartridge 3594 and biopsy insert 3596 in position in accordance with some embodiments of the present inventive concept.

Figure 77:
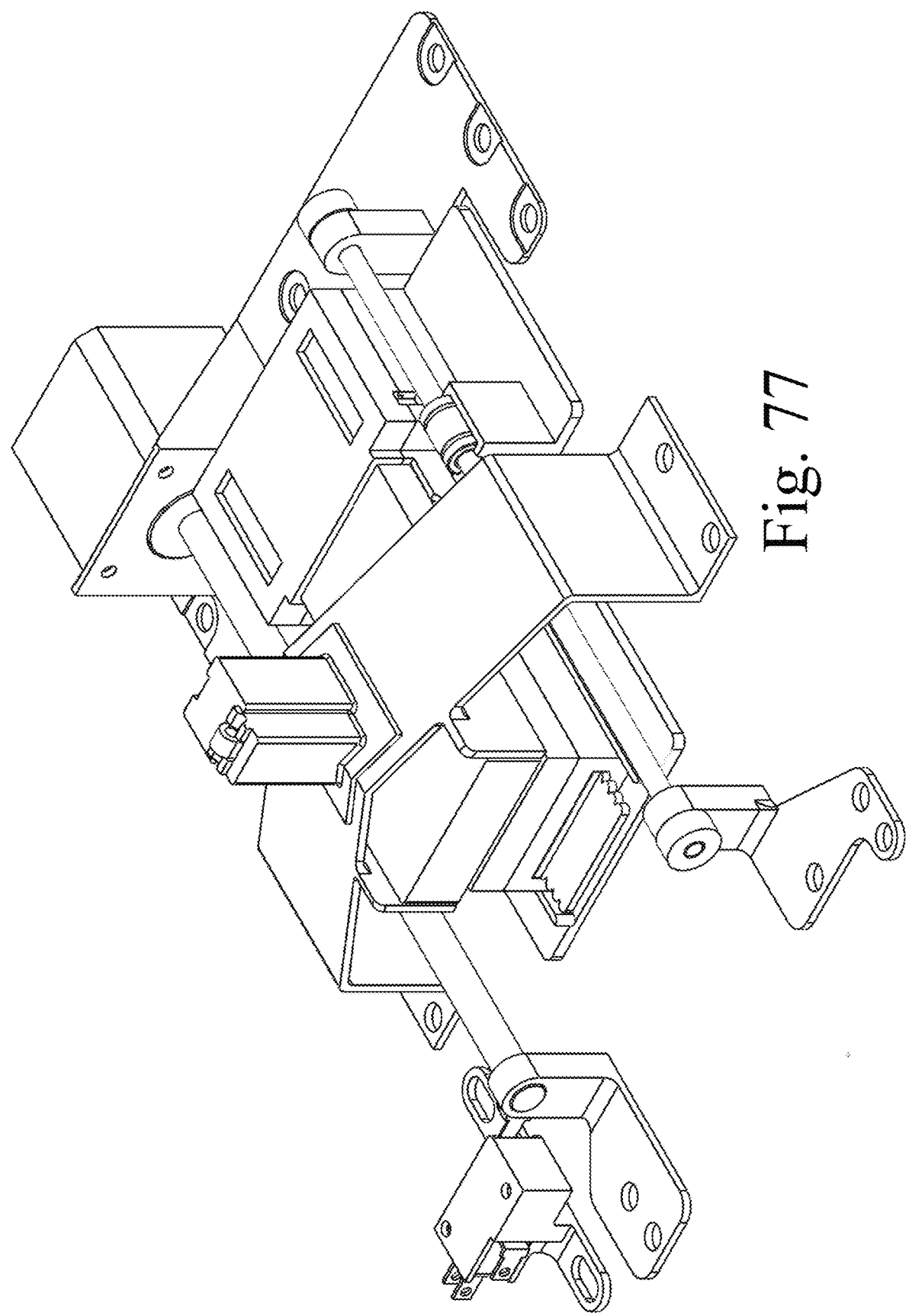

FIG. 77 is a diagram illustrating a stage adapter assembly 8410 with carriage 3941 fully retracted and staining cartridge 3594 and biopsy insert 3596 in position in accordance with some embodiments of the present inventive concept.

Figure 78:
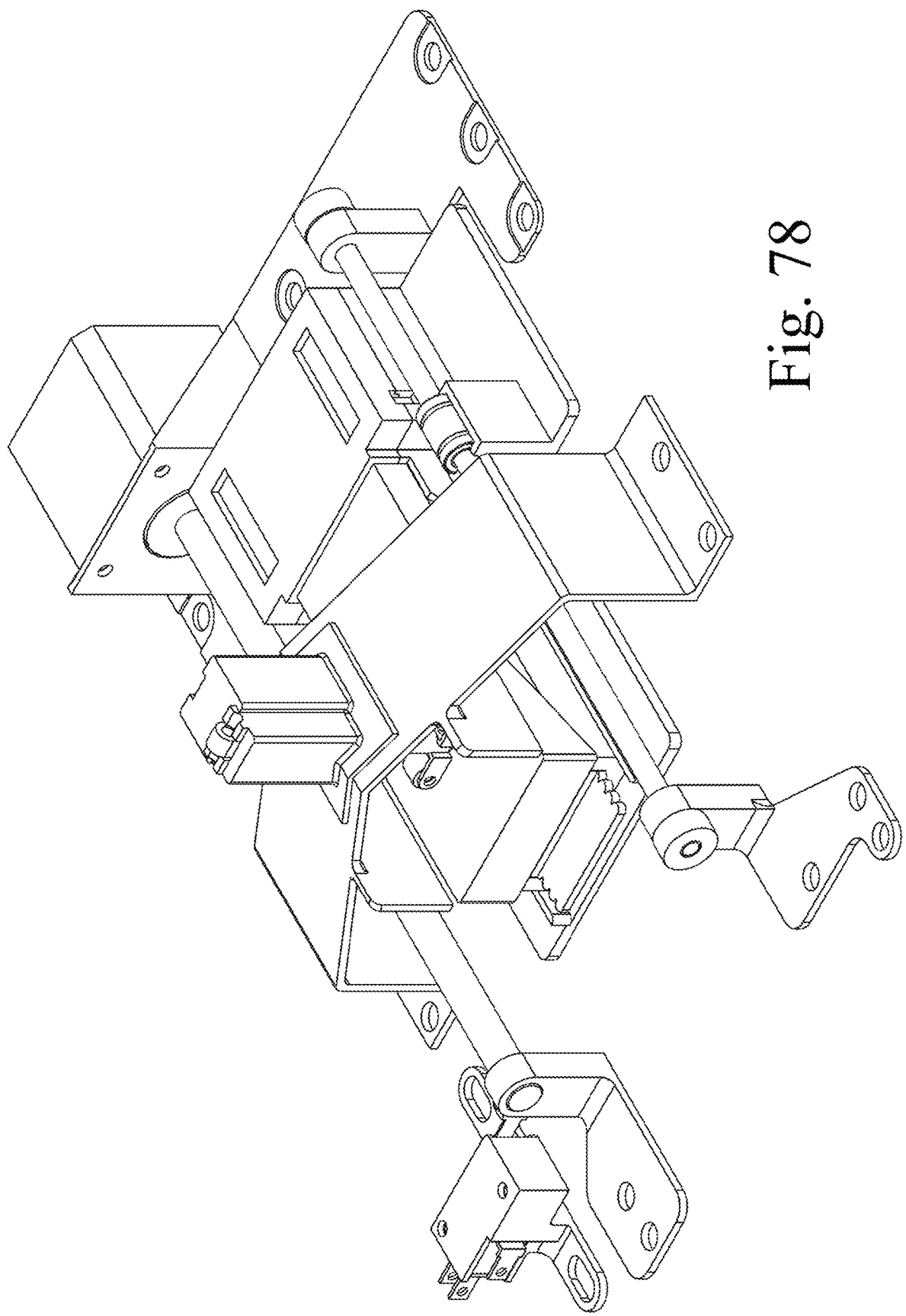

FIG. 78 is a diagram illustrating stage adapter assembly 8410 with carriage 3941 fully retracted, staining cartridge 3594 and biopsy insert 3596 in position, and cartridge clamp 4083 deployed by the cartridge clamp linear servo 4085 in accordance with some embodiments of the present inventive concept.

It will be understood that embodiments of the disposable, stage adapter and related systems and methods discussed herein are provide as examples only and, therefore, embodiments of the present inventive concept are not limited thereto.

Referring now to FIGS. 79 through 82, operations according to various embodiments of the present inventive concept will be discussed. Histopathology and cytopathology, or the study of microscopic tissue and cellular structure and function, is the basis of disease diagnosis. Histopathology involves the study of microscopically thin sections of tissue attached to glass slides, which are further stained with chromophores to differentially highlight cells and other biological components of interest. Likewise, cytopathology involves the study of cells smeared onto glass slides, which are also stained with chromophores for analysis by a cytopathologist. The process of obtaining the prepared tissue slide for histopathology is a multistep process. The starting point is typically a biopsy or fragment of solid tissue, which is preserved and hardened by either chemical fixation or freezing, is cut into microscopically thin sections using a microtome, after which the tissue sections are placed onto glass slides, further chemically treated to dehydrate, clear, and stain them, and then coverslipped to preserve the integrity of the slide. For cytopathology, the starting point is a slurry of cells obtained by fine needle aspiration or debridement of cells using scraping or brushing. In this case the cells are smeared between glass slides, and the resulting slide is then prepared in a similar fashion as the histopathology slides. Because of the complexities in preparing tissues for histopathology and cytology analysis, typically dedicated technicians are employed to perform this process. Furthermore, because of the need to harden and physically section tissues, the process is slow and difficult to automate. The result of the process is a glass slide with tissue or cells which must be viewed under a microscope, or additionally scanned into a digital image with a whole slide scanner, which presents another lengthy step in an already lengthy and laborious multi-step process. The final step is classification of the sample by a pathologist who views the slide under a microscope or the digital image on a computer screen.

Recently, the advent of digital whole slide scanning has enabled histopathology and cytopathology slides to be digitized for computer-aided analysis or diagnosis. Systems for computer-aided analysis or diagnosis leverage information present in the images to serve as an assist to the human rater by demarcating areas of interest in the image; automatically detecting certain features; measuring quantities such as the size, shape, and arrangement of cells, organelles such as nuclei, or other features; or to perform fully automated diagnosis and/or grading of the tissue pathology. However, the collection of such digital data from histopathology and cytopathology slides collected using traditional methods involves an additional step to digitally scan the image, beyond the already laborious and lengthy multi-step process.

Accordingly, embodiments discussed herein provides an automated digital pathology laboratory which takes as input an intact biological tissue or cell sample, returns an output digital pathology image for pathologist diagnosis with no further user intervention. The invention furthermore optionally performs tasks related to computer-assisted pathology analysis, up to and including rendering a sample classification in an automated manner based on the digital image. The invention enables "sample-to-image" or "sample-to-result" in the field of histopathology and cytopathology, by automating the sample processing steps and removing the need for physical sectioning using optical sectioning microscopy, which inherently results in a useful digital image. Furthermore, as methods in accordance with embodiments discussed herein do not destroy the samples obtained, standard histological or cytological processing may also be performed on the sample.

Figure 79:
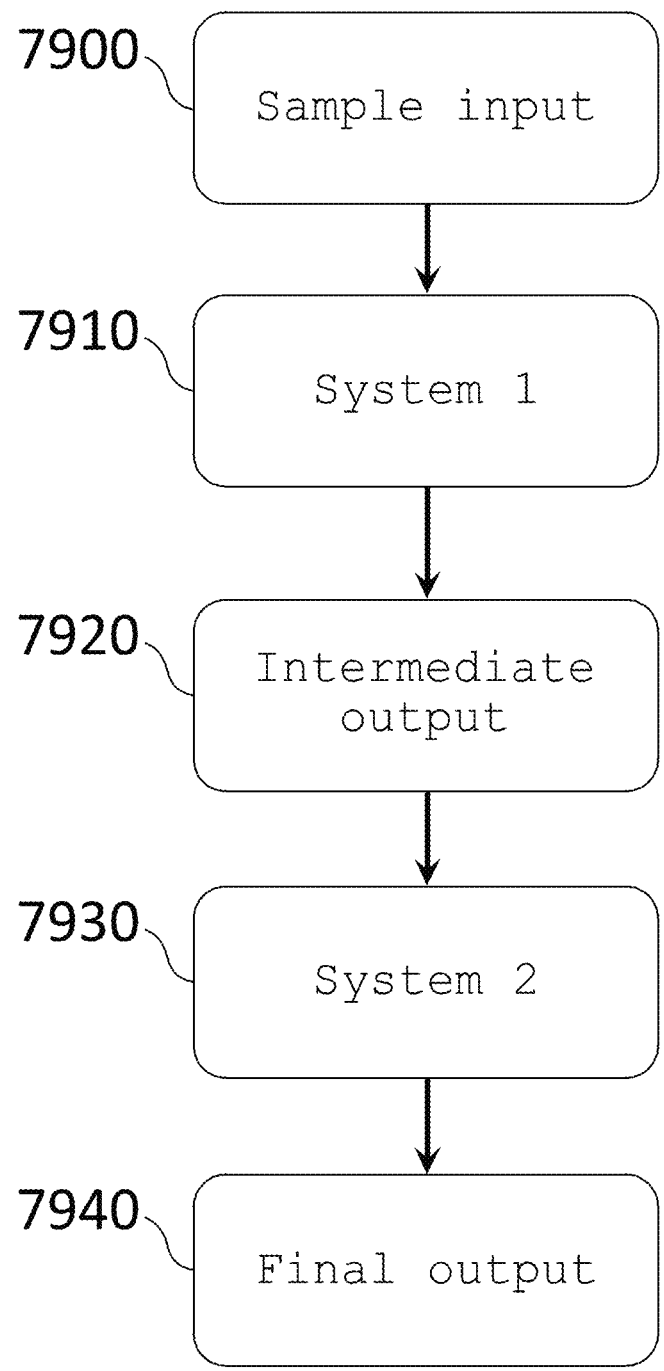
FIGS. 79 through 83 are flowcharts illustrating operations in accordance with various embodiments of the present inventive concept.

Referring now to FIG. 79, operations performed by systems and device in accordance with embodiments of the present inventive concept will be discussed. Systems and methods in accordance with embodiments discussed herein begin at block 7900 by receiving a biological sample an input. Details with respect to "biological samples" are discussed further below. The received biological sample is processed by the system (block 7910). Processing the received biological sample includes imaging the sample and returning an intermediate imaging output or result (block 7920). The imaging output/result may serve as an image for direct human evaluation. However, operations may proceed to block 7930 where the intermediate imaging output/result may be further processed (second process) by an image processing and sample classification system (block 7930). The second process provides a final sample classification result (block 7940). Further details with respect to these processes will be discussed further below with respect to the flowcharts of FIGS. 80 through 82.

Figure 80:
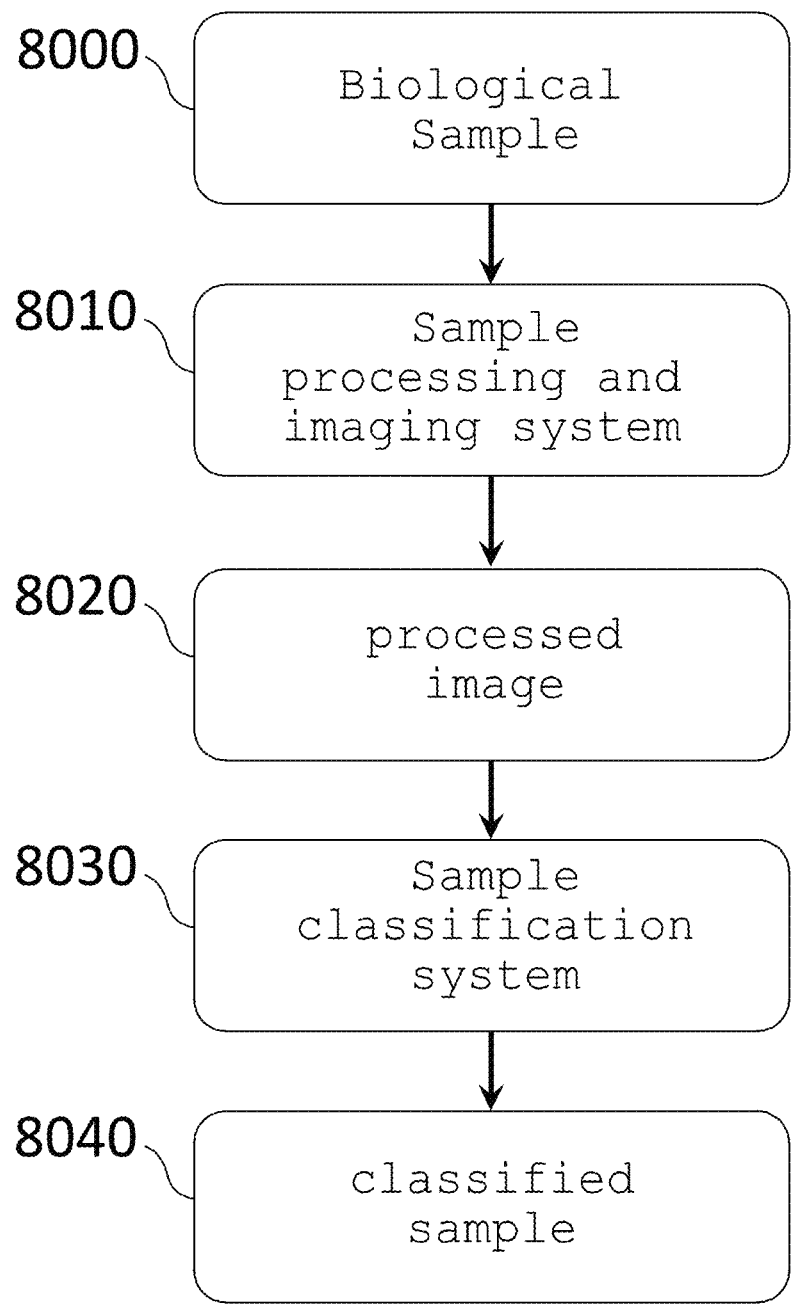

Referring now to FIG. 80, operations begin at block 8000 by receiving a biological sample. In some embodiments, the biological sample may be an unprocessed sample as shown in block 8100 of FIG. 81 and block 8300 of FIG. 83. An unprocessed sample may be an unprocessed tissue biopsy, fragment, slice, smear, or scrape. As used herein, "unprocessed" refers to a fresh, unfixed, unstained, non-preserved, and intact tissue biopsy, fragment, slice, smear or scrape. However, embodiments of the present inventive concept are not limited to this configuration. For example, in some embodiments, the sample may be a fixed or preserved tissue biopsy, fragment, slice, smear, or scrape without departing from the scope of the present inventive concept. In some embodiments, the sample may be a frozen and thawed tissue biopsy, fragment, slice, smear, or scrape. The sample may also be a microscopically thin tissue section or smear prepared on a glass or plastic slide; or a block of tissue embedded in paraffin wax.

Figure 82:
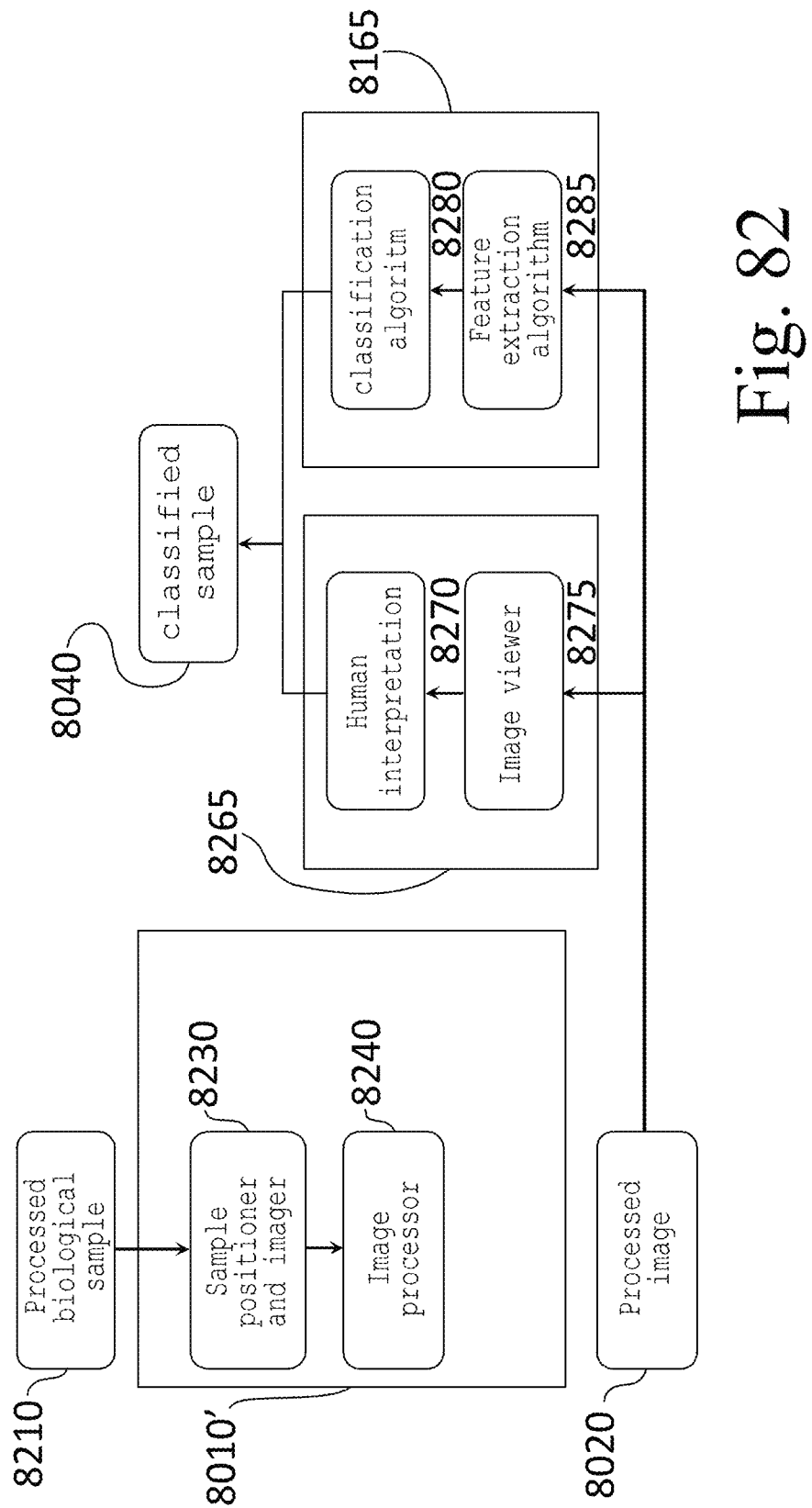

Furthermore, in some embodiments, the biological sample may be a "processed" sample, i.e. a previously stained biological sample, either fresh, fixed, wax-embedded, or previously frozen as shown in block 8210 of FIG. 82.

Figure 81:
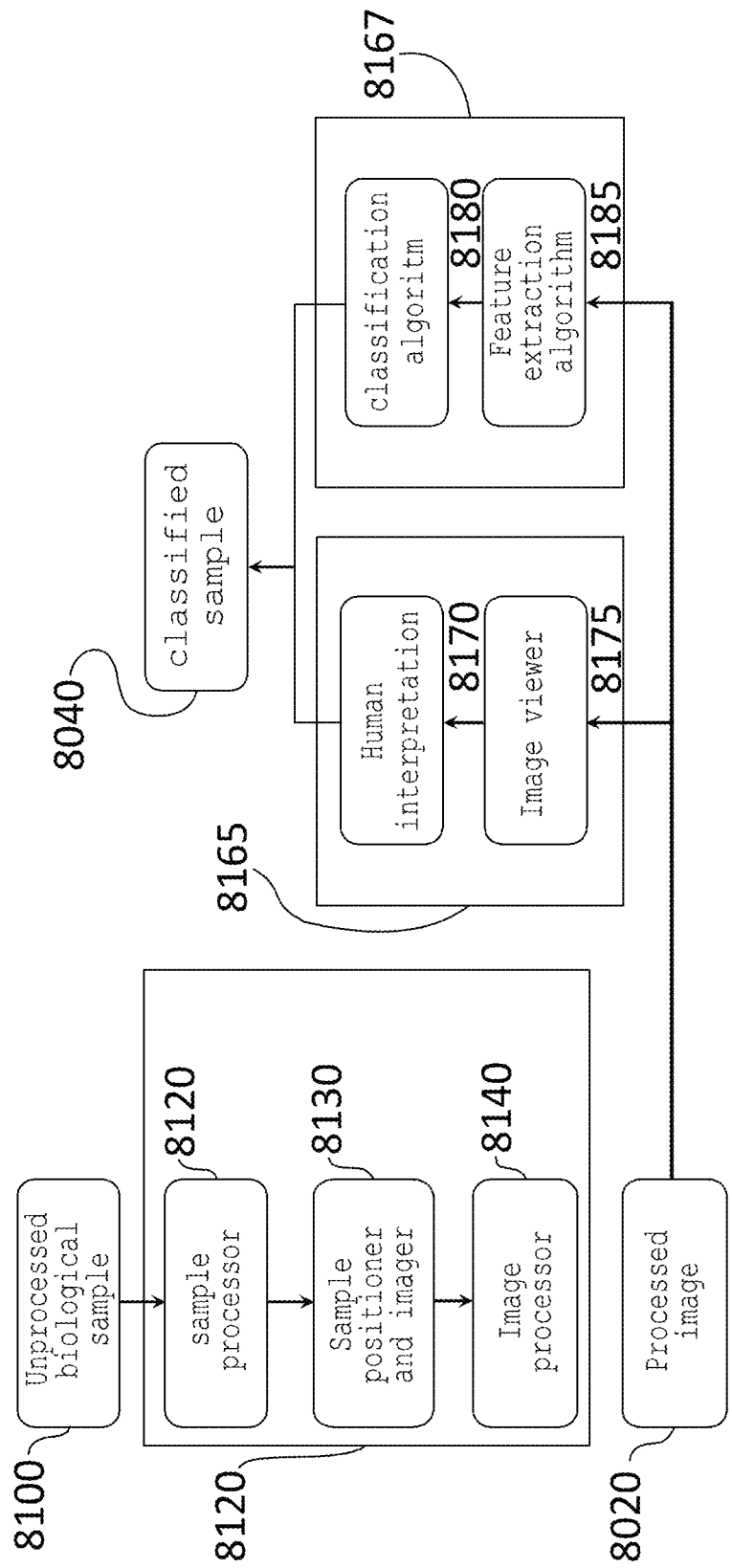
Figure 83:
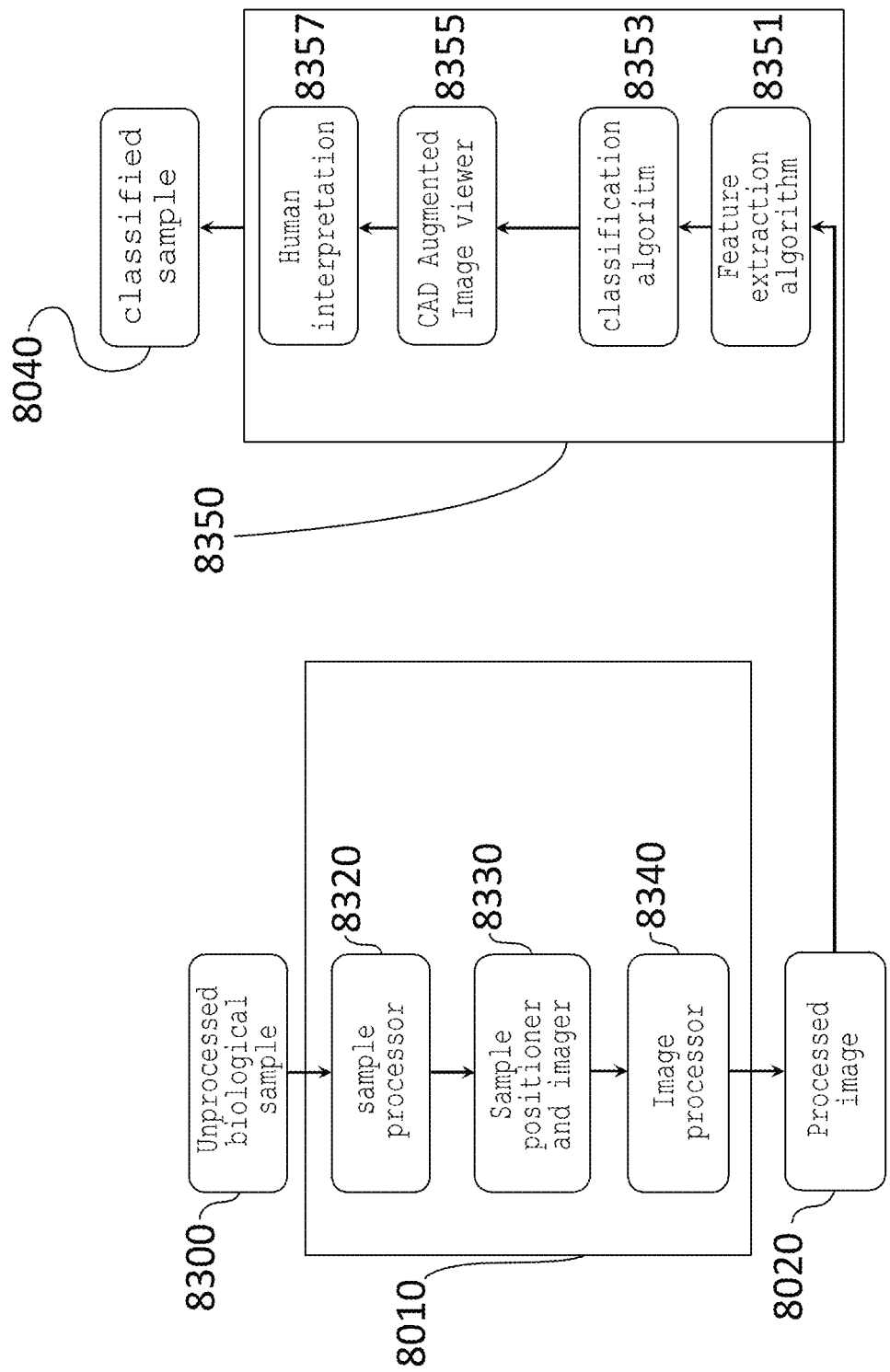

The biological sample is introduced into a sample processing and imaging System (blocks 8010 and 8010'). These block 8010 and 8010' may include multiple processes therein. As shown in FIGS. 81 and 83, the multiple processes of blocks 8010 and 8010' both include three subprocesses blocks 8120/8320, 8130/8330 and 8140/8340. At blocks 8120/8320, a sample processing system may process the sample for microscopic imaging by applying fluorescent stains and wash solutions and removing excess stain from the sample. This sample processing method may be used when the biological sample is an unstained sample (unprocessed—blocks 8100 and 8300). If the sample has been previously stained (processed—block 8210 of FIG. 82), operations of block 8120/8320 may be eliminated from the process as shown in FIG. 82. In FIG. 82, operations proceed directly to the sample positioner and imager (block 8230) without block 8120/8320.

Operations of block 8120/8320 may further include a staining cartridge as discussed above in accordance with some embodiments of the present inventive concept. As discussed, the staining cartridge automatically applies stain and wash solutions to the sample and removes solutions from the sample to prepare it for imaging. As discussed above, staining cartridge is inserted into the sample positioner and imager (block 8130/8230/8330) via, for example, the carriage discussed above. The sample positioner and imager may further include a stage adaptor assembly that serves to attach the sample cartridge containing the biological sample, to a mechanical XY translation stage that steps the sample in increments systematically over an optical sectioning microscope, in order to obtain microscopic images covering the surface area of the sample.

In some embodiments, the optical sectioning microscope includes a structured illumination microscope operating in fluorescence mode, for example, the microscope discussed in U.S. Pat. No. 10,042,150, the disclosure of which is hereby incorporated herein by reference as if set forth in its entirety. The structured illumination microscope may also be operated in reflectance mode optionally in addition to fluorescence mode. In some embodiments, the optical sectioning microscope may include, for example, a confocal microscope, multiphoton microscope, deconvolution microscope, light sheet or planar illumination microscope. The optical sectioning microscope uses a plurality of illumination wavelengths and optical filters to obtain a plurality of microscopic images of the sample corresponding to the plurality of contrasting agents or stains applied to the sample, or according to the reflectance of the sample. The microscopic imaging system obtains a plurality of images of the biological sample at a plurality of locations over the area of the sample, by moving the sample systematically (including but not limited to a serpentine, or raster pattern) with relation to the microscope objective lens, or alternatively by moving the microscopic imaging system systematically with relation to the biological sample. An autofocus routine is used at each location to focus the microscope onto the surface of the sample, which acts by optimizing a focus function as the objective lens is advanced in the direction perpendicular to the tissue surface using a mechanical Z Translation Stage. The resulting grayscale images are then input into subsystem image processor to process images obtained from the microscopic imaging system into an intermediate image result of the biological sample (block 8140/8240/8340). In some embodiments, individual images obtained from each location of the sample may be stitched together to obtain a mosaic or panorama image of the biological sample for each of the plurality of illumination wavelengths or imaging channels, to provide the intermediate processed image (block 8020).

Further, the plurality of mosaic or panorama images, corresponding to the multiple contrast agents or stains applied to the sample, may also be combined into a single image in which each imaging channel is remapped into a new colormap. In some embodiments, the colormap is obtained by color deconvolution of hematoxylin and eosin stained slide images of a similar biological sample, in order to render the image of the biological sample to replicate that of a hematoxylin and eosin slide. Slides stained with dyes other than hematoxylin and eosin, for instance Diff Quik, Papanicolau stain, trichrome stains, periodic acid schiff stain, Jones silver stain, Oil red O, or peroxidase-stained immunohistochemistry slides, may also be used for color deconvolution to obtain colormaps for rendering a plurality of grayscale images into single color images.

In some embodiments, other colormaps may be applied to combine multiple grayscale images of the sample representing multiple contrasting agents or sources, into a single image. In some embodiments a merged image, in combination with a plurality of single-channel images corresponding to a plurality of acquisition wavelengths, will serve as the input into a subsystem. In some embodiments, the combined single image will serve as the input to subsystems. For example, image evaluation may be performed by human interpretation, automated interpretation, and/or computer aided detection without departing from the scope of the present inventive concept.

Operations of block 8165/8265 include a method for transmitting generated images to a remote viewing system for navigation and annotation; transmission of the original image from the source computer system over a network to a remotely hosted server; conversion of the transmitted image into a multiresolution pyramid of images; storage of the multiresolution pyramid of images, with associated image metadata, in a database; accessing of a stored multiresolution image pyramid, using a unique identifier, from the database, and display of the associated image pyramid in a web viewer.

The image viewer (block 8175/8275) also includes a user interface that enables annotation, by drawing of a polygonal region, and text documentation linked to the polygonal region, for a linked multiresolution image pyramid. Annotations are stored in a database, including the text and associated geometry, as a series of coordinates, corresponding to the polygonal region linked to the image identifier. In embodiments including blocks 8165/8265, after display in the image viewer (block 8175/8275), a pathologist (human) will interpret the displayed image (block 8170/8270), making any appropriate annotations, and render an evaluation, which is then associated with the image as a classified sample (block 8040).

Operations of embodiments using blocks 8167/8267 include a feature extraction method (blocks 8185/8285) that extracts a plurality of image features associated with the input image(s). The image features are classified into a plurality of discrete classes (blocks 8180/8280). Given the classification output of blocks 8167/8267). the image is associated with an evaluation as determined by the classification(s), corresponding to classified sample (block 8040)

However, in some embodiments, operations proceed to block 8350 of FIG. 83. In these embodiments, a computer aided detection (CAD) feature extraction and classification are performed (block 8351 and block 8353). However, in some embodiments a CAD augmented image viewer is used to visualize and as an overlay to the multiresolution image stack associated with the image of interest, represented as an equivalent multiresolution image stack (block 8355). Human interpretation (block 8357) then proceeds, augmented with the automated highlighting of regions of diagnostic interest, as well as, optionally, a suggested evaluation. The pathologist interprets the displayed image (block 8357), making any appropriate annotations, and render an evaluation, which is then associated with the image as a classified sample (block 8040).

Figure 84:
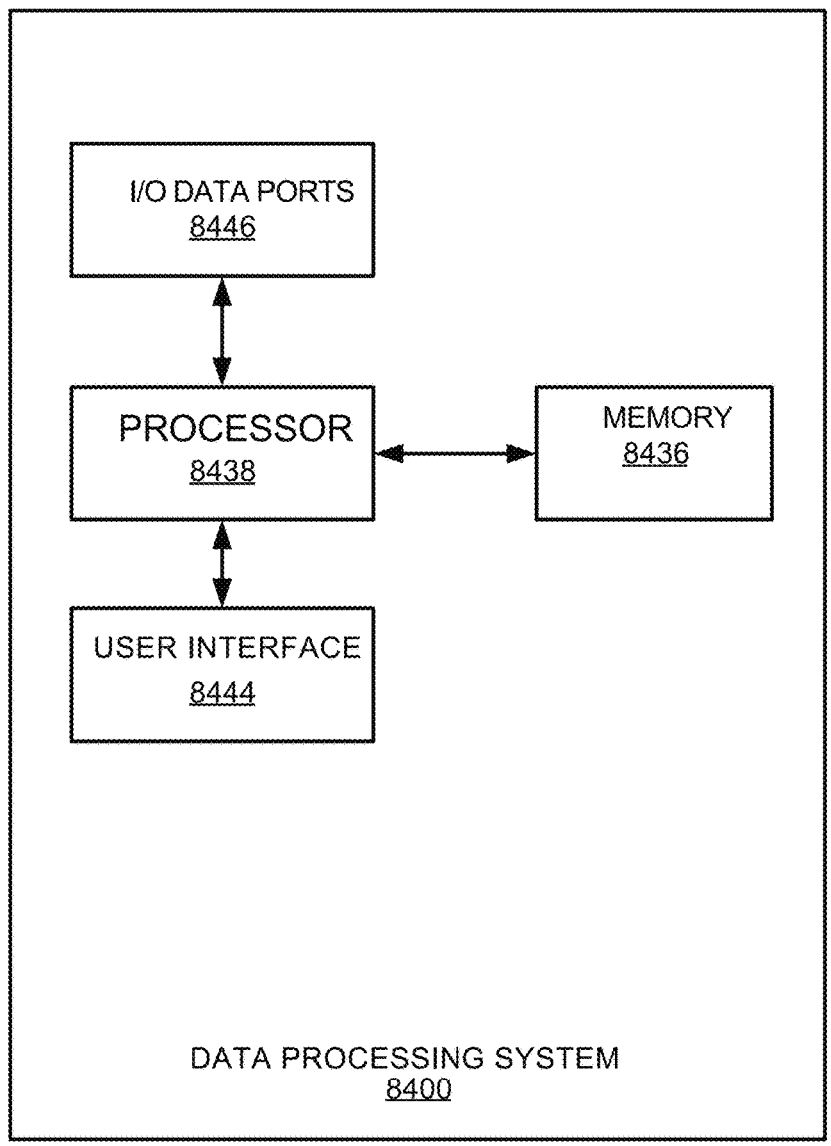
FIG. 84 is a block diagram illustrating a basic data processor that may be used in accordance with some embodiments of the present inventive concept.

Referring now to FIG. 84, an exemplary embodiment of a data processing system 8400 suitable for use in accordance with some embodiments of the present inventive concept will be discussed. For example, the data processing system 8400 may be provided anywhere in the system without departing from the scope of the present inventive concept. As illustrated in FIG. 84, the data processing system 8400 includes a user interface 8444 such as a display, a keyboard, keypad, touchpad or the like, I/O data ports 8446 and a memory 8436 that communicates with a processor 8438. The I/O data ports 8446 can be used to transfer information between the data processing system 8400 and another computer system or a network. These components may be conventional components, such as those used in many conventional data processing systems, which may be configured to operate as described herein. This data processing system 8400 may be included any type of computing device without departing from the scope of the present inventive concept.

Example embodiments are described above with reference to block diagrams and/or flowchart illustrations of methods, devices, systems and/or computer program products. It is understood that a block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means (functionality) and/or structure for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the functions/acts specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

Accordingly, example embodiments may be implemented in hardware and/or in software (including firmware, resident software, micro-code, etc.). Furthermore, example embodiments may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of data processing systems discussed herein may be written in a high-level programming language, such as Java, AJAX (Asynchronous JavaScript), C, and/or C++, for development convenience. In addition, computer program code for carrying out operations of example embodiments may also be written in other programming languages, such as, but not limited to, interpreted languages. Some modules or routines may be written in assembly language or even micro-code to enhance performance and/or memory usage. However, embodiments are not limited to a particular programming language. It will be further appreciated that the functionality of any or all of the program modules may also be implemented using discrete hardware components, one or more application specific integrated circuits (ASICs), or a field programmable gate array (FPGA), or a programmed digital signal processor, a programmed logic controller (PLC), or microcontroller.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated.

In the drawings and specification, there have been disclosed exemplary embodiments of the inventive concept. However, many variations and modifications can be made to these embodiments without substantially departing from the principles of the present inventive concept. Accordingly, although specific terms are used, they are used in a generic and descriptive sense only and not for purposes of limitation, the scope of the inventive concept being defined by the following claims.

What is claimed is:

1. A disposable staining system, the system comprising:
    an insertable module that receives an intact solid biological sample therein, the insertable module including a well in which the intact solid biological sample is positioned, wherein the intact solid biological sample is a whole intact sample without destruction; and
    a staining cartridge that receives the insertable module including the intact solid biological sample therein and the staining cartridge including a sled therein, the insertable module being positioned in the staining cartridge,
    wherein the insertable module has first and second inclined planes on opposing sides of an upper surface of the insertable module;
    wherein the sled portion of the insertable module has corresponding first and second inclined planes on a bottom surface thereof; and
    wherein the first and second inclined planes of the insertable module and the first and second inclined planes of the sled transform horizontal movement of the insertable module into the staining cartridge into a vertical movement of the sled such that the sled is pushed upward to make contact with a piercing barb that punctures a stain manifold seal in the staining cartridge allowing stain into the well.

2. The system of claim 1,
    wherein the insertable module further includes an imaging window and an absorbent material; and
    wherein the absorbent material is configured to wick away stain from the imaging window.

3. The system of claim 1, wherein the staining cartridge including the insertable module is positioned in a microscope system using a motorized mechanism.

4. The system of claim 3, wherein the staining cartridge including the insertable module is held in place in the microscope system using a clamp assembly, the clamp assembly pressing a spring seal clamp down sealing an area around the intact solid biological sample allowing stain to accumulate.

5. The system of claim 4, wherein the staining cartridge is configured to promote movement of stain onto the biological material in the well of the insertable module.

6. The system of claim 5, wherein the staining cartridge further comprises a top shell and a bottom shell; and
    wherein a stain storage assembly is configured to be positioned in one of the top shell and the bottom shell to provide the stain to the intact solid biological sample in the well of the insertable module.

7. The system of claim 6, wherein a piercing barb on an upper surface of the sled is configured to puncture a stain manifold seal of the stain storage assembly in the staining cartridge such that the stain is dropped into the well while a spring seal is pressed down, sealing an area around the intact solid biological sample and allowing the stain to accumulate.

8. The system of claim 6, wherein the stain in the stain storage assembly is configured to provide at least one of stain and wash solutions for a plurality of intact solid biological samples.

9. The system of claim 8, wherein the staining cartridge further removes stain and/or wash solutions to prepare the intact solid biological sample for imaging.

10. The system of claim 1, wherein the intact solid biological sample is one of a processed sample and unprocessed sample.

11. The system of claim 10, wherein the unprocessed sample comprises an unprocessed tissue biopsy, fragment, slice, smear, or scrape.

12. The system of claim 11, wherein the unprocessed sample is a fresh, unfixed, unstained, non-preserved, and intact tissue biopsy, fragment, slice, smear or scrape.

13. The system of claim 10, wherein the intact solid biological sample comprises a fixed or preserved tissue biopsy, fragment, slice, smear, or scrape.

14. The system of claim 1, wherein the intact solid biological sample is one or more of tissue, cells and a biopsy of tissue or cells.

15. The system of claim 1, wherein the intact solid biological sample comprises a frozen and thawed tissue biopsy, fragment, slice, smear, or scrape.

16. The system of claim 1, wherein the whole intact sample without destruction is an unprocessed whole intact sample.

* * * * *